US010621605B2

United States Patent
Heitmueller et al.

(10) Patent No.: US 10,621,605 B2
(45) Date of Patent: *Apr. 14, 2020

(54) ELECTRONIC COUPON ISSUANCE AND REDEMPTION APPARATUSES, METHODS AND SYSTEMS

(71) Applicant: Visa International Service Association, San Francisco, CA (US)

(72) Inventors: Kathy Heitmueller, Midland, GA (US); Douglas R. Franz, San Francisco, CA (US); Chris James Truelson, Highlands Ranch, CO (US); Mary Theresa Taylor, San Francisco, CA (US); Walter J. Granville, Richmond, VA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/943,997

(22) Filed: Apr. 3, 2018

(65) Prior Publication Data

US 2018/0315066 A1    Nov. 1, 2018

Related U.S. Application Data

(63) Continuation of application No. 13/391,006, filed as application No. PCT/US2012/024772 on Feb. 10, 2012, now Pat. No. 9,953,334.
(Continued)

(51) Int. Cl.
*G06Q 30/02* (2012.01)
*G06Q 20/38* (2012.01)

(52) U.S. Cl.
CPC ....... *G06Q 30/0207* (2013.01); *G06Q 20/387* (2013.01); *G06Q 30/0222* (2013.01); *G06Q 30/0239* (2013.01); *G06Q 30/0253* (2013.01)

(58) Field of Classification Search
None
See application file for complete search history.

(56) References Cited

U.S. PATENT DOCUMENTS

| 789,106 A | 5/1905 | Seymour |
|---|---|---|
| 5,237,164 A | 8/1993 | Takada |

(Continued)

FOREIGN PATENT DOCUMENTS

| EP | 0855659 A1 | 7/1998 |
|---|---|---|
| JP | 2008545210 A | 12/2008 |

(Continued)

OTHER PUBLICATIONS

An Architecture for Secure Generation and Verification of Electronic Coupons;Garg et al., Proceedings of the 2001 USENIX Annual Technical Conference, Jun. 25-30, 2001.*

(Continued)

*Primary Examiner* — David J Stoltenberg
(74) *Attorney, Agent, or Firm* — Loeb & Loeb LLP

(57) ABSTRACT

The ELECTRONIC COUPON ISSUANCE AND REDEMPTION APPARATUSES, METHODS AND SYSTEMS ("ECIR") transforms user coupon purchase and redemption request inputs via ECIR components into coupon issuance, transaction, and analytics outputs. In some embodiments, the ECIR may receive an inventory request from a coupon program manager, including at least a virtual coupon issue criteria. The ECIR may generate one or more account identifiers, and transmit the account identifiers to the coupon program manager. The ECIR may receive, from the coupon program manager, an issue request along with
(Continued)

Example Data Flow: Coupon Account Issuance component the purchase information, which may include one or more purchase identifiers corresponding to one or more buyers. The ECIR may determine when the received purchase information satisfies the virtual coupon issue criteria. when it satisfies the criteria, the ECIR may issue one or more virtual coupons having the one or more account identifiers, and transmit the issued virtual cards to the coupon program manager.

12 Claims, 32 Drawing Sheets

Related U.S. Application Data

(60) Provisional application No. 61/441,555, filed on Feb. 10, 2011.

(56) References Cited

U.S. PATENT DOCUMENTS

| | | |
|---|---|---|
| 5,311,594 A | 5/1994 | Penzias |
| 5,446,890 A | 8/1995 | Renslo |
| 5,459,656 A | 10/1995 | Fields |
| 5,510,777 A | 4/1996 | Pilc |
| 5,521,362 A | 5/1996 | Powers |
| 5,530,438 A | 6/1996 | Bickham |
| 5,536,045 A | 7/1996 | Adams |
| 5,615,110 A | 3/1997 | Wong |
| 5,615,264 A | 3/1997 | Kazmierczak |
| 5,649,118 A | 7/1997 | Carlisle |
| 5,815,657 A | 9/1998 | Williams |
| 5,850,446 A | 12/1998 | Berger |
| 5,878,337 A | 3/1999 | Joao |
| 5,903,830 A | 5/1999 | Joao |
| 5,943,624 A | 8/1999 | Fox |
| 5,963,924 A | 10/1999 | Williams |
| 6,064,990 A | 5/2000 | Goldsmith |
| 6,092,053 A | 7/2000 | Boesch |
| 6,202,052 B1 | 3/2001 | Miller |
| 6,202,933 B1 | 3/2001 | Poore |
| 6,263,447 B1 | 7/2001 | French |
| 6,267,292 B1 | 7/2001 | Walker |
| 6,336,099 B1 | 1/2002 | Barnett |
| 6,473,500 B1 | 10/2002 | Risafi |
| 6,529,725 B1 | 3/2003 | Joao |
| 6,535,855 B1 | 3/2003 | Cahill |
| 6,601,761 B1 | 8/2003 | Katis |
| 6,735,572 B2 | 5/2004 | Landesmann |
| 6,853,982 B2 | 2/2005 | Smith |
| 6,857,073 B2 | 2/2005 | French |
| 6,873,974 B1 | 3/2005 | Schutzer |
| 6,898,598 B2 | 5/2005 | Himmel |
| 6,915,271 B1* | 7/2005 | Meyer ............... G06Q 30/02 705/14.35 |
| 6,934,528 B2 | 8/2005 | Loureiro |
| 6,999,943 B1 | 2/2006 | Johnson |
| 7,024,383 B1 | 4/2006 | Mancini |
| 7,028,052 B2 | 4/2006 | Chapman |
| 7,047,041 B2 | 5/2006 | Vanska |
| 7,051,002 B2 | 5/2006 | Keresman, III |
| 7,089,208 B1 | 8/2006 | Levchin |
| 7,096,003 B2 | 8/2006 | Joao |
| 7,111,789 B2 | 9/2006 | Rajasekaran |
| 7,155,411 B1 | 12/2006 | Blinn |
| 7,177,848 B2 | 2/2007 | Hogan |
| 7,194,437 B1 | 3/2007 | Britto |
| 7,206,847 B1 | 4/2007 | Alberth |
| 7,212,979 B1 | 5/2007 | Matz |
| RE39,736 E | 7/2007 | Morrill |
| 7,268,667 B2 | 9/2007 | Beenau |
| 7,268,668 B2 | 9/2007 | Beenau |
| 7,290,704 B1 | 11/2007 | Ball |
| 7,318,049 B2 | 1/2008 | Iannacci |
| 7,337,119 B1 | 2/2008 | Geschwender |
| 7,337,144 B1 | 2/2008 | Blinn |
| 7,343,149 B2 | 3/2008 | Benco |
| 7,343,351 B1 | 3/2008 | Bishop |
| 7,349,885 B2 | 3/2008 | Gangi |
| 7,356,505 B2 | 4/2008 | March |
| 7,357,310 B2 | 4/2008 | Calabrese |
| 7,359,880 B2 | 4/2008 | Abel |
| 7,373,669 B2 | 5/2008 | Eisen |
| 7,379,899 B1 | 5/2008 | Junger |
| 7,392,222 B1 | 6/2008 | Hamilton |
| 7,395,242 B2 | 7/2008 | Blinn |
| 7,398,250 B2 | 7/2008 | Blinn |
| 7,413,113 B1 | 8/2008 | Zhu |
| 7,450,966 B2 | 11/2008 | Vanska |
| 7,477,780 B2 | 1/2009 | Boncyk |
| 7,499,889 B2 | 3/2009 | Golan |
| 7,500,607 B2 | 3/2009 | Williams |
| 7,533,064 B1 | 5/2009 | Boesch |
| 7,536,360 B2 | 5/2009 | Stolfo |
| 7,571,139 B1 | 8/2009 | Giordano |
| 7,571,140 B2 | 8/2009 | Weichert |
| 7,593,858 B2 | 9/2009 | Matz |
| 7,603,311 B1 | 10/2009 | Yadav-Ranjan |
| 7,630,937 B1 | 12/2009 | Mo |
| 7,634,295 B2 | 12/2009 | Hayaashi |
| 7,644,037 B1 | 1/2010 | Ostrovsky |
| 7,644,859 B1 | 1/2010 | Zhu |
| 7,660,749 B2 | 2/2010 | Koski |
| 7,676,434 B2 | 3/2010 | Evans |
| 7,685,067 B1 | 3/2010 | Britto |
| 7,698,221 B2 | 4/2010 | Blinn |
| 7,707,113 B1 | 4/2010 | Dimartino |
| 7,708,194 B2 | 5/2010 | Vawter |
| 7,708,198 B2 | 5/2010 | Gangi |
| 7,712,658 B2 | 5/2010 | Gangi |
| 7,739,194 B2 | 6/2010 | Blinn |
| 7,742,984 B2 | 6/2010 | Mohsenzadeh |
| 7,774,076 B2 | 8/2010 | Skowronek |
| 7,783,569 B2 | 8/2010 | Abel |
| 7,784,684 B2 | 8/2010 | Labrou |
| 7,801,829 B2 | 9/2010 | Gray |
| 7,802,719 B2 | 9/2010 | Johnson |
| 7,810,720 B2 | 10/2010 | Lovett |
| 7,819,307 B2 | 10/2010 | Lyons |
| 7,828,206 B2 | 11/2010 | Hessburg |
| 7,828,992 B2 | 11/2010 | Kilickiran |
| 7,837,125 B2 | 11/2010 | Biskupski |
| 7,844,530 B2 | 11/2010 | Ziade |
| 7,849,014 B2 | 12/2010 | Erikson |
| 7,870,027 B1 | 1/2011 | Tannenbaum |
| 7,877,299 B2 | 1/2011 | Bui |
| 7,878,400 B2 | 2/2011 | Harris |
| 7,890,370 B2 | 2/2011 | Whitsitt |
| 7,895,119 B2 | 2/2011 | Praisner |
| 7,899,744 B2 | 3/2011 | Bishop |
| 7,904,360 B2 | 3/2011 | Evans |
| 7,908,227 B2 | 3/2011 | Zizzimopoulos |
| 7,926,714 B1 | 4/2011 | Zhu |
| 7,933,779 B2 | 4/2011 | Rooks |
| 7,942,337 B2 | 5/2011 | Jain |
| 7,962,418 B1 | 6/2011 | Wei |
| 7,967,196 B1 | 6/2011 | Bierbaum |
| 7,971,782 B1 | 7/2011 | Shams |
| 7,996,259 B1 | 8/2011 | Distefano, III |
| 8,016,192 B2 | 9/2011 | Messerges |
| 8,020,763 B1 | 9/2011 | Kowalchyk |
| 8,024,260 B1 | 9/2011 | Hogl |
| 8,028,041 B2 | 9/2011 | Olliphant |
| 8,032,438 B1 | 10/2011 | Barton |
| 8,041,338 B2 | 10/2011 | Chen |
| 8,050,997 B1 | 11/2011 | Nosek |
| 8,060,413 B2 | 11/2011 | Castell |
| 8,074,876 B2 | 12/2011 | Foss |
| 8,108,261 B2 | 1/2012 | Carlier |
| 8,127,982 B1 | 3/2012 | Casey |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |

(56) References Cited

U.S. PATENT DOCUMENTS

| | | |
|---|---|---|
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkelman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,175,235 B2 | 5/2012 | Mumford |
| 8,175,965 B2 | 5/2012 | Moore |
| 8,175,967 B2 | 5/2012 | OLeary |
| 8,175,968 B2 | 5/2012 | OLeary |
| 8,175,975 B2 | 5/2012 | Cai |
| 8,175,979 B2 | 5/2012 | Baentsch |
| 8,176,416 B1 | 5/2012 | Williams |
| 8,179,563 B2 | 5/2012 | King |
| 8,180,289 B1 | 5/2012 | Glickman |
| 8,180,705 B2 | 5/2012 | Kowalchyk |
| 8,190,513 B2 | 5/2012 | Felger |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,200,582 B1 | 6/2012 | Zhu |
| 8,204,774 B2 | 6/2012 | Chwast |
| 8,204,829 B2 | 6/2012 | Alvarez |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,275,704 B2 | 9/2012 | Bishop |
| 8,280,777 B2 | 10/2012 | Mengerink |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,371,502 B1 | 2/2013 | Galit |
| 8,380,177 B2 | 2/2013 | Laracey |
| 8,401,904 B1 | 3/2013 | Simakov |
| 8,412,586 B1 | 4/2013 | Foulser |
| 8,412,630 B2 | 4/2013 | Ross |
| 8,417,633 B1 | 4/2013 | Chmara |
| 8,423,462 B1 | 4/2013 | Amacker |
| 2001/0037297 A1 | 3/2001 | McNair |
| 2001/0056359 A1 | 12/2001 | Abreu |
| 2002/0010627 A1 | 1/2002 | Lerat |
| 2002/0040325 A1 | 4/2002 | Takae |
| 2002/0077976 A1 | 6/2002 | Meyer |
| 2002/0107755 A1 | 8/2002 | Steed |
| 2002/0112014 A1 | 8/2002 | Bennett |
| 2002/0116271 A1 | 8/2002 | Mankoff |
| 2002/0143614 A1 | 10/2002 | MacLean |
| 2003/0014307 A1 | 1/2003 | Heng |
| 2003/0026404 A1 | 2/2003 | Joyce |
| 2003/0028481 A1 | 2/2003 | Flitcroft |
| 2003/0080185 A1 | 5/2003 | Werther |
| 2003/0097318 A1 | 5/2003 | Yu |
| 2003/0101134 A1 | 5/2003 | Liu |
| 2003/0139975 A1* | 7/2003 | Perkowski ............ G06Q 30/02 705/14.73 |
| 2003/0174823 A1 | 9/2003 | Justice |
| 2003/0177361 A1 | 9/2003 | Wheeler |
| 2003/0191711 A1 | 10/2003 | Jamison |
| 2003/0200142 A1 | 10/2003 | Hicks |
| 2003/0200184 A1 | 10/2003 | Dominguez |
| 2003/0212642 A1 | 11/2003 | Weller |

(56) References Cited

U.S. PATENT DOCUMENTS

| | | |
|---|---|---|
| 2004/0078332 A1 | 4/2004 | Ferguson |
| 2004/0103037 A1 | 5/2004 | Wetmore |
| 2004/0128197 A1 | 7/2004 | Bam |
| 2004/0138999 A1 | 7/2004 | Friedman |
| 2004/0148255 A1 | 7/2004 | Beck |
| 2004/0215963 A1 | 10/2004 | Kaplan |
| 2004/0230536 A1 | 11/2004 | Fung |
| 2004/0236646 A1 | 11/2004 | Wu |
| 2004/0254891 A1 | 12/2004 | Blinn |
| 2004/0267608 A1 | 12/2004 | Mansfield |
| 2005/0010483 A1 | 1/2005 | Ling |
| 2005/0037735 A1 | 2/2005 | Courts |
| 2005/0037779 A1 | 2/2005 | Ma |
| 2005/0065819 A1 | 3/2005 | Pamela |
| 2005/0080747 A1 | 4/2005 | Anderson |
| 2005/0080821 A1 | 4/2005 | Breil |
| 2005/0097320 A1 | 5/2005 | Golan |
| 2005/0102227 A1 | 5/2005 | Solonchev |
| 2005/0137969 A1 | 6/2005 | Shah |
| 2005/0171894 A1 | 8/2005 | Traynor |
| 2005/0192893 A1 | 9/2005 | Keeling |
| 2005/0192895 A1 | 9/2005 | Rogers |
| 2005/0220326 A1 | 10/2005 | Sim |
| 2005/0234817 A1 | 10/2005 | VanFleet |
| 2005/0246278 A1 | 11/2005 | Gerber |
| 2005/0254714 A1 | 11/2005 | Anne |
| 2005/0261967 A1 | 11/2005 | Barry |
| 2006/0053056 A1 | 3/2006 | Alspach-Goss |
| 2006/0085328 A1 | 4/2006 | Cohen |
| 2006/0085477 A1 | 4/2006 | Phillips |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano |
| 2006/0190347 A1 | 8/2006 | Cuervo |
| 2006/0226216 A1 | 10/2006 | Keithley |
| 2006/0277143 A1 | 12/2006 | Almonte |
| 2006/0293947 A1 | 12/2006 | Nicholson |
| 2007/0011025 A1 | 1/2007 | Cracchiolo |
| 2007/0038515 A1 | 2/2007 | Postrel |
| 2007/0038516 A1 | 2/2007 | Apple |
| 2007/0055571 A1 | 3/2007 | Fox |
| 2007/0087820 A1 | 4/2007 | Van |
| 2007/0094066 A1 | 4/2007 | Kumar |
| 2007/0100691 A1 | 5/2007 | Patterson |
| 2007/0100728 A1 | 5/2007 | Rotman |
| 2007/0106607 A1 | 5/2007 | Seib |
| 2007/0113289 A1 | 5/2007 | Blumenau |
| 2007/0143204 A1 | 6/2007 | Claus |
| 2007/0150413 A1 | 6/2007 | Morgenstern |
| 2007/0180119 A1 | 8/2007 | Khivesara |
| 2007/0208662 A1 | 9/2007 | Jeronimus |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0239502 A1 | 10/2007 | Babu |
| 2007/0276765 A1 | 11/2007 | Hazel |
| 2008/0004116 A1 | 1/2008 | Van |
| 2008/0004952 A1 | 1/2008 | Koli |
| 2008/0010096 A1 | 1/2008 | Patterson |
| 2008/0021829 A1 | 1/2008 | Kranzley |
| 2008/0077489 A1 | 3/2008 | Gilley |
| 2008/0086365 A1 | 4/2008 | Zollino |
| 2008/0091553 A1 | 4/2008 | Koski |
| 2008/0091616 A1 | 4/2008 | Helwin |
| 2008/0097856 A1 | 4/2008 | Blagg |
| 2008/0114737 A1 | 5/2008 | Neely |
| 2008/0126145 A1 | 5/2008 | Racklet, III |
| 2008/0133351 A1 | 6/2008 | White |
| 2008/0140568 A1 | 6/2008 | Henry |
| 2008/0147883 A1 | 6/2008 | Philyaw |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0223918 A1 | 9/2008 | Williams |
| 2008/0270300 A1 | 10/2008 | Jones |
| 2008/0272188 A1 | 11/2008 | Keithley |
| 2008/0319905 A1 | 12/2008 | Carlson |
| 2009/0006181 A1 | 1/2009 | Ghosh |
| 2009/0024527 A1 | 1/2009 | Sellen |
| 2009/0037255 A1 | 2/2009 | Chiu |
| 2009/0048934 A1 | 2/2009 | Haddad |
| 2009/0061884 A1 | 3/2009 | Rajan |
| 2009/0063261 A1 | 3/2009 | Scribner |
| 2009/0064056 A1 | 3/2009 | Anderson |
| 2009/0076953 A1 | 3/2009 | Saville |
| 2009/0076966 A1 | 3/2009 | Bishop |
| 2009/0089176 A1 | 4/2009 | McCabe |
| 2009/0089193 A1 | 4/2009 | Paintin |
| 2009/0104888 A1 | 4/2009 | Cox |
| 2009/0106151 A1 | 4/2009 | Nelsen |
| 2009/0119176 A1 | 5/2009 | Johnson |
| 2009/0119211 A1 | 5/2009 | Johnson |
| 2009/0132347 A1 | 5/2009 | Anderson |
| 2009/0132395 A1 | 5/2009 | Lam |
| 2009/0144104 A1 | 6/2009 | Johnson |
| 2009/0164344 A1 | 6/2009 | Shiftan |
| 2009/0171778 A1 | 7/2009 | Powell |
| 2009/0182664 A1 | 7/2009 | Trombley |
| 2009/0210300 A1 | 8/2009 | Cansler |
| 2009/0222347 A1 | 9/2009 | Whitten |
| 2009/0233579 A1 | 9/2009 | Castell |
| 2009/0234751 A1 | 9/2009 | Chan |
| 2009/0241159 A1 | 9/2009 | Campagna |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271265 A1 | 10/2009 | Lay |
| 2009/0288012 A1 | 11/2009 | Hertel |
| 2009/0307135 A1 | 12/2009 | Gupta |
| 2009/0313132 A1 | 12/2009 | McKenna |
| 2009/0319368 A1* | 12/2009 | Reardon ............... G06Q 20/10 705/14.51 |
| 2009/0327045 A1 | 12/2009 | Olives |
| 2009/0327088 A1 | 12/2009 | Puthupparambil |
| 2010/0004989 A1 | 1/2010 | Bonalle |
| 2010/0005025 A1 | 1/2010 | Kumar |
| 2010/0009663 A1 | 1/2010 | Chang |
| 2010/0010964 A1 | 1/2010 | Skowronek |
| 2010/0023386 A1 | 1/2010 | Avisar |
| 2010/0023455 A1 | 1/2010 | Dispensa |
| 2010/0036741 A1 | 2/2010 | Cleven |
| 2010/0036775 A1 | 2/2010 | Edens |
| 2010/0042456 A1 | 2/2010 | Stinchcombe |
| 2010/0042537 A1 | 2/2010 | Smith |
| 2010/0042540 A1 | 2/2010 | Graves |
| 2010/0049613 A1 | 2/2010 | Angles |
| 2010/0049879 A1 | 2/2010 | Leavitt |
| 2010/0063903 A1 | 3/2010 | Whipple |
| 2010/0076873 A1 | 3/2010 | Taylor |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0094730 A1 | 4/2010 | Koski |
| 2010/0100480 A1 | 4/2010 | Altman |
| 2010/0121707 A1 | 5/2010 | Goeldi |
| 2010/0125492 A1 | 5/2010 | Lin |
| 2010/0125495 A1 | 5/2010 | Smith |
| 2010/0125803 A1 | 5/2010 | Johnson |
| 2010/0131347 A1 | 5/2010 | Sarptipi |

(56) References Cited

U.S. PATENT DOCUMENTS

| | | |
|---|---|---|
| 2010/0131415 A1 | 5/2010 | Sartipi |
| 2010/0155470 A1 | 6/2010 | Woronec |
| 2010/0161433 A1 | 6/2010 | White |
| 2010/0174599 A1 | 7/2010 | Rosenblatt |
| 2010/0185505 A1 | 7/2010 | Sprogoe |
| 2010/0185531 A1 | 7/2010 | Van |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D |
| 2010/0211499 A1 | 8/2010 | Zanzot |
| 2010/0217682 A1 | 8/2010 | Chan |
| 2010/0250351 A1 | 9/2010 | Gillenson |
| 2010/0276484 A1 | 11/2010 | Banerjee |
| 2010/0305848 A1 | 12/2010 | Stallman |
| 2010/0306075 A1 | 12/2010 | Drance |
| 2010/0306113 A1 | 12/2010 | Grey |
| 2010/0312635 A1 | 12/2010 | Cervenka |
| 2010/0312645 A1 | 12/2010 | Niekadlik |
| 2010/0312676 A1 | 12/2010 | Muthukumaran |
| 2010/0332262 A1 | 12/2010 | Horvitz |
| 2010/0332283 A1 | 12/2010 | Ng |
| 2011/0029363 A1 | 2/2011 | Gillenson |
| 2011/0047075 A1 | 2/2011 | Fourez |
| 2011/0054993 A1 | 3/2011 | Marshall |
| 2011/0078082 A1 | 3/2011 | Gupta |
| 2011/0082789 A1 | 4/2011 | Boyd |
| 2011/0099057 A1 | 4/2011 | Tenyer |
| 2011/0105183 A1 | 5/2011 | Hsiao |
| 2011/0106698 A1 | 5/2011 | Issacson |
| 2011/0137742 A1 | 6/2011 | Parikh |
| 2011/0178896 A1 | 7/2011 | Nakajima |
| 2011/0184827 A1 | 7/2011 | Hubert |
| 2011/0191166 A1 | 8/2011 | Joa |
| 2011/0215146 A1 | 9/2011 | Shams |
| 2011/0218870 A1 | 9/2011 | Shams |
| 2011/0246290 A1 | 10/2011 | Howard |
| 2011/0258123 A1 | 10/2011 | Dawkins |
| 2011/0296508 A1 | 12/2011 | Os |
| 2011/0320344 A1 | 12/2011 | Faith |
| 2012/0011063 A1 | 1/2012 | Killian |
| 2012/0022943 A1 | 1/2012 | Howard |
| 2012/0023026 A1 | 1/2012 | Chen |
| 2012/0030101 A1 | 2/2012 | Boyd |
| 2012/0036071 A1 | 2/2012 | Fulton |
| 2012/0084204 A1 | 4/2012 | Castell |
| 2012/0095895 A1 | 4/2012 | Aston |
| 2012/0101881 A1 | 4/2012 | Taylor |
| 2012/0116966 A1 | 5/2012 | Tan |
| 2012/0118950 A1 | 5/2012 | Belk |
| 2012/0123838 A1 | 5/2012 | Sparks |
| 2012/0136780 A1 | 5/2012 | El-Awady |
| 2012/0158474 A1 | 6/2012 | Fahner |
| 2012/0166333 A1 | 6/2012 | von Behren |
| 2012/0173431 A1 | 7/2012 | Ritchie |
| 2012/0190386 A1 | 7/2012 | Anderson |
| 2012/0209677 A1* | 8/2012 | Mehta .................. G06Q 20/12 705/14.16 |
| 2012/0215640 A1 | 8/2012 | Ramer |
| 2012/0215650 A1 | 8/2012 | Oba |
| 2012/0221421 A1 | 8/2012 | Hammad |
| 2012/0221502 A1 | 8/2012 | Jerram |
| 2012/0231844 A1 | 9/2012 | Coppinger |
| 2012/0259763 A1 | 10/2012 | Pessin |
| 2012/0271697 A1 | 10/2012 | Gilman |
| 2012/0304273 A1 | 11/2012 | Bailey |
| 2012/0310826 A1 | 12/2012 | Chatterjee |
| 2012/0316949 A1 | 12/2012 | Chen |
| 2012/0323664 A1 | 12/2012 | Klems |
| 2013/0090750 A1 | 4/2013 | Herrman |

FOREIGN PATENT DOCUMENTS

| | | |
|---|---|---|
| KR | 100432430 B1 | 5/2004 |
| KR | 20060117177 A | 11/2006 |
| KR | 20070104087 A | 10/2007 |
| WO | 0165502 A2 | 9/2001 |
| WO | 03023674 A1 | 3/2003 |
| WO | 2010148737 A1 | 12/2010 |

OTHER PUBLICATIONS

David Breitkopf, "ACS to Take Over Mich. WC Distribution Program", American Banker, New York, NY: Jul. 20, 2006, vol. 171. Issue 138, p. 6.

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

Gopalan, NP & Selvan, B Siva. TCP/IP Illustrated. Prentice-Hall. 2008. pp. 101-102, 175-176 and 235. 7 pages.

Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?arnumber=5369384, pp. 449-452.

International Search Report for PCT/US09/54921 dated Oct. 21, 2009. (2 pages).

International Search Report and Written Opinion for PCT/US2010/033229 dated Dec. 29, 2010. (8 pages).

International Search Report and Written Opinion for PCT/US2010/041860 dated Feb. 1, 2011. (9 pages).

International Search Report for PCT/US11/49393 dated Dec. 5, 2011. (2 pages).

International Search Report and Written Opinion for PCT/US11/57179 dated Jan. 5, 2012. (7 pages).

International Search Report and Written Opinion for PCT/US11/57173 dated Mar. 15, 2012. (11 pages).

International Search Report and Written Opinion for PCT/US2012/026205, dated May 29, 2012. 8 pages.

International Search Report for PCT/US11/65305 dated Apr. 16, 2012. 2 pages.

International Search Report for PCT/US12/23856 dated Jun. 6, 2012. 3 pages.

International Search Report for PCT/US12/24772 dated Jul. 24, 2012. 3 pages.

International Search Report for PCT/US12/25530 dated Aug. 7, 2012. 4 pages.

International Search Report PCT/US12/27620 dated Aug. 10, 2012. 3 pages.

International Search Report and Written Opinion for PCT/US12/41437 dated Aug. 24, 2012. (11 pages).

International Search Report for PCT/US12/39638 dated Sep. 24, 2012. 4 pages.

International Search Report for PCT/US12/45875 dated Nov. 16, 2012. 4 pages.

International Search Report and Written Opinion for PCT/US12/47092 dated Nov. 26, 2012. 11 pages.

International Search Report for PCT/US12/57577 dated Nov. 29, 2012. 2 pages.

International Search Report and Written Opinion for PCT/US2010/048344 dated Nov. 15, 2010. (9 pages).

International Search Report and Written Opinion for PCT/US12/57528 dated Dec. 17, 2012. 8 pages.

International Search Report and Written Opinion for PCT/US12/66898 dated Feb. 11, 2013. 14 pages.

International Search Report and Written Opinion for PCT/US12/56759 dated Feb. 25, 2013. 12 pages.

International Search Report and Written Opinion for PCT/US2013/020411 dated May 21, 2013. 18 pages.

International Search Report and Written Opinion for PCT/US2013/024538, dated May 31, 2013. 15 pages.

(56) References Cited

OTHER PUBLICATIONS

International Search Report and Written Opinion, dated Jul. 24, 2012 for PCT/US12/24772, filed Feb. 10, 2012.
International Search Report and Written Opinion for PCT/US2010/033861 dated Dec. 9, 2010 (7 pages).
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report and Written Opinion for PCT/US2011/024941 dated Apr. 19, 2011 (6 pages).
International Search Report and Written Opinion for PCT/US2010/046833 dated Apr. 26, 2011 (8 pages).
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report for PCT/US2011/035268 dated Aug. 5, 2011 (3 pages).
International Search Report and Written Opinion for PCT/US2011/032093 dated Aug. 24, 2011 (11 pages).
International Search Report and Writtten Opinion for PCT/US2011/039178 dated Sep. 16, 2011 (7 pages).
International Search Report and Written Opinion issued in connection with PCT/US11/42062 dated Sep. 29, 2011 (8 pages).
International Search Report and Written Opinion for PCT/US11/57180 dated Mar. 15, 2012 (11 pages).
International Search Report for PCT/US12/21000 dated May 15, 2012. 2 pages.
International Search Report and Written Opinion for PCT/US12/37597 dated Sep. 21, 2012 (11 pages).
International Search Report and Written Opinion for PCT/US12/55636 dated Nov. 30, 2012. 2 pages.
International Search Report and Written Opinion for PCT/US2012/045601 dated Feb. 1, 2013. 11 pages.
International Search Report and Written Opinion for PCT/US2012/069557 dated Feb. 22, 2013. 8 pages.
International Search Report and Written Opinion for PCT/US12/65738 dated Apr. 19, 2013. 9 pages.
International Search Report and Written Opinion for PCT/US2012/027043 dated Jul. 13, 2012. 15 pages.

\* cited by examiner

Example: Electronic Coupon Issuance And Redemption ("ECIR")

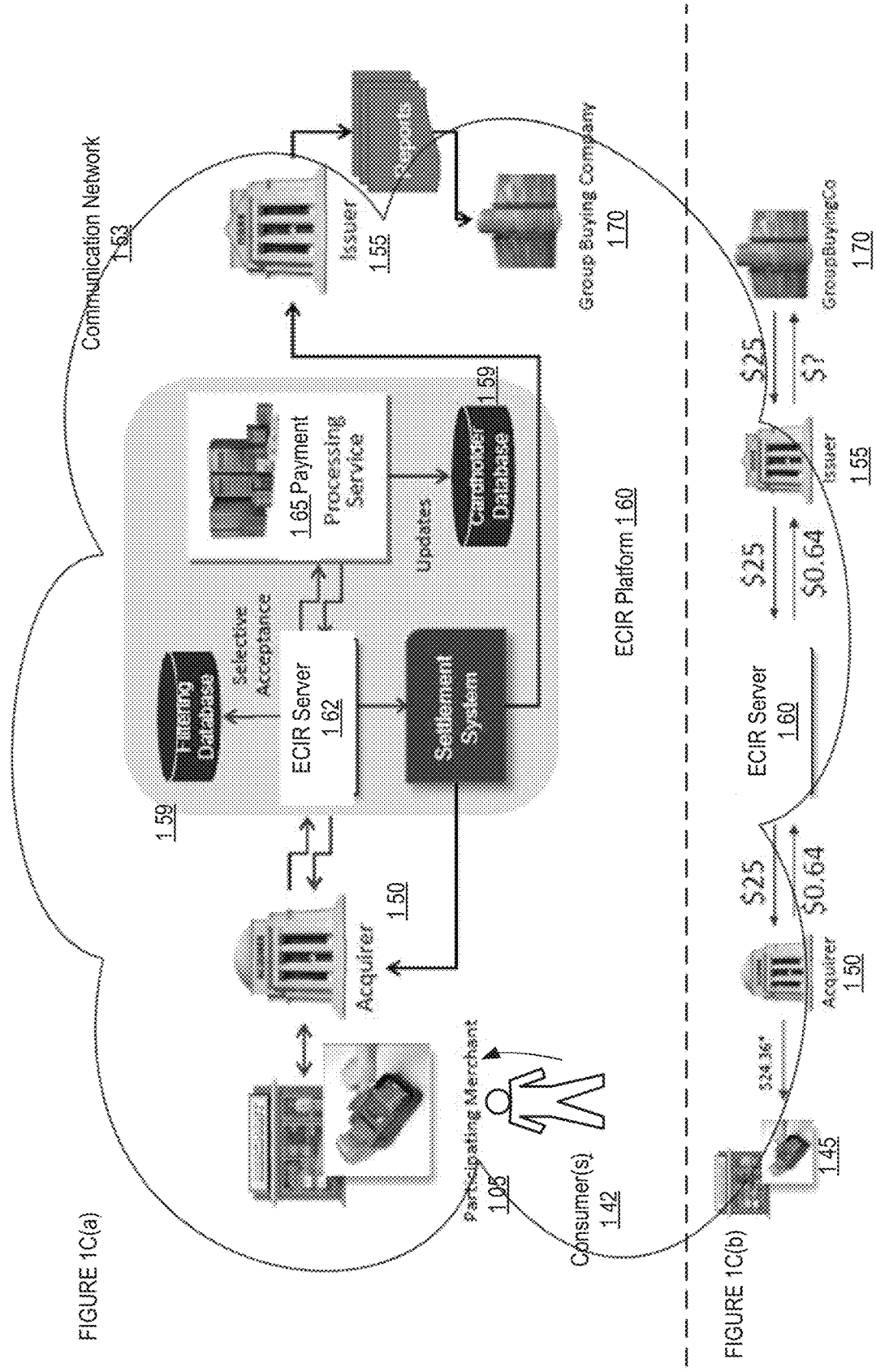

Example: Coupon Funds Loading From GBC component

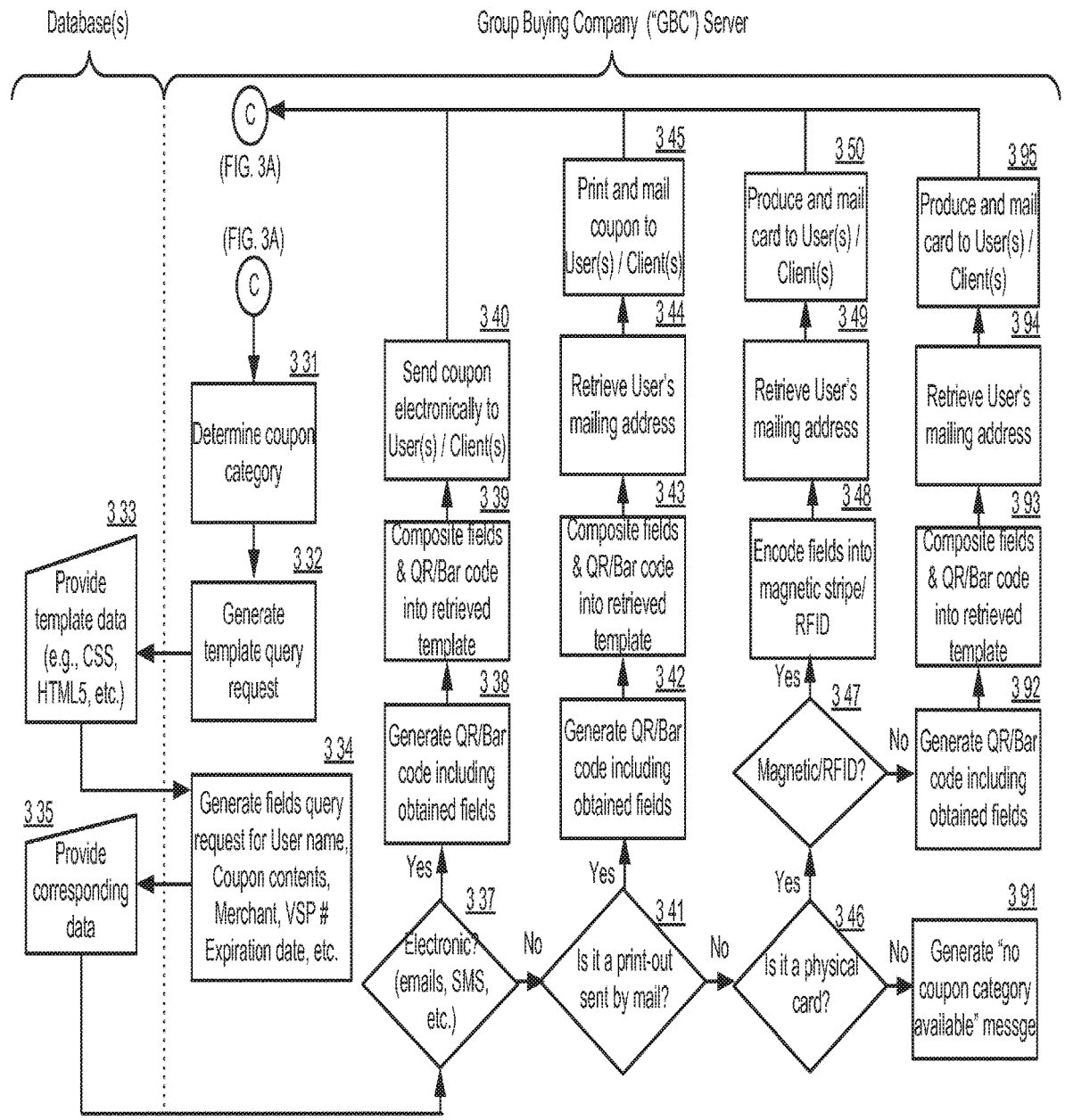
FIGURE 3E — Example: Coupon Generation component

Example: Coupon Redemption By Coupon Pan component

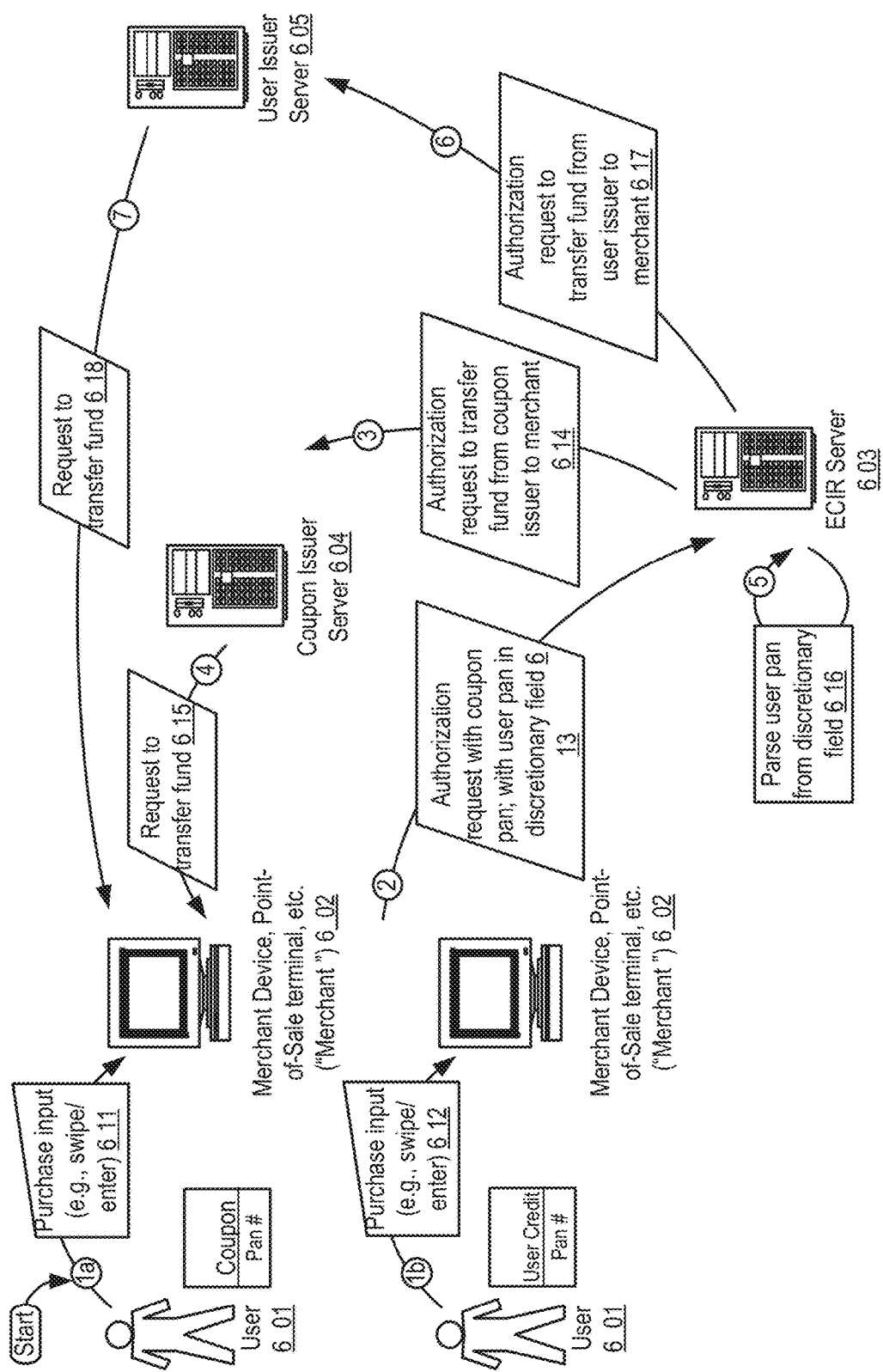
FIGURE 6A    Example: Coupon Redemption By Coupon Pan And User Pan component

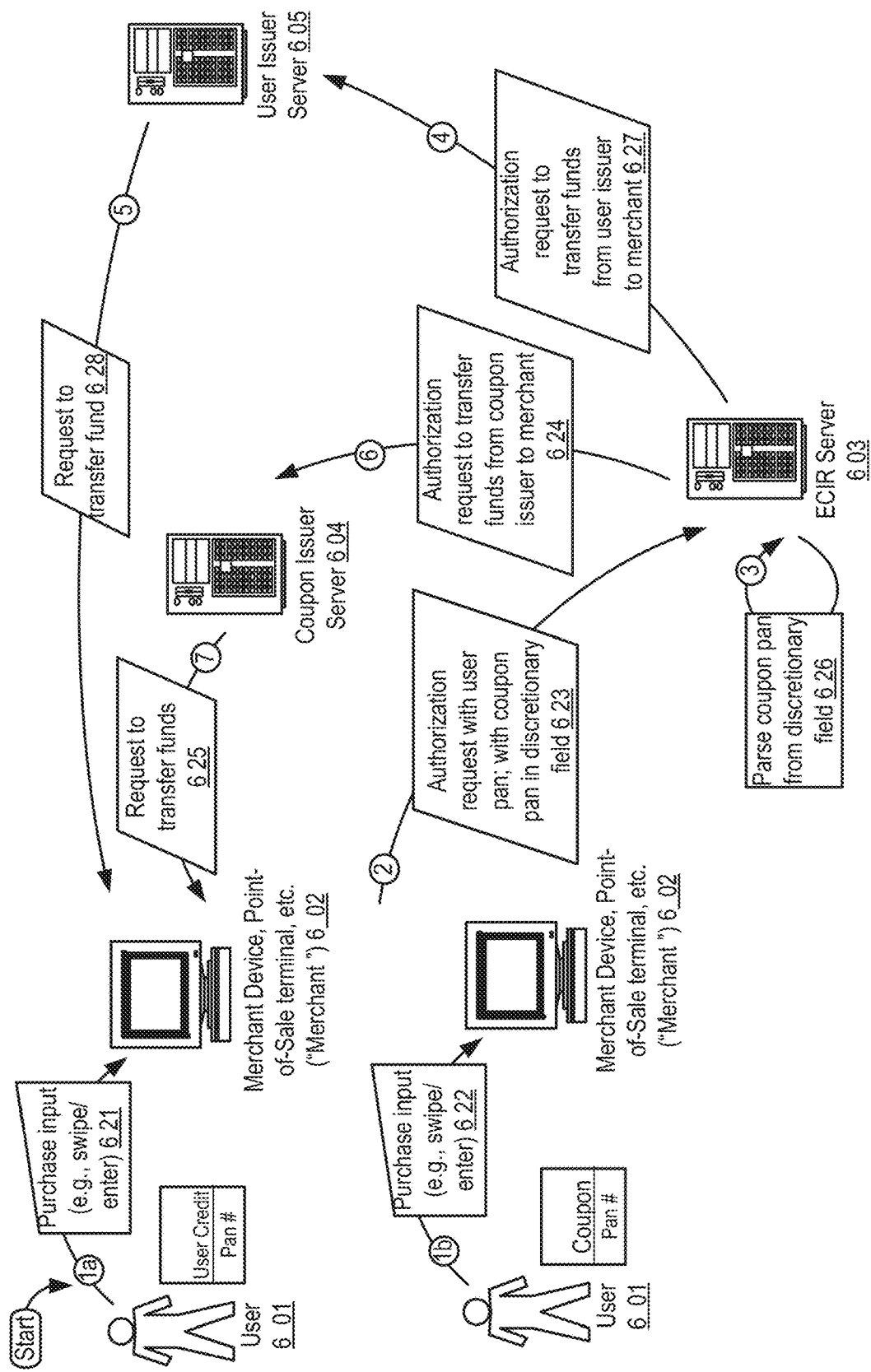
FIGURE 6B  Example: Coupon Redemption By Coupon Pan And User Pan component Example: Coupon Redemption By Coupon Pan And User Pan component Example Data Flow: Coupon Funds Settlement component Example: Coupon Funds Settlement component Example: Customer Purchase Analytics component Example: Customer Purchase Analytics component Example: Virtual Wallet Mobile App - Snap Mode

US 10,621,605 B2

ELECTRONIC COUPON ISSUANCE AND REDEMPTION APPARATUSES, METHODS AND SYSTEMS

RELATED APPLICATIONS

This application is a continuation of U.S. patent application Ser. No. 13/391,006, filed Jan. 23, 2013, which is a national phase entry of International Application No. PCT/US12/24772, filed Feb. 10, 2012, which claims priority to U.S. provisional patent application Ser. No. 61/441,555 filed Feb. 10, 2011.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to electronic payment, and more particularly, to ELECTRONIC COUPON ISSUANCE AND REDEMPTION APPARATUSES, METHODS AND SYSTEMS.

BACKGROUND

Consumers may use a coupon to purchase products with a merchant. For example, a consumer may present a paper coupon to a cashier at a point of sale (POS) terminal at a merchant store in order to get a discount on a purchase. The cashier may charge the consumer an amount equivalent to the original price of the product minus a discount amount specified by the coupon. The merchant store may recover the discounted amount from a coupon provider.

BRIEF DESCRIPTION OF THE DRAWINGS

The accompanying appendices and/or drawings illustrate various non-limiting, example, innovative aspects in accordance with the present descriptions:

FIGS. 1A-D show block diagrams illustrating various exemplary embodiments of the ECIR;

FIGS. 3A-E show logic flow diagrams illustrating various example embodiments of the ECIR;

FIGS. 6A-C show data flow diagrams illustrating example aspects of coupon redemption by two accounts at the same time: the coupon account and the user's personal account (e.g., user's credit card, etc.) in various embodiments of the ECIR;

Figure 1A:
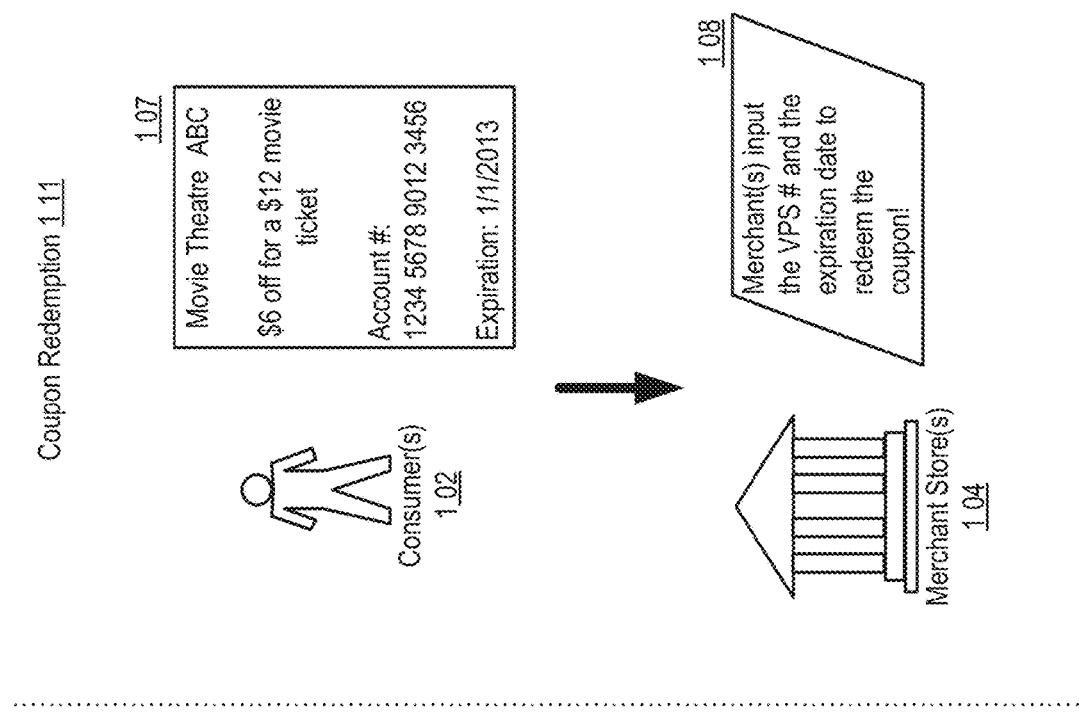
Figure 1A:
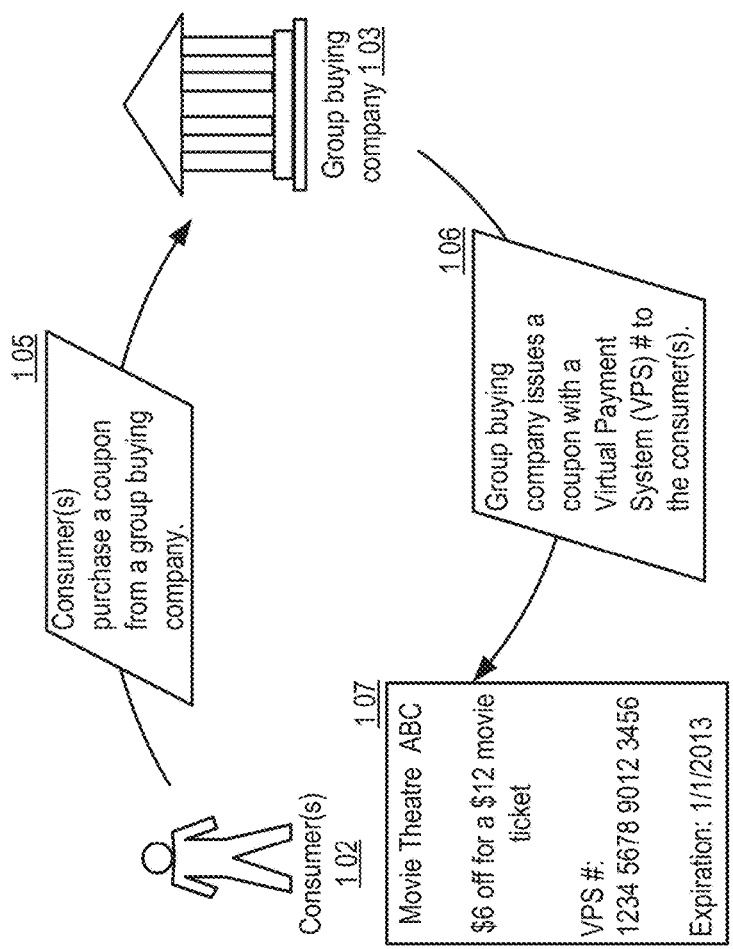

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

ELECTRONIC COUPON ISSUANCE AND REDEMPTION APPARATUSES, METHODS AND SYSTEMS (hereinafter "ECIR") transforms user coupon purchase and redemption request inputs via ECIR components into coupon issuance, transaction, and analytics outputs. The ECIR also provides a platform for social network coupon issuance, redemption, authentication, and payment authorization, clearance, and settlement.

In one embodiment, coupons, offers, rewards, and/or the like ("coupon"), issued by different entities (e.g., group buying companies, social network program, and/or the like ("GBC")) may require consumers to pay in advance to purchase the coupon before the coupon can be redeemed at a merchant store. For example, a consumer may see an advertisement at a group buying company's ("GBC") website for "pay only $6 for a $12 movie ticket at Movie Theatre ABC," and may pay a fee to purchase the coupon to redeem it later at the theatre. Upon paying the $6, the consumer may receive the coupon via emails which includes the details of the coupon. When redeeming the coupon at the merchant, the theatre may type in the details of the coupon into the merchant's client devices (e.g., a Point of Sale ("POS") terminal). If the coupon has not been redeemed before, the merchant may receive an approval and the consumer may receive the movie ticket. In some implementations, the coupon may be text-messaged to the consumer, sent to the consumer's mobile device application, and/or mailed to the consumer's address in paper or in other physical forms (e.g., cards). In some implementations, a coupon may be displayed in a newspaper, magazine, website, video content, and/or the like. The coupon may include a Quick-Response (QR), barcode and/or like code encoding information about the coupon (e.g., merchant name, product type, offer details, expiry date, redeemable stores, conditions for redemption, and/or the like). A consumer desiring to acquire the coupon may utilize a consumer device (e.g., smartphone, laptop, tablet computer, etc.) including an image capture device (e.g., camera, webcam, etc.) to snap a picture of the code. The consumer device may, in some implementations, extract the information embedded in the code. In some implementations, the consumer device may be associated with a virtual wallet account of the consumer. In such implementations, the consumer device may add the coupon to the virtual wallet account of the consumer, for immediate or later use, for sharing with others, to use as a seed for searching for other relevant coupons, etc.

In one embodiment, the ECIR server may generate a prepaid account associated with each coupon. The prepaid account may be in the form of an account number (e.g., a Virtual Payment System ("VPS") number, a barcode, a Quick Response ("QR") code, etc.), a physical card with an account number, a physical card with magnetic stripe, a physical card with Radio-frequency Identification ("RFID"), and/or the like ("account", "prepaid account", "prepaid coupon account" or "coupon account"). When the consumer receives the coupon, which may be electronic, in paper, or by mail, it may also include the prepaid account information.

In one embodiment, the prepaid account may be associated with a specific consumer and used for different coupons with different merchants. In another embodiment, the prepaid account may be unique for each coupon and each consumer. It may be redeemed only once.

In one embodiment, when the consumer redeems the coupon at the merchant for goods and/or services, merchant employees may type the prepaid account VPS number (or swipe the card if the physical card has a magnetic stripe) into the POS terminal or other merchant devices. If the value associated with the offer hasn't yet been redeemed, the merchant may receive an approval through the ECIR payment system and funds may be transferred from the prepaid account to the merchant, in which way real-time payments, settlement and reporting may be facilitated.

In an alternative embodiment, the consumer may use a camera-enabled mobile phone to scan the QR code or the barcode associated with the coupon. The QR code or the barcode may be provided when coupon is made available electronically, in paper, and/or the like. Upon scanning the code, the consumer's mobile phone may retrieve the information related to the coupon and redeem the coupon by providing the mobile phone page to the merchant.

In another embodiment, the consumer may choose not to deposit fund into the prepaid account. The coupon may be delivered to the consumer free of charge. Upon redemption, merchant may swipe the consumer's personal charge card (e.g., credit card, debit card, gift card, etc.) and type into the discretionary field the amount of the discounted value in the coupon. Therefore, the consumer may be charged only by the amount in difference. In the example of the movie ticket coupon, the consumer may receive the coupon free of charge and present the coupon to the movie theatre employee. The employee may charge the consumer's credit card for the $12 movie ticket. In the discretionary field of the payment processing user interface, the employee may type in the discounted amount of $6. The consumer's credit card may be charged a net amount of $6 for the movie ticket.

In yet another embodiment, the consumer may receive the coupon free of charge. The prepaid account associated with the coupon may be deposited with a value by the coupon issuer entity and/or the like. The merchant may charge the original value (e.g., $12 for the movie ticket) to the consumer's personal charge card. The merchant may type the prepaid account VPS number (or swipe the card if the physical card has a magnetic stripe) into the POS terminal, and credit the coupon value (e.g., $6) back to the consumer's personal charge card.

In one embodiment, if customers choose to participate and enroll, the ECIR may facilitate the GBC or other coupon issuer companies assessing customers' purchasing habits associated with the coupon issuance event. In one implementation, the ECIR may identify the customer's personal charge card based on the customer's name provided when purchasing the coupon, and/or the personal charge card used to purchase the coupon. ECIR may analyze customer's transaction data associated with their personal charge card and compare the statistics before and post the coupon redemption date, e.g., No. of transactions made at a specific merchant, total amount spent at a specific merchant. The analysis may provide the merchant and/or coupon issuing company a report of the loyalty of customers, i.e., how often the customer returns to the merchant after the customer redeems the coupon, etc. The analytics may also generate other uses, for example, the ECIR may facilitate the coupon issuing companies tailoring specific coupons and/or offers based on customer's spending history; the ECIR may utilize the purchase data of enrolled consumers to determine the location of the consumer's purchase and to trigger alerts of coupons and/or offers through email, messages, and/or mobile applications; and the ECIR may enable improved participation of merchants by utilizing the transaction data of enrolled consumers to control distribution of offer/and coupons.

ECIR

FIGS. 1A-1D show block diagrams illustrating various exemplary embodiments of the ECIR. With reference to FIG. 1A, in some embodiments, the ECIR may facilitate the issuance 101 and redemption 111 of coupons, offers, and/or rewards issued by group buying companies and/or social network programs. In some implementations, a consumer 102 may pay a Group Buying Company ("GBC") 103 and/or a social network program to participate in offers and/or rewards with a specific merchant. For example, the consumer may see an advertisement at GBC's website for "pay only $6 for a $12 movie ticket at Movie Theatre ABC," and may pay a fee to purchase the coupon to redeem it later at the theatre 105. Within implementations, upon purchase, the consumer may receive a coupon electronically, for example, via emails, Short Message Service ("SMS"), social network messages, mobile device applications, computer applications, and/or the like. The coupon may also be mailed to the consumer by mail. In some embodiments, the GBC may issue a coupon with a Virtual Payment System ("VPS") number 106. The VPS number may be a Permanent Account Number ("PAN") associated with a prepaid account, a credit card account, a debit card account, and/or the like. The coupon issued to the consumer may include the merchant's name (e.g., Movie Theatre ABC), the contents of the coupon (e.g., $6 off for a $12 movie ticket), the VPS #, and the expiration date of the PAN 107. In some implementations, the coupon may include a Card Verification Value (e.g., CVV or CVV2), a barcode, a Quick Response ("QR") code, and/or the like. In some implementations, the coupon may be produced in a physical card with magnetic stripe and/or RFID for quick identification.

In some embodiments, the ECIR server may facilitate with the coupon redemption process. The consumer 102 may bring the coupon 107 to the merchant 104 to redeem the coupon. The merchant employee may type in the VPS # and the expiration date on the coupon to verify the validity of the coupon (e.g., if the coupon has been redeemed before, etc.) and to authorize the coupon 108. The consumer may receive the goods and/or services upon the authorization. In some implementations, the merchant employee may scan the coupon if it contains a barcode, a QR code or RFID. The coupon may also be swiped if a magnetic stripe is present.

Figure 1B:
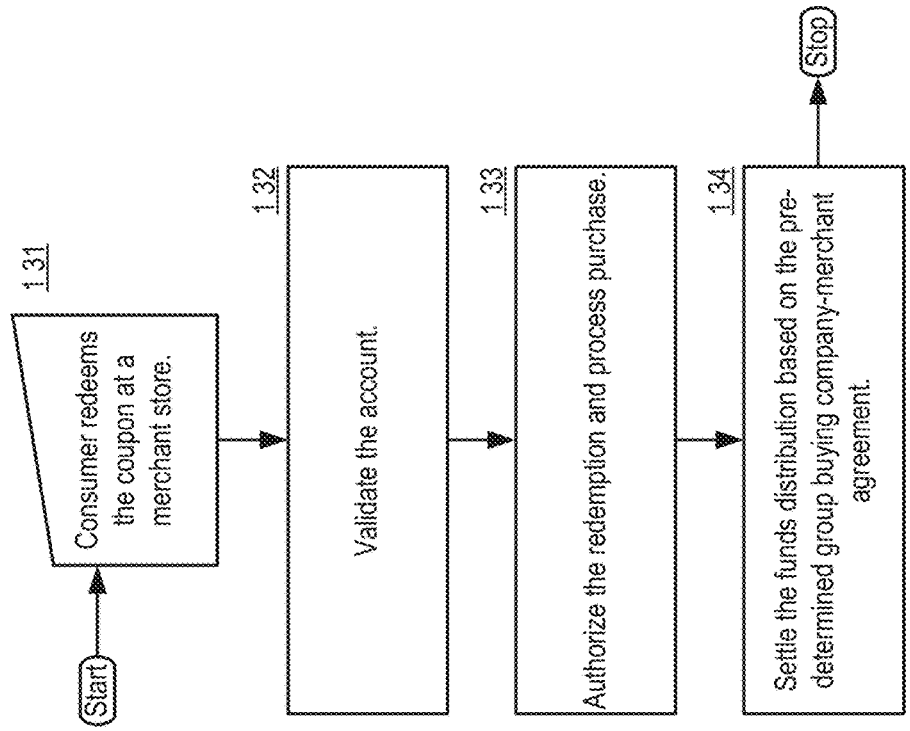
Figure 1B:
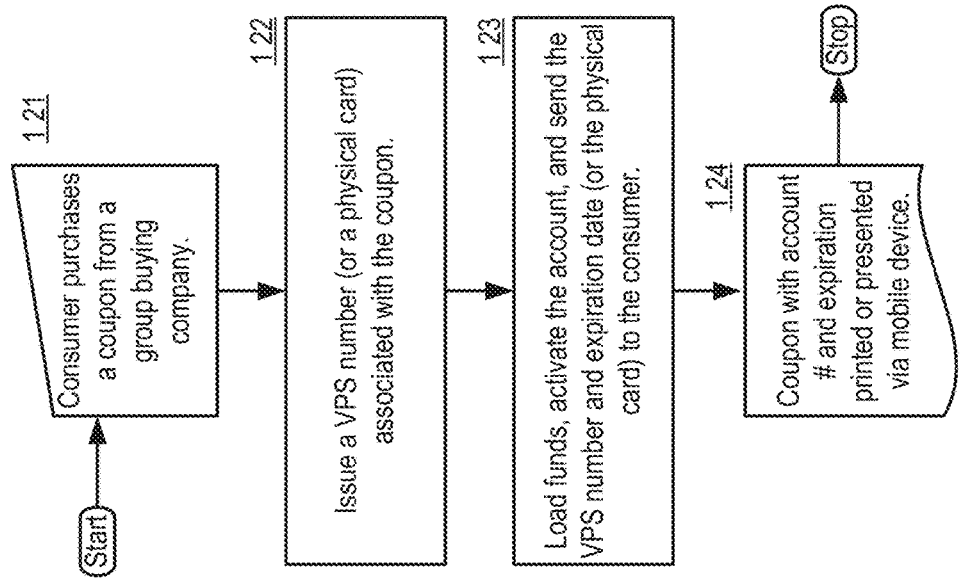

FIG. 1B shows a flow chart illustrating various exemplary embodiments of the ECIR. In some embodiments, upon receiving purchase input from a consumer for a coupon provided by a GBC or other coupon issuing companies 121, the ECIR server may issue a VPS number associated a prepaid account 122. In one implementation, the prepaid account may be associated with a specific consumer and used for different coupons with different merchants. In another implementation, the prepaid account may be unique for each coupon and each consumer, and it may be redeemed only once. The ECIR may load funds to the account and activate the account for future redemption 123. The information associated with the account, e.g., the VPS #, the expiration date, etc., may be sent to the consumer together with the coupon 124.

In some embodiments, when redeeming the coupon at the merchant store 131, the consumer may present the printed coupon (or the physical card) to the merchant employee, or the consumer may also present coupon via mobile device applications. The ECIR may query the database and verify that the coupon has not been used before, and/or it is not an expired coupon 132. Upon verification, the ECIR server may authorize the redemption and process the transaction 133. In some embodiments, the ECIR server may also settle the funds distribution based on the pre-determined group buying company and merchant agreement 134.

In some embodiments, the ECIR server may provide a prepayment and authentication platform for social network coupon offers, which may associate a ECIR account number with a social network coupon offer and may verify the validity of the social network coupon offer.

In one embodiment, a consumer may pay a group buying company and/or a social network program to participate in offers and/or rewards with a specific merchant. For example, the consumer may see an advertisement in the newspaper for "Join us for $1.99 per month and enjoy free-shipping any purchase on buygoods.com," and may pay a monthly fee to the advertisement sponsor to redeem free-shipping services on the specified merchant "buygoods.com." Within implementations, upon joining the program, the consumer may receive an offer via a print-at-home paper offer or via a mobile web page/text message. For example, a paper free-shipping coupon may be mailed to the consumer, and/or a free-shipping code may be emailed, text-messaged to the consumer.

In one embodiment, the offer may be a private coupon with a private label, e.g., a ECIR account number registered by the ECIR platform with a group buying company. The ECIR may receive an indication of the coupon issuance and associate an account number with the issued coupon. For example, the ECIR may request the consumer open an ECIR in order to redeem the coupon. For another example, the ECIR may associate a consumer's bank account number with the issued coupon. For another example, the ECIR may request the consumer provide a unique password to be associated with the coupon.

In one embodiment, the issued offer coupon may be redeemed for goods and/or services from the merchant for an agreed upon amount between the group buying company and the merchant. The merchant may authenticate the offer by entering the account number into their POS. If the value associated with the offer hasn't yet been redeemed, the merchant will receive an approval via the offer program manager through the ECIR payment system and then the merchant would be paid, in which way real-time payments, settlement and reporting may be facilitated.

FIG. 1C shows a block diagram illustrating data flows between ECIR server and affiliated entities within various embodiments of the ECIR. Within various embodiments, one or more consumers user(s) 142, a ECIR acquirer 15, ECIR server 162 and/or ECIR platform 160, ECIR database(s) 159, merchant store(s) 150, mobile carrier 165, financial network(s)/system(s) 170, a ECIR offer issuer 155, and a group buying company 170 are shown to interact via various communication network 153.

As shown in FIG. 1C(a), in one embodiment, a consumer 142 may present an offer at a participating merchant 145. The merchant (e.g., a merchant store, a merchant website, etc.) may communicate with a ECIR acquirer 110 to submit sales and coupon information. In one implementation, the acquirer 150 may determine an amount of the discount and submit consumer account number and the coupon amount to the ECIR platform 160.

For example, in one implementation, a Consumer 142 may select a group buying offer for a merchant, and provide a financial account number (e.g., a ECIR account number, a credit card number, a debit card number, etc.) to purchases the offer. In one implementation, the card number and the purchased coupon may be submitted to a group buying company 170.

In one embodiment, the ECIR platform 160 may query its database 119 to determine whether the offer has been redeemed by verifying the coupon amount associated with the consumer account number with an offer issuer 155.

In one implementation, the offer issuer may generate reports summarizing the issued offers and redemption of the offers with a group buying company 170. For example, the issuer may notify the group buying company 170 about the number of consumers participating in a group buying program, the amount of purchased products, and/or the like, on a periodic basis.

FIG. 1C(b) shows an example data flow within the entities within embodiments of ECIR. For example, a group buying company may negotiate with an offer issuer and/or the ECIR platform to obtain a prepaid amount for a purchase of specified product at a price of $25.00. A merchant 105 may receive a purchasing request of a product at a price of $25.00 with a discounted amount $0.64. The merchant may submit the coupon information together with the consumer's account number to the ECIR platform, which may verify the $0.64 discount amount has not been redeemed with the coupon issuer 155. The issuer may then approve the $0.64 amount via the ECIR platform 160 to the acquirer $0.64, and the acquirer may in turn approve a purchase at the price of $25-$0.64=$24.36 at the merchant.

Figure 1D:
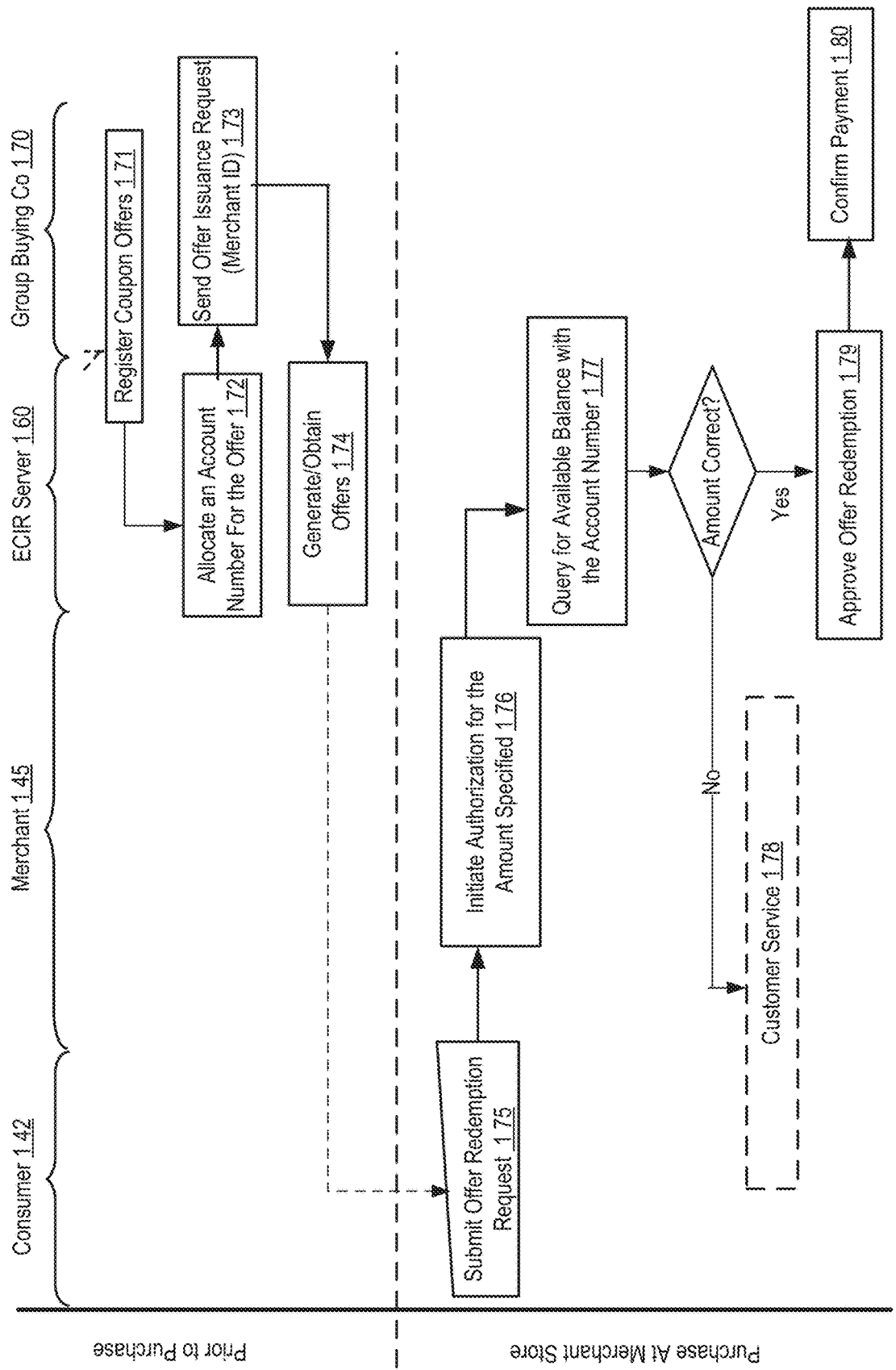

FIG. 1D provides a logic flow diagram illustrating embodiments of the ECIR. In one embodiment, prior to consumer purchases and/or redemption of offers, a group buying company may register a range of coupon offers 171 with the ECIR server 160. Within implementations, group buying company and/or their program manager may establish inventory control settings with the ECIR server 160, and places an initial order of virtual card stock using inventory control functions through ECIR server. In one implementation, subsequent orders may be automatically generated based on inventory control reorder points.

In one implementation, for each issued offer, the group buying company 170 may send a "Get Inventory Control Request" to obtain an account number, e.g., 16 digit account number from the ECIR server. The ECIR server may generate an account number and other information to an offer issuer 172.

In an alternative implementation, the group buying company 130 may send a "Get Instant Issue Request" to get standardized cardholder address and verify the account number from the ECIR server 160, wherein the ECIR server may send information comprising a standardized address and account number verification to an offer issuer.

In another implementation, the group buying company may send an "Offer Issuance Request" 173 with buyer and cardholder information (including standardized address) to have the ECIR issue active virtual cards comprising coupon offers. The ECIR server may in turn send the Offer Issuance Request 174 to an offer issuer with one of the following: 1) Limit error message or 2) Buyer and cardholder Alias ID's and other information indicating successful issuance.

In one embodiment, through the above interface between the group buying company and the ECIR server, the group buying company may provide the merchant ID for that range of issued accounts.

In one implementation, a consumer may obtain a voucher via the internet/browser, mobile message, emails, and/or the like, from the group buying company that contains the offer terms and conditions, and also contains the 16 digit account number, expiration date and the transaction amount of the value of each offer, e.g. merchant offers to the consumer for $30 the opportunity to receive Tea for Two Of $30, group buying company keeps $5. On the coupon certificate with the account number is instruction for merchant to enter $25 for purchase amount in their POS system at time of purchase.

In one implementation, the consumer 142 may submit an offer redemption request 175, e.g., at a POST terminal with the merchant store. The merchant 145 may initiate authorization of the discount amount specified by the offer 176.

Within implementations, authorization request may be routed through ECIR server which may check available balance associated with the account number 177 and merchant information to ensure the offer is being used at the participating merchant, and has not been used before. If the merchant information is correct, and the balance is sufficient, the offer is approved 179. Otherwise, if the merchant information does not match the stored record, or the offer has already been redeemed, the ECIR server may send a notification to direct to customer service 178. The group buying company may confirm the received information of payment transaction 180.

At the end of the day the merchant may submit this transaction in their clearing file with the rest of their ECIR purchases for offer redemptions.

In a further implementation, the ECIR may include API feature that the group buying company may utilize to obtain a new account number to put on each certificate as they render them. The ECIR may provide web services to allow configurations which facilitate the group buying company to interact with the ECIR server.

In a further implementation, selective acceptance may be performed by the ECIR server during the offer authentication. For example, the ECIR may apply restrictive authorization procedures built into the server including merchant ID filtering, Merchant Category Code (MCC), and limits/thresholds that can be set.

In a further implementation, an issue BIN may be installed at the ECIR to support the virtual card account activity, and track balances. An API may be provided to the group buying company for certificate rendering.

In a further implementation, the ECIR may keep track of transactions of a consumer and qualify the consumer for a loyalty program, e.g., special promotions for brand products.

Figure 2:
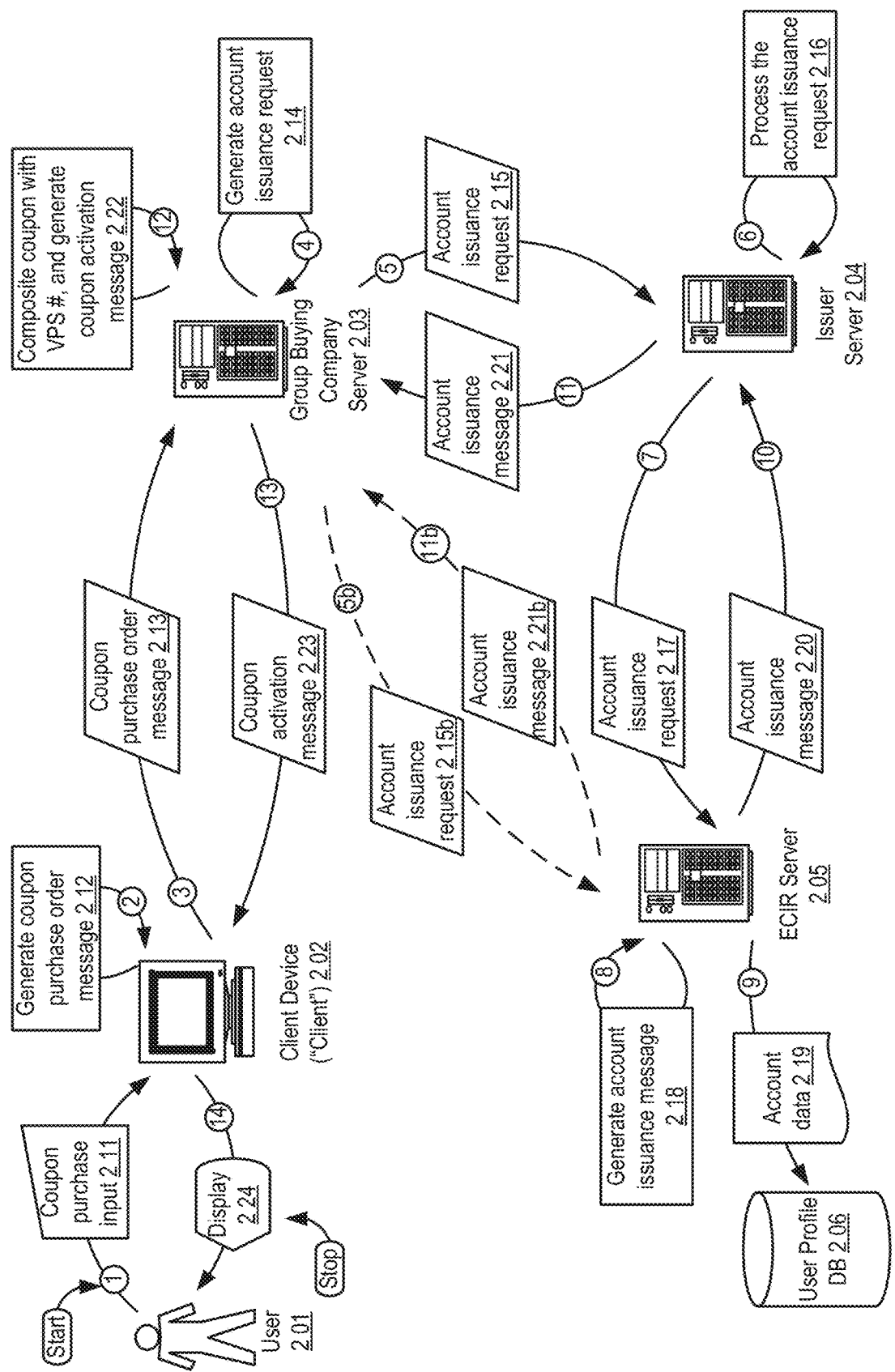
FIG. 2 shows a data flow diagram illustrating an example coupon account issuance procedure in some embodiments of the ECIR.

FIG. 2 shows a data flow diagram illustrating an example coupon account issuance procedure in some embodiments of the ECIR. In some embodiments, a user (or a consumer) 201 may desire to purchase a coupon, offer, reward, and/or the like ("coupon"), from a group buying company, a social network program, and/or the like ("GBC"), via the GBC's online site or in the GBC's store. The user may communicate with the GBC 203 via a client such as, but not limited to: a personal computer, mobile device, television, point-of-sale terminal, kiosk, ATM, and/or the like (e.g., 202). For example, the user may provide user input, e.g., purchase input 211, into the client indicating the user's desire to purchase the coupon. In various implementations, the user input may include, but not be limited to: keyboard entry, mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the GBC, and may select a coupon from the website via clicking on a hyperlink presented to the user via the website.

In some implementations, the client may generate a coupon purchase order message, e.g., 212, and provide, e.g., 213, the generated coupon purchase order message to the GBC server. For example, a browser application executing on the client may provide, on behalf of the user, a (Secure) Hypertext Transfer Protocol ("HTTP(S)") GET message including the product order details for the GBC server in the form of data formatted according to the eXtensible Markup Language ("XML"). Below is an example HTTP(S) GET message including an XML-formatted purchase order message for the GBC server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_coupon>1</num_coupon>
        <coupon>
            <coupon_type>movietickets</coupon_type>
            <coupon_params>
                <coupon_start_time>2011-03-01 0:0:0</coupon_start_time>
                <coupon_end_time>2011-05-31 23:59:59</coupon_end_time>
                <merchant>movietheatreABC</merchant>
                <merchant_id>3FBCR4INC</merchant_id>
                <coupon_cost>$6</coupon_cost>
            </coupon_params>
            <quantity>1</quantity>
        </coupon>
    </purchase_details>
    <account_params>
        <account_name>John Q. Public</account_name>
        <account_type>credit</account_type>
        <account_num>123456789012345</account_num>
        <billing_address>123 Green St., Norman, OK 98765</billing_address>
```

-continued

```
            <phone>123-456-7809</phone>
            <sign>/jqp/</sign>
            <confirm_type>email</confirm_type>
            <contact_info>john.q.public@gmail.com</contact_info>
        </account_params>
        <shipping_info>
            <shipping_method>email</shipping_method>
            <shipping_adress>same as billing</shipping_address>
            <ship_type>expedited</ship_type>
            <ship_carrier>FedEx</ship_carrier>
            <ship_account>123-45-678</ship_account>
            <tracking_flag>true</tracking_flag>
            <sign_flag>false</sign_flag>
        </shipping_info>
</purchase_order>
```

In some implementations, the GBC server may obtain the purchase order message from the client, and may parse the purchase order message to extract details of the purchase order from the user. The GBC server may generate an account issuance request, e.g., 214 to issue a prepaid account and/or a VPS #. In one implementation, the account issuance request may be sent 215 to an issuer server 204. For example, an issuer server may be a server of an issuer financial institution ("issuer") maintaining an account of the GBC. For example, a browser application executing on the GBC server may provide a (Secure) Hypertext Transfer Protocol ("HTTP(S)") GET message including the coupon details for the GBC server in the form of data formatted according to the eXtensible Markup Language ("XML"). Below is an example HTTP(S) GET message including an XML-formatted account issuance message for the GBC server:

```
GET /accountissuance.php HTTP/1.1
Host: www.merchant.com
Content-Type: Application/XML
Content-Length: 1306
<?XML version = "1.0" encoding = "UTF-8"?>
<account_issuance_request>
        <timestamp>2011-02-22 15:22:43</timestamp>
        <user_ID>john.q.public@gmail.com</user_ID>
        <purchase_details>
            <num_coupon>1</num_coupon>
            <coupon>
                <coupon_type>movietickets</coupon_type>
                <coupon_params>
                    <coupon_start_time>2011-03-01 0:0:0</coupon_start_time>
                    <coupon_end_time>2011-05-31 23:59:59</coupon_end_time>
                    <coupon_cost>$6</coupon_cost>
                </coupon_params>
                <quantity>1</quantity>
            </coupon>
            <merchant>
                <merchant>movietheatreABC</merchant>
                <merchant_id>3FBCR4INC</merchant_id>
            </merchant>
            <product>
                <product_type>movieticket</product_type>
                <product_cost>$12</product_cost>
                <product_params>
                    <product_title>Shrek</product_title>
                </product_params>
                <quantity>1</quantity>
            </product>
        </purchase_details>
</account_issuance_request>
```

The issuer server may process the account issuance request 216 to comply with the issuer's rules and regulations. The account issuance request may be sent to the ECIR server 217. The ECIR server 205 may generate 218 the account and an account issuance message 220. In some implementations, the account issuance message may include details such as, but not limited to: account details of the user, user billing and/or shipping information, coupon details, and/or the like. For example, the ECIR server may provide a HTTP(S) POST message including an XML-formatted account issuance message similar to the example listing provided below:

```
POST /accountissuance.php HTTP/1.1
Host: www.ecir.com
Content-Type: Application/XML
Content-Length: 624
<?XML version = "1.0" encoding = "UTF-8"?>
<account_issuance_message>
    <query_ID>VNEI39FK</query_ID>
    <timestamp>2011-02-22 15:22:44</timestamp>
    <purchase_summary>
        <num_products>1</num_products>
        <coupon>
            <coupon_summary>movie tickets $6 for $12</coupon_summary>
            <coupon_quantity>1</coupon_quantity>
            <coupon_start_time>2011-03-01 0:0:0</coupon_start_time>
            <coupon_end_time>2011-05-31 23:59:59</coupon_end_time>
            <merchant>movietheatreABC</merchant>
            <merchant_id>3FBCR4INC</merchant_id>
            <coupon_cost>$6</coupon_cost>
        </coupon>
    </purchase_summary>
    <transaction_cost>$6</transaction_cost>
    <user_account_params>
        <account_name>John Q. Public</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </user_account_params>
    <VPS_account_params>
        <account_name>John Q. Public</account_name>
        <account_type>prepaid</account_type>
        <account_num>9876543210987654</account_num>
        <billing_address>123 Green St., Norman, OK 98765</billing_address>
        <phone>123-456-7809</phone>
        <expiration>2011-05-31</expiration>
    </VPS_account_params>
</card_query_request>
```

In one embodiment, the user data and the account data may be stored 219 in a user profile database 206. The generated account issuance message may be sent back to the issuer server 220 and GBC server 221. The GBC server may composite coupon with the generated account information, e.g., VPS #, and generate coupon activation message 222 (e.g., Email, SMS, wallet notification, etc.), which may be sent 223 back to the client device for display 224.

In another embodiment, the account issuance request may be sent to the ECIR server directly 215b. The ECIR generated account issuance message may be sent to the GBC server directly 221b.

Figure 3A:
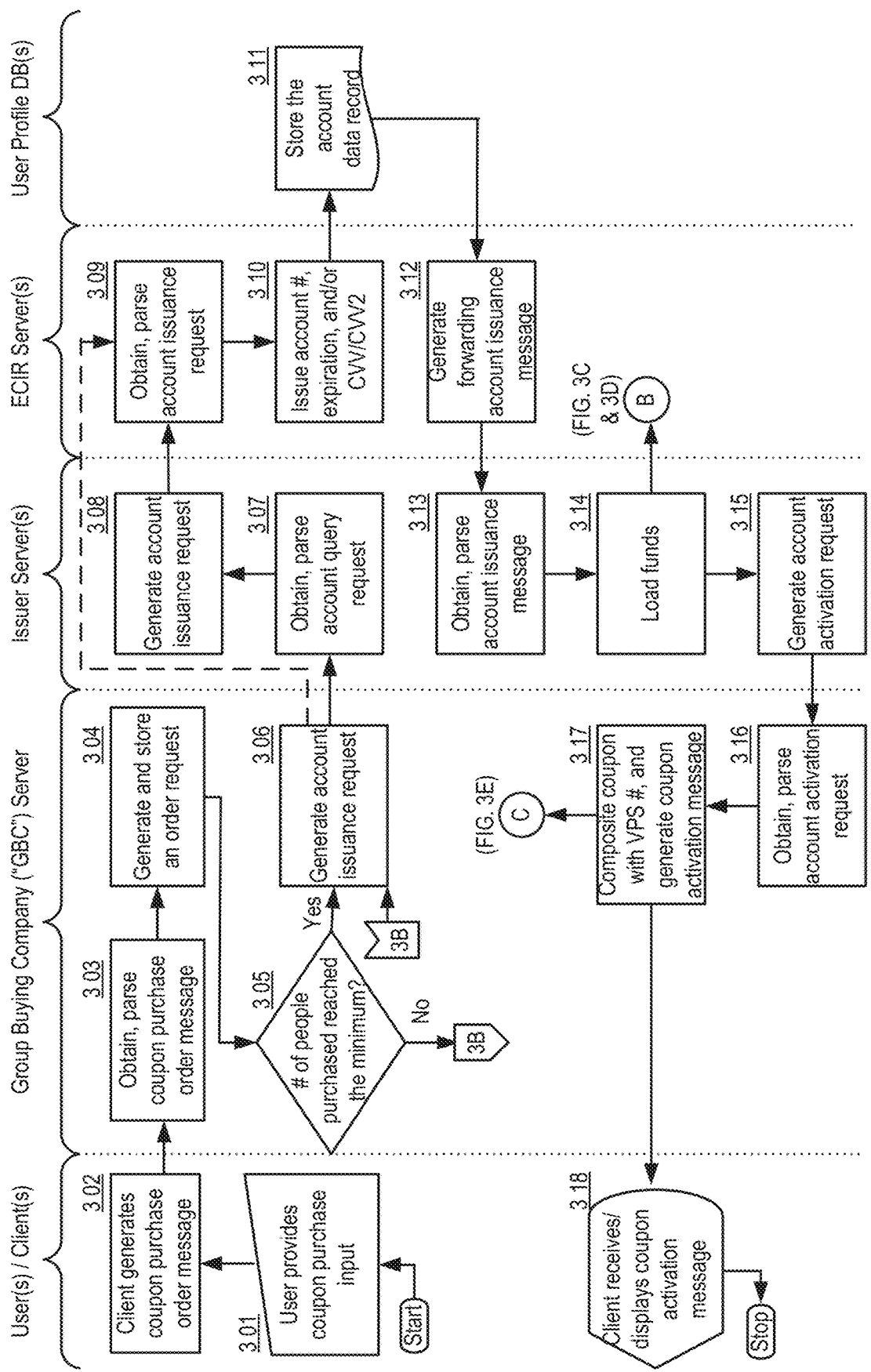
Figure 3B:
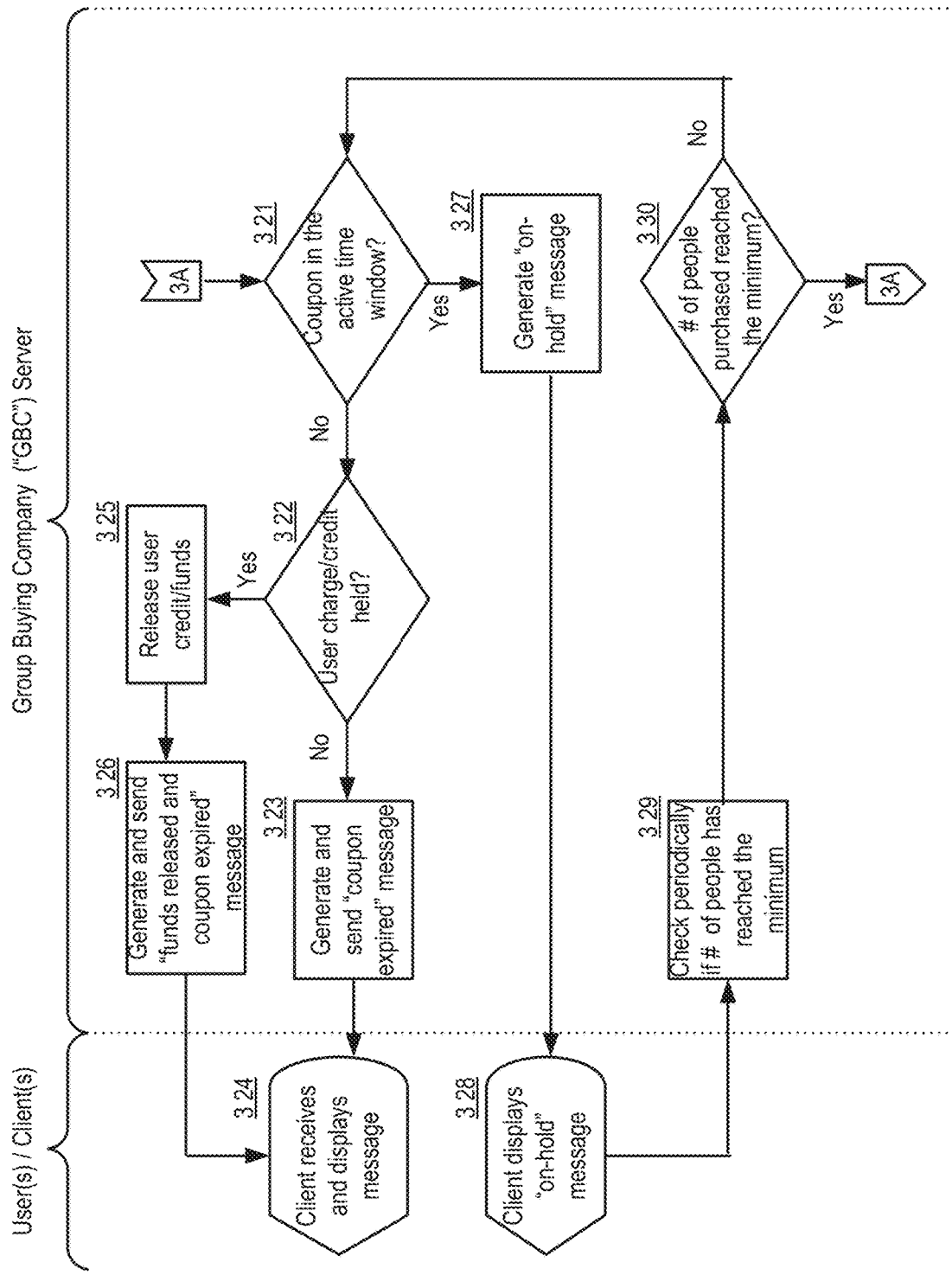

FIGS. 3A-3E show logic flow diagrams illustrating various example embodiments of the ECIR. FIGS. 3A-3B show logic flow diagrams illustrating example aspects of coupon issuance in some embodiments of the ECIR, e.g., Coupon Issuance component 1147 in FIG. 11. With the reference to FIG. 3A, in some embodiments, a user may provide user input, e.g., 301, into a client indicating the user's desire to purchase a coupon from a GBC. The client may generate a coupon purchase order message, e.g., 302, and provide the generated coupon purchase order message to the GBC server. In some implementations, the merchant server may obtain, e.g., 303, the coupon purchase order message from the client, and may parse the coupon purchase order message to extract details of the coupon purchase order from the user. The GBC server may generate and store the order request 304. In some implementations, the GBC server may determine if the number of people purchased has reached the minimum to have the coupon activated 305. For example, before issuing a coupon, the GBC and/or the merchant (e.g., the movie theatre) may determine a minimum number of people to initiate the activation of the coupon. If there are less than 500 people purchasing the movie tickets coupon, the GBC and/or the movie theatre may decide the coupon may be a negative impact to the theatre's business growth. Therefore, it may be decided that only when the sign-up number reaches 501 people, the coupon may be activated for redemption. If the number of people who purchased the coupon has reached the pre-determined minimum, the GBC may generate an account issuance request 306. The issuer server may obtain and parse the account issuance request 307 and generate an account issuance request 308 to send to the ECIR server. Upon obtaining the account issuance request, the ECIR server may parse the request to obtain the details of the user and/or the coupon 309. The ECIR may issue a PAN number associated with a prepaid account which may also include an expiration date, and/or a CVV/CVV2 code 310. The account information may be stored in the user profile database 311. The ECIR may generate a forwarding account issuance message 312 and send to the issuer server. Upon obtaining the message, the issuer server may parse 313 and process the account issuance message for funds loading process, which are discussed in detail in FIGS. 3C-3D 314. For example, in one implementation, the funds may be loaded to the account (e.g., prepaid account) directly from the consumer, e.g., FIG. 3C. In another implementation, the funds may be loaded to the account from the GBC, which may be paid by the consumer when the coupon is purchased from the GBC.

In some embodiments, the ECIR may generate an account activation request 315 and send to the GBC server. The GBC server may obtain and parse account activation request 316 to composite coupon with the account information 317. The details of the composition process are discussed in FIG. 3E. The GBC server may generate a coupon activation message 317 and send to the user/client to display 318.

In some embodiments, the GBC generated account issuance request 306 may be sent directly to the ECIR server 309.

FIG. 3B shows a flow chart illustrating example aspects of the electronic coupon account issuance if the number of people who purchased the coupon has not reached the minimum 305. In some embodiments, the GBC server may determine if the coupon is in the active time window 321. For example, before issuing the coupon, the GBC and/or the merchant may determine a time window during which if the minimum number of people who purchased the coupon has not been reached, the coupon may not be valid anymore. If not enough people has signed up for the coupon and the coupon is not valid anymore, the GBC server may determine if the user has been charged or has credit held when purchasing the coupon 322. If the user has not been charged or has credit held, the GBC server may generate and send a "coupon expired" message 323 to inform the user that the coupon is not valid anymore. The client receives and displays the message 324. If the user has been charged or has credit held when purchasing the coupon, the GBC server may credit the charge back to the user or release the credit held 325. The GBC may generate and send "funds released and coupon expired" message 326. The user/client receives and displays the message 324.

In some embodiments, if not enough people has signed up for the coupon but the coupon is still in its active time window 321, the GBC may generate "on hold" message 327 to inform the user that there has not been enough people signing up for the coupon. In some implementations, the user may choose to wait till the minimum number of people has reached and continue with the coupon process. In some implementations, the user may choose to withdraw and charged funds may be credited back to the user. The "on-hold" message may be sent to the user/client to display 328. In some embodiments, if the user chooses to wait for other people to sign-up and continue with purchasing the coupon, the GBC server may check periodically if the number of people has reached the minimum. If the minimum has been reached 330, the GBC may continue with the account issuance process to generate an account issuance request 306 as discussed in FIG. 3A. If there are still not enough people signing-up for the coupon, the GBC may continue with the process by first checking if the coupon is in the active time window 321.

Figure 3C:
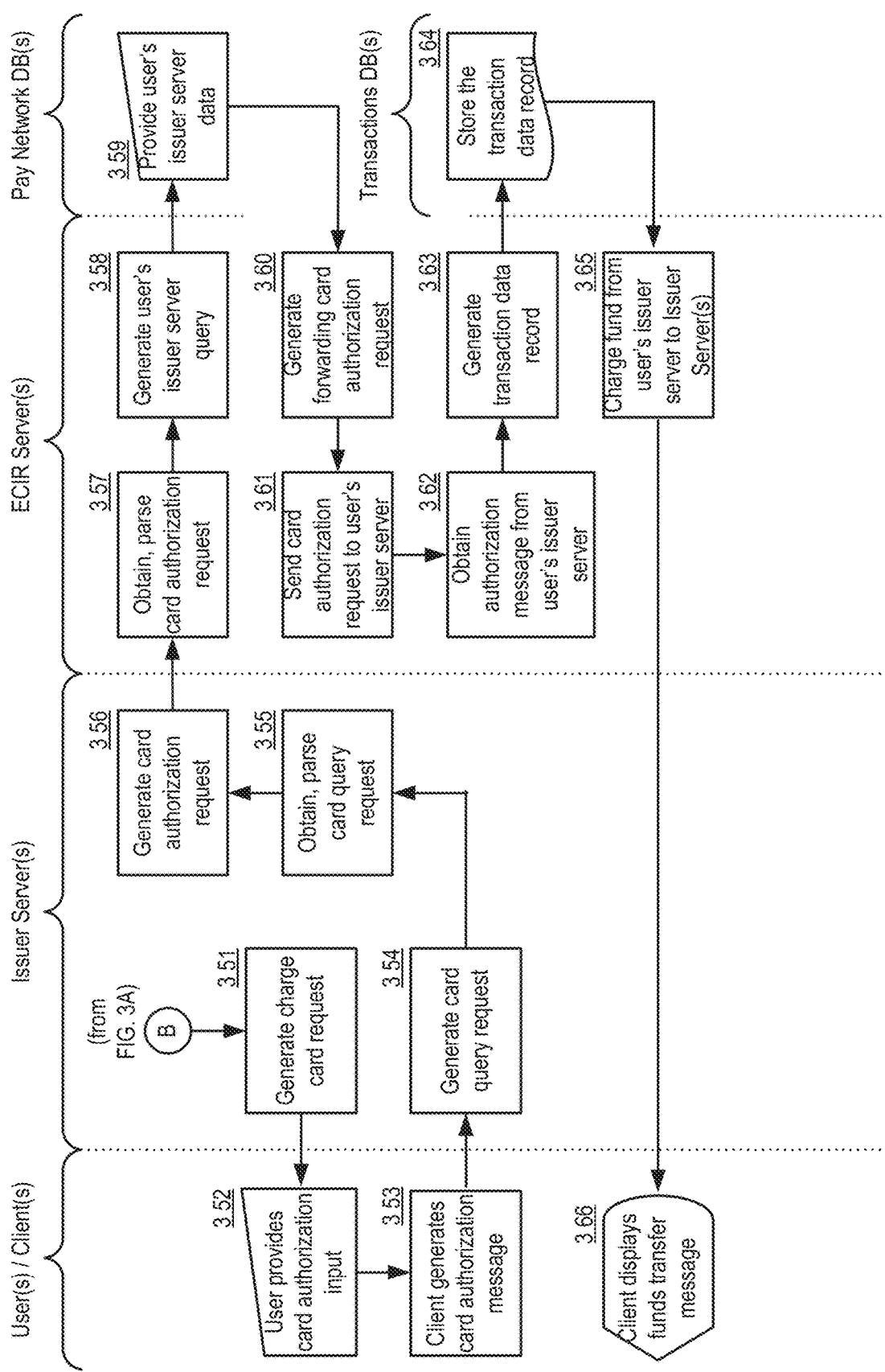
Figure 3D:
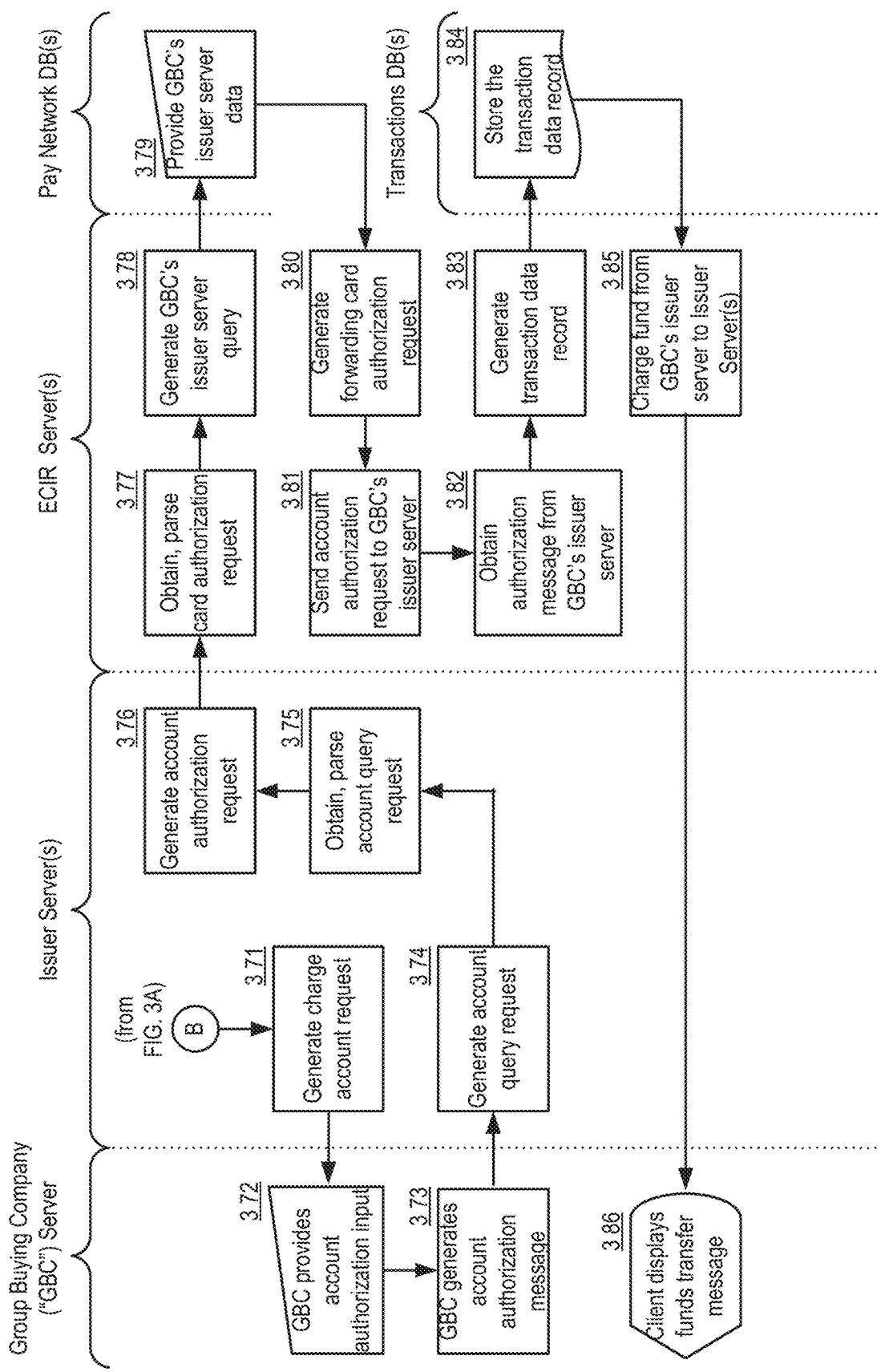

FIGS. 3C-3D show logic flow diagrams illustrating example aspects of electronic coupon funds loading in some embodiments of the ECIR, e.g., Coupon Funds Loading component 1148 in FIG. 11. FIG. 3C shows an example embodiment where the funds are loaded to the account directly from the consumer in some embodiments of the ECIR. The issuer server (e.g., the issuer financial institution maintaining an account of the GBC) may generate charge card request 351 and send to user/client for input. The user may provide card authorization input (e.g., credit card number, user's name, billing address, payment amount, signature, etc.) 352 and the client may generate a card authorization message 353. The issuer server may generate a card query request, e.g., 354, to determine whether the transaction can be processed. For example, the issuer server may process the transaction only if the user has sufficient funds to pay for the purchase in a card account provided with the purchase order. The issuer server may obtain and parse the card query request 355, and generate a card authorization request, e.g., 356, using the obtained card query request, and provide the card authorization request to the ECIR server. In some implementations, the ECIR server may obtain the card authorization request from the issuer server, and may parse the card authorization request to extract details of the request 357. Using the extracted fields and field values, the ECIR server may generate a query, e.g., 358, for a user's issuer server (e.g., an issuer financial institution ("issuer") maintaining an account of the user) corresponding to the user's card account. In response to obtaining the user's issuer server query the pay network database may provide, e.g., 359, the requested issuer server data to the ECIR server. In some implementations, the ECIR server may utilize the user's issuer server data to generate a forwarding card authorization request, e.g., 360, to redirect the card authorization request from the GBC's issuer server to the user's issuer server. The ECIR server may provide the card authorization request to the issuer server 361. Upon receiving an authorization message from the user's issuer server 362, the ECIR server may parse the authorization message to extract the transaction data, and generate a transaction data record, e.g. 363. The ECIR server may provide the transaction data record for storage, e.g., 364, to a database. Using the extracted transaction data, the ECIR server may charge the fund from user's issuer server to the GBC's issuer server 365. The ECIR server may generate a "funds transferred" message to the client. The client may render and display, e.g., 366, the message for the user.

FIG. 3D shows an example embodiment where the funds are loaded to the account directly from GBC in some embodiments of the ECIR. The issuer server (e.g., the issuer financial institution maintaining an account of the GBC) may generate charge card request 371 and send to the GBC server for input. In one embodiment, the GBC server may provide account authorization input (e.g., account number, company's name, billing address, payment amount, signature, etc.) 372 and the GBC server may generate a card authorization message 373. In another embodiment, the issuer server may have GBC's account information on record. The issuer server may query the database and retrieve GBC's account information and authorization information to proceed with the funds loading.

In some embodiments, the issuer server may generate an account query request, e.g., 374, to determine whether the transaction can be processed. For example, the issuer server may process the transaction only if the account has sufficient funds to pay for the purchase in the account provided. The issuer server may obtain and parse the account query request 375, and generate an account authorization request, e.g., 376, using the obtained account query request, and provide the account authorization request to the ECIR server. In some implementations, the ECIR server may obtain the account authorization request from the issuer server, and may parse the account authorization request to extract details of the request 377. Using the extracted fields and field values, the ECIR server may generate a query, e.g., 378, for the GBC's issuer server corresponding to the account. In response to obtaining the GBC's issuer server query the pay network database may provide, e.g., 379, the requested issuer server data to the ECIR server. In some implementations, the ECIR server may utilize the GBC's issuer server data to generate a forwarding account authorization request, e.g., 380, to redirect the account authorization request from the ECIR server to the GBC's issuer server. The ECIR server may provide the account authorization request to the issuer server 381. Upon receiving an authorization message from the issuer server 382, the ECIR server may parse the authorization message to extract the transaction data, and generate a transaction data record, e.g. 383. The ECIR server may provide the transaction data record for storage, e.g., 384, to a database. Using the extracted transaction data, the ECIR server may charge the fund the GBC's issuer server 385 to the prepaid account. The ECIR server may generate a "funds transferred" message to the GBC server. The client may render and display, e.g., 386, the message.

FIG. 3E shows logic flow diagrams illustrating example aspects of electronic coupon generation in some embodiments of the ECIR, e.g., Coupon Generation component 1149 in FIG. 11. In some embodiments, in order to composite the coupon with the prepaid account details (e.g., VSP #, etc.), coupon templates may be used 331. The GBC server may determine which category the coupon is in. For example, the templates may be different for coupons which are sent via emails and mail. The GBC server may generate a request to query templates from the templates database 332. The database may provide to the GBC server template data corresponding to the determined coupon category 333. The template data may be in a format of Cascading Style Sheets ("CSS"), HyperText Markup Language 5 ("HTML5"), and/or the like. The GBC may generate fields query request to retrieve the user's name, the details of the coupon, the merchant's name, the VSP #, the expiration date of the VSP #, the CVV/CVV2, and/or the like 334. Various databases as discussed previously, e.g., user profile database, may provide the corresponding data 335. In some embodiments, the GBC server may determine in which method the coupon may be delivered. If the coupon is sent electronically (e.g., emails, SMS, mobile device applications, etc.) 337, the GBC server may generate a QR code or a barcode including the obtained fields 338, and composite fields with the QR/barcode into the retrieved template 339, which may enable quick identification of the coupon and user's information during redemption. The GBC server may send the composited coupon electronically to the user 340

In some embodiments, if the coupon is delivered as a print-out by mail 341, the GBC server may generate a QR code or a barcode including the obtained fields 342, and composite fields with the QR/barcode into the retrieved template 343, which may enable quick identification of the coupon and user's information during redemption. The GBC server may query the user profile database to retrieve the user's mailing address 344 and print and mail the coupon to the user 345.

In some embodiments, if the coupon is delivered as a physical card by mail 346, the GBC server may determine if a magnetic stripe or an RFID is required 347. If a magnetic stripe or an RFID is required, the GBC server may encode obtained fields (e.g., user name, coupon contents, merchant, VSP#, etc.) into the magnetic stripe or RFID 348. The GBC server may query the user profile database to retrieve the user's mailing address 349 and produce and mail the card to the user 350. If a magnetic strip or an RFID is not required, the GBC server may generate a QR code or a barcode including the obtained fields 392, and composite fields with the QR/barcode into the retrieved template 393, which may enable quick identification of the coupon and user's information during redemption. The GBC server may query the user profile database to retrieve the user's mailing address 394 and print and mail the coupon to the user 395.

In some embodiments, once the GBC server produces and delivers the coupon, the user's client may receives and displays coupon activation message 318, as discussed FIG. 3A.

In some embodiments, if the coupon does not have any of the categories, the GBC server may generate "no coupon category available" message 391.

Figure 4A:
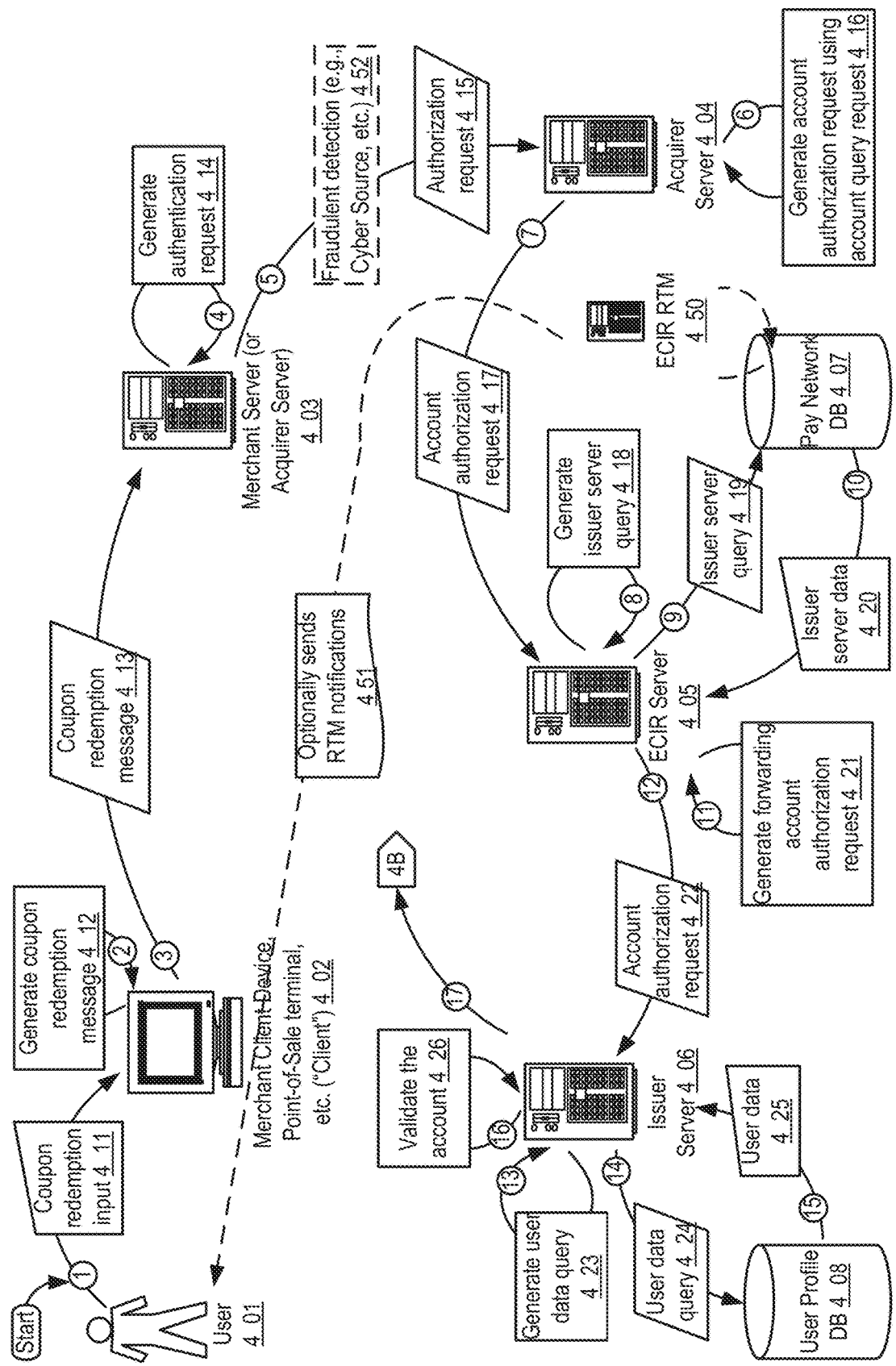
FIGS. 4A-B show data flow diagrams illustrating an example procedure to redeem the coupon and execute a coupon-based transaction in some embodiments of the ECIR.
Figure 4B:
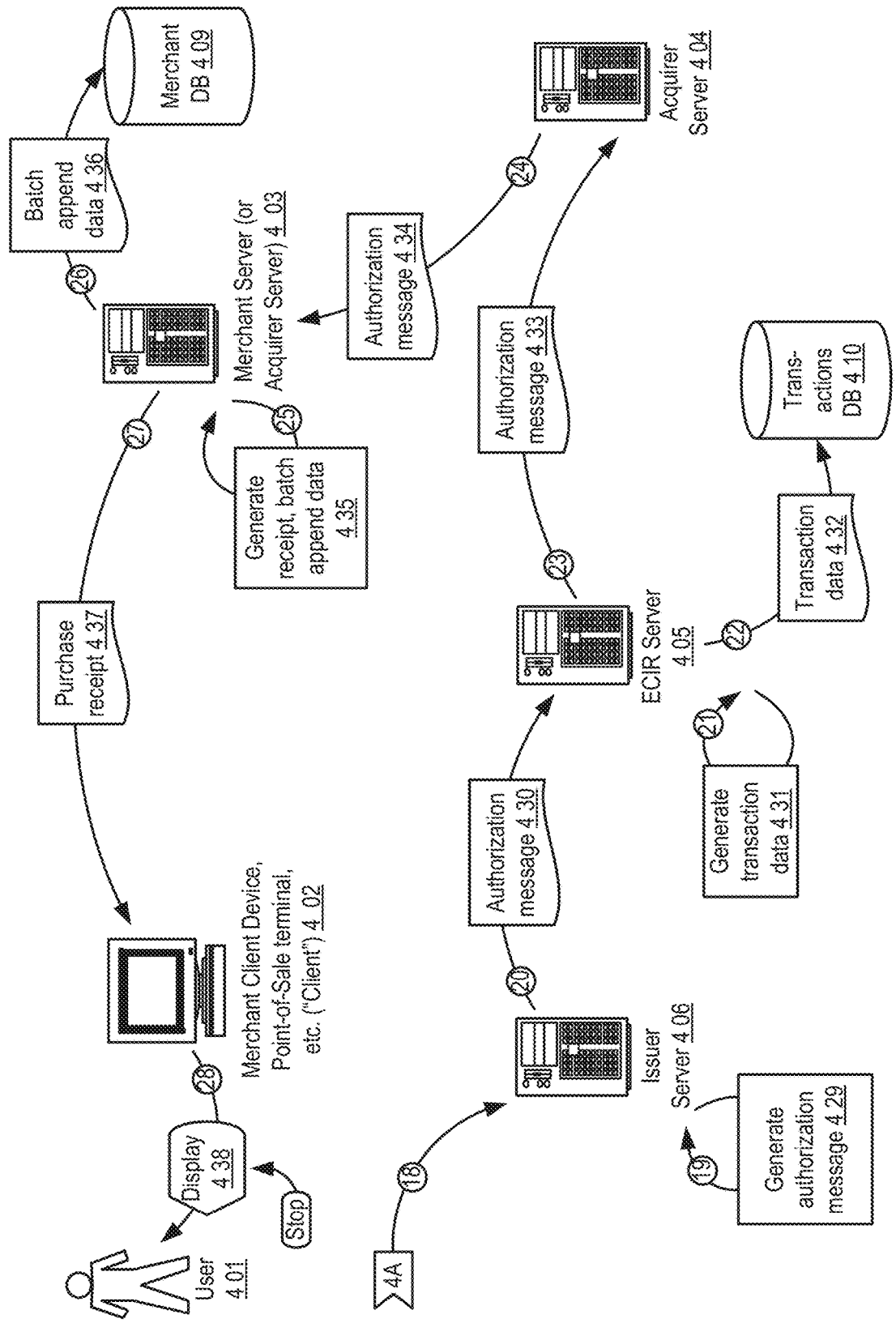

FIGS. 4A-4B show data flow diagrams illustrating an example procedure to redeem the coupon and execute a coupon-based transaction in some embodiments of the ECIR. In some implementations, a user, e.g., 401, may desire to purchase a product, service, offering, and/or the like ("product"), from a merchant, and redeem a coupon to benefit from the discounted price. The user may communicate with a merchant server, e.g., 403, via a merchant's client such as, but not limited to: a personal computer, mobile device, television, point-of-sale terminal, and/or the like (e.g., 402). For example, the user may provide user input, e.g., coupon redemption input 411, into the merchant's client indicating the user's desire to purchase the product and redeem the coupon. In various implementations, the user input may include, but not be limited to: keyboard entry of an account number (e.g., a VSP#, a barcode, a QR code, etc.), scanning a barcode or a QR code, swiping a physical card with a magnetic stripe or an RFID, and/or the like. The user may also direct a browser application executing on the merchant's client device to a website of the merchant, and may select a product from the website via clicking on a hyperlink presented to the user via the website.

In some implementations, the merchant's client may generate a coupon redemption message, e.g., 412, and provide, e.g., 413, the generated coupon redemption message to the merchant server. For example, a browser application executing on the client may provide, on behalf of the user, a (Secure) Hypertext Transfer Protocol ("HTTP(S)") GET message including the coupon details for the merchant server in the form of data formatted according to the eXtensible Markup Language ("XML"). Below is an example HTTP(S) GET message including an XML-formatted coupon redemption message for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2011-03-15 15:22:43</timestamp>
    <merchant_ID>3FBCR4INC</merchant_ID>
        <num_products>1</num_products>
        <product>
            <product_type>movieticket</product_type>
            <product_cost>$12</product_cost>
            <product_params>
                <product_title>Shrek</product_title>
            </product_params>
            <quantity>1</quantity>
        </product>
        <coupon_details>
            <num_coupon>1</num_coupon>
            <coupon>
                <user_name>john.smith</user_name>
                <coupon_type>movietickets</coupon_type>
                <coupon_params>
                    <coupon_start_time>2011-03-01 0:0:0</coupon_start_time>
                    <coupon_end_time>2011-05-31 23:59:59</coupon_end_time>
                    <merchant>movietheatreABC</merchant>
                    <merchant_id>3FBCR4INC</merchant_id>
                    <coupon_value>$6</coupon_value>
                </coupon_params>
                <quantity>1</quantity>
            </coupon>
            <coupon_account_params>
                <coupon_account_name>John.smith</coupon_account_name>
                <coupon_account_type>prepaid</coupon_account_type>
                <VPS_coupon_account_num>123456789012345</VPS_coupon_account_num>
                <coupon_exp_date>2015-03-01</coupon_exp_date>
            </coupon_account_params>
        </coupon_details>
</purchase_order>
```

In some implementations, the merchant server may obtain the coupon redemption message from the client, and may parse the coupon redemption message to extract details of the coupon from the user. The merchant server may generate an authentication request, e.g., 414 to determine whether the transaction can be processed. For example, the merchant server may attempt to determine whether the user has sufficient funds to pay for the purchase in an account provided with the coupon redemption. The merchant server may provide the authorization request, e.g., 415, to an acquirer server, e.g., 404. For example, the acquirer server may be a server of an acquirer financial institution ("acquirer") maintaining an account of the merchant. For example, the proceeds of transactions processed by the merchant may be deposited into an account maintained by the acquirer. In some implementations, the account query request may include details such as, but not limited to: the costs to the user involved in the transaction, account details of the user, user billing and/or shipping information, and/or the like.

In some implementations, the acquirer server may generate an account authorization request, e.g., 416, using the obtained account query request, and provide the account authorization request, e.g., 417, to the ECIR server, e.g., 405. For example, the acquirer server may redirect the HTTP(S) POST message in the example above from the merchant server to the ECIR server.

In some implementations, the ECIR server may obtain the account authorization request from the acquirer server, and may parse the account authorization request to extract details of the request. Using the extracted fields and field values, the ECIR server may generate a query, e.g., 418, for an issuer server corresponding to the user's account. For example, the user's account, the details of which the user may have provided via the coupon redemption message, may be linked to an issuer financial institution ("issuer"), such as a banking institution, which issued the account for the user. An issuer server, e.g., 406, of the issuer may maintain details of the user's account. In some implementations, a database, e.g., pay network database 407, may store details of the issuer servers and account numbers associated with the issuer servers. For example, the database may be a relational database responsive to Structured Query Language ("SQL") commands. The ECIR server may execute a hypertext preprocessor ("PHP") script including SQL commands to query the database for details of the issuer server. An example PHP/SQL command listing, illustrating substantive aspects of querying the database, is provided below:

```
<?PHP
header('Content-Type: text/plain');
mysql_connect("254.93.179.112",$DBserver,$password); // access database server
mysql_select_db("ISSUERS.SQL"); // select database table to search
//create query for issuer server data
$query = "SELECT VPS_account_params VPS_account_num
FROM AccountsTable WHERE
VPS_account_num LIKE '%' $accountnum";
$result = mysql_query($query); // perform the search query
mysql_close("ISSUERS.SQL"); // close database access
?>
```

In response to obtaining the issuer server query, e.g., 419, the pay network database may provide, e.g., 420, the requested issuer server data to the ECIR server. In some implementations, the ECIR server may utilize the issuer server data to generate a forwarding account authorization request, e.g., 421, to redirect the account authorization request from the acquirer server to the issuer server. The ECIR server may provide the account authorization request, e.g., 422, to the issuer server. In some implementations, the issuer server, e.g., 406, may parse the account authorization request, and based on the request details may query a database, e.g., user profile database 408, for data of the user's card account. For example, the issuer server may issue PHP/SQL commands similar to the example provided below:

```
<?PHP
header('Content-Type: text/plain');
mysql_connect("254.93.179.112",$DBserver,$password); // access
database server
mysql_select_db("USERS.SQL"); // select database table to search
//create query for user data
$query = "SELECT user_id user_name user_balance account_type
FROM UserTable
WHERE account_num LIKE '%' $accountnum";
$result = mysql_query($query); // perform the search query
mysql_close("USERS.SQL"); // close database access
?>
```

In some implementations, on obtaining the user data, e.g., 425, the issuer server may validate the account by determining whether the user can pay for the transaction using funds available in the account, and/or whether the coupon has been used before, e.g., 426. For example, the issuer server may determine whether the user has a sufficient balance remaining in the account, sufficient credit associated with the account, and/or the like. If the issuer server determines that the user can pay for the transaction using the funds available in the account, the server may generate 429 and provide an authorization message, e.g., 430, to the ECIR server. For example, the server may provide a HTTP(S) POST message similar to the examples above.

In some implementations, the ECIR server may obtain the authorization message, and parse the message to extract authorization details. Upon determining that the user possesses sufficient funds for the transaction, the ECIR server may generate a transaction data record, e.g., 431, from the account authorization request it received, and store, e.g., 432, the details of the transaction and authorization relating to the transaction in a database, e.g., transactions database 410. For example, the ECIR server may issue PHP/SQL commands similar to the example listing below to store the transaction data in a database:

```
<?PHP
header('Content-Type: text/plain');
mysql_connect("254.92.185.103",$DBserver,$password); // access
database server
mysql_select("TRANSACTIONS.SQL"); // select database to append
mysql_query("INSERT INTO PurchasesTable (timestamp,
purchase_summary_list,
num_products, product_summary, product_quantity, transaction_cost,
account_params_list, account_name, account_type, account_num,
merchant_params_list, merchant_id, merchant_name,
merchant_auth_key)
VALUES (time( ), $purchase_summary_list, $num_products,
$product_summary,
$product_quantity, $transaction_cost, $account_params_list,
$account_name,
$account_type, $account_num, $billing_addres, $zipcode, $phone,
$sign,
$merchant_params_list, $merchant_id, $merchant_name,
$merchant_auth_key)"); // add data to table in database
mysql_close("TRANSACTIONS.SQL"); // close connection to database
?>
```

In some implementations, the ECIR server may forward the authorization message, e.g., 433, to the acquirer server, which may in turn forward the authorization message, e.g., 434, to the merchant server. The merchant may obtain the authorization message, and determine from it that the user possesses sufficient funds in the account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 435, and store the XML data file, e.g., 436, in a database, e.g., merchant database 409. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365</
    merchant_auth_key>
    <account_number>123456789</account_number>
</merchant_data>
<transaction_data>
    <transaction 1>
    ...
    </transaction 1>
    <transaction 2>
    ...
    </transaction 2>
    .
    .
    .
    <transaction n>
    ...
    </transaction n>
</transaction_data>
```

In some implementations, the server may also generate a purchase receipt, e.g., and provide the purchase receipt to the client 437. The client may render and display, e.g., 438, the purchase receipt for the user. For example, the client may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

In some embodiments, the authentication 415 may optionally be filtered through fraudulent detection (e.g., cyber source, etc.) 452.

In some embodiments, the ECIR Real-Time Messaging ("RTM") server 450 may optionally sends RTM notifications to the user 451. The RTM notifications may include customized offers issued to customers based on the spend history of their financial card, and/or the like. Details are discussed in FIGS. 9A-9D.

Figure 5A:
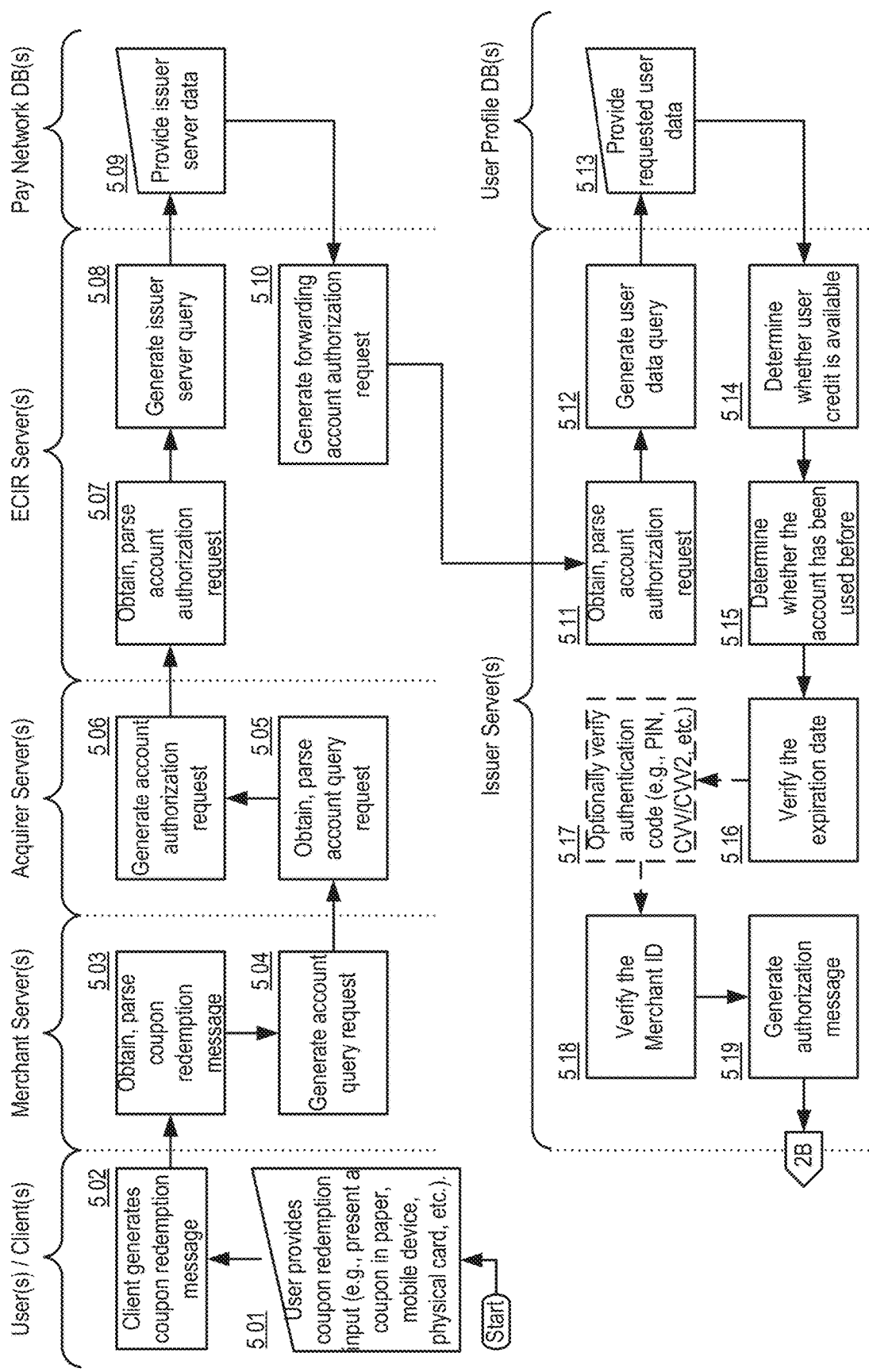
FIGS. 5A-B show logic flow diagrams illustrating example aspects of redeeming an account-based coupon by coupon PAN number in some embodiments of the ECIR.
Figure 5B:
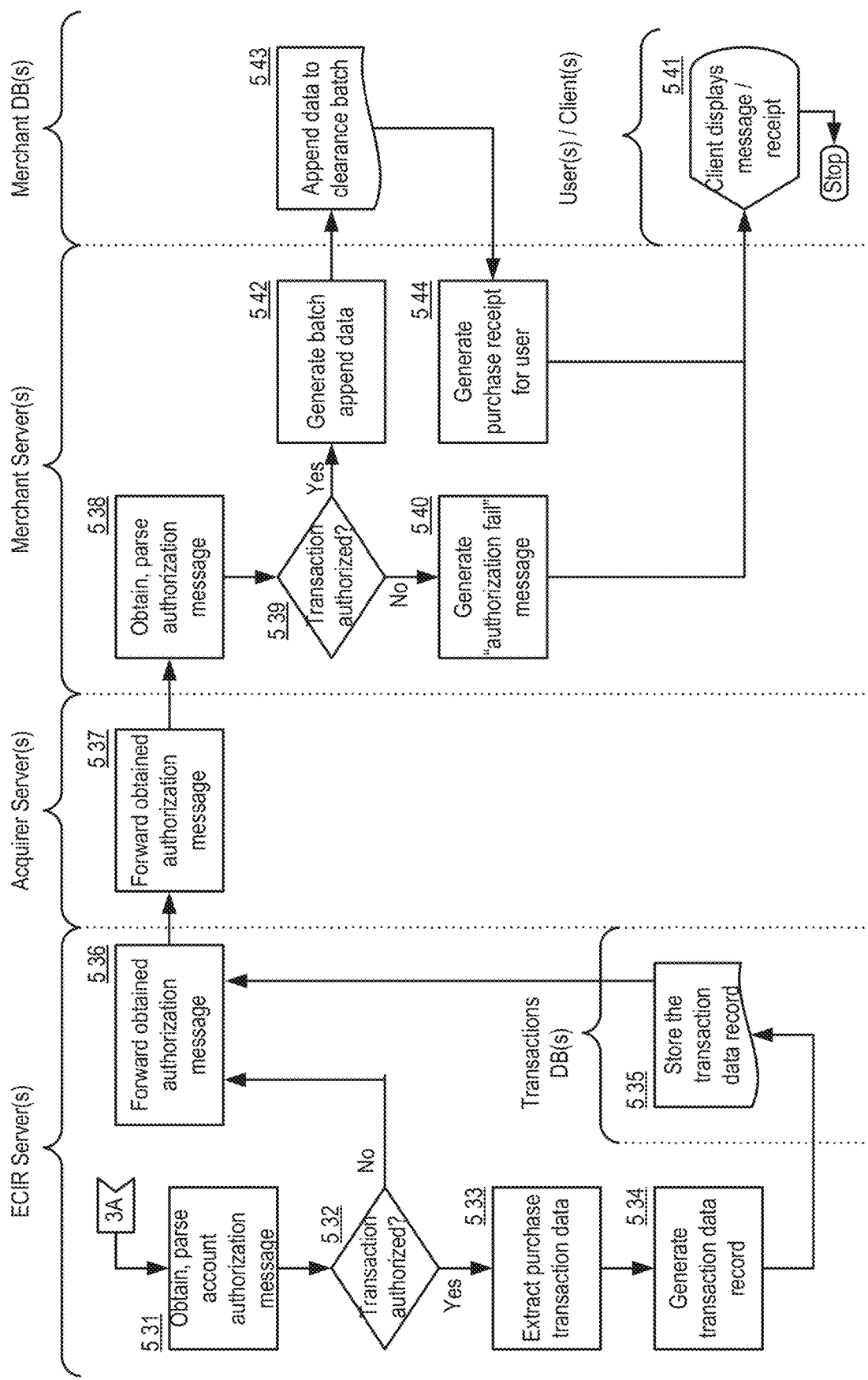

FIGS. 5A-5B show logic flow diagrams illustrating example aspects of redeeming an account-based coupon by coupon PAN number in some embodiments of the ECIR, e.g., a Coupon Redemption component as discussed in FIG. 11. In some implementations, a user may provide user input, e.g., 501, into a merchant's client indicating the user's desire to redeem a coupon from a merchant. The merchant's client may generate a coupon redemption message, e.g., 502, and provide the generated coupon redemption message to the merchant server. In some implementations, the merchant server may obtain, e.g., 503, the coupon redemption message from the client, and may parse the coupon redemption message to extract details of the coupon from the user. Example parsers that the merchant client may utilize are discussed further below with reference to FIG. 11. The merchant server may generate an account query request, e.g., 504, to determine whether the transaction can be processed. For example, the merchant server may process the transaction only if the user has sufficient funds to pay for the purchase in an account provided with the coupon. The merchant server may provide the generated account query request to an acquirer server. The acquirer server may generate an account authorization request, e.g., 506, using the obtained account query request, and provide the account authorization request to the ECIR server. In some implementations, the ECIR server may obtain the account authorization request from the acquirer server, and may parse the account authorization request to extract details of the request. Using the extracted fields and field values, the ECIR server may generate a query, e.g., 508, for an issuer server corresponding to the user's account. In response to obtaining the issuer server query the pay network database may provide, e.g., 509, the requested issuer server data to the ECIR server. In some implementations, the ECIR server may utilize the issuer server data to generate a forwarding account authorization request, e.g., 510, to redirect the account authorization request from the acquirer server to the issuer server. The ECIR server may provide the account authorization request to the issuer server. In some implementations, the issuer server may parse, e.g., 511, the account authorization request, and based on the request details may query a database, e.g., 512, for data of the user's account. In response, the database may provide the requested user data 513. On obtaining the user data, the issuer server may determine whether the user can pay for the transaction using funds available in the account, e.g., 514. For example, the issuer server may determine whether the user has a sufficient balance remaining in the account, sufficient credit associated with the account, and/or the like, by comparing the data from the database with the transaction cost obtained from the card authorization request. The issuer server may also determine whether the coupon (i.e., the account) has been used before 515, whether the expiration date is in the future 516, whether the CVV/CVV2 code is valid 517, and/or whether the merchant ID associated with the coupon is the same as the merchant ID when coupon is issued 518. If the issuer server determines that the account is valid and active, the server may provide an authorization message, e.g., 519, to the ECIR server.

In some implementations, the ECIR server may obtain the authorization message, and parse the message to extract authorization details 531. Upon determining that the coupon is valid and/or the user possesses sufficient funds for the transaction (e.g., 532, option "Yes"), the ECIR server may extract the transaction card from the authorization message and/or account authorization request, e.g., 533, and generate a transaction data record, e.g., 534, using the account transaction details. The ECIR server may provide the transaction data record for storage, e.g., 535, to a database. In some implementations, the ECIR server may forward the authorization message, e.g., 536, to the acquirer server, which may in turn forward the authorization message, e.g., 537, to the merchant server. The merchant may obtain the authorization message, and parse the authorization message o extract its contents, e.g., 538. The merchant server may determine whether the user possesses sufficient funds in the account to conduct the transaction. If the merchant server determines that the user possess sufficient funds, e.g., 539, option "Yes," the merchant server may add the record of the transaction for the user 542 to a batch of transaction data relating to authorized transactions, e.g., 543. The merchant server may also generate a purchase receipt, e.g., 544, for the user. If the merchant server determines that the user does not possess sufficient funds, e.g., 539, option "No," the merchant server may generate an "authorization fail" message, e.g., 540. The merchant server may provide the purchase receipt or the "authorization fail" message to the client. The client may render and display, e.g., 541, the purchase receipt for the user.

Figure 6C:
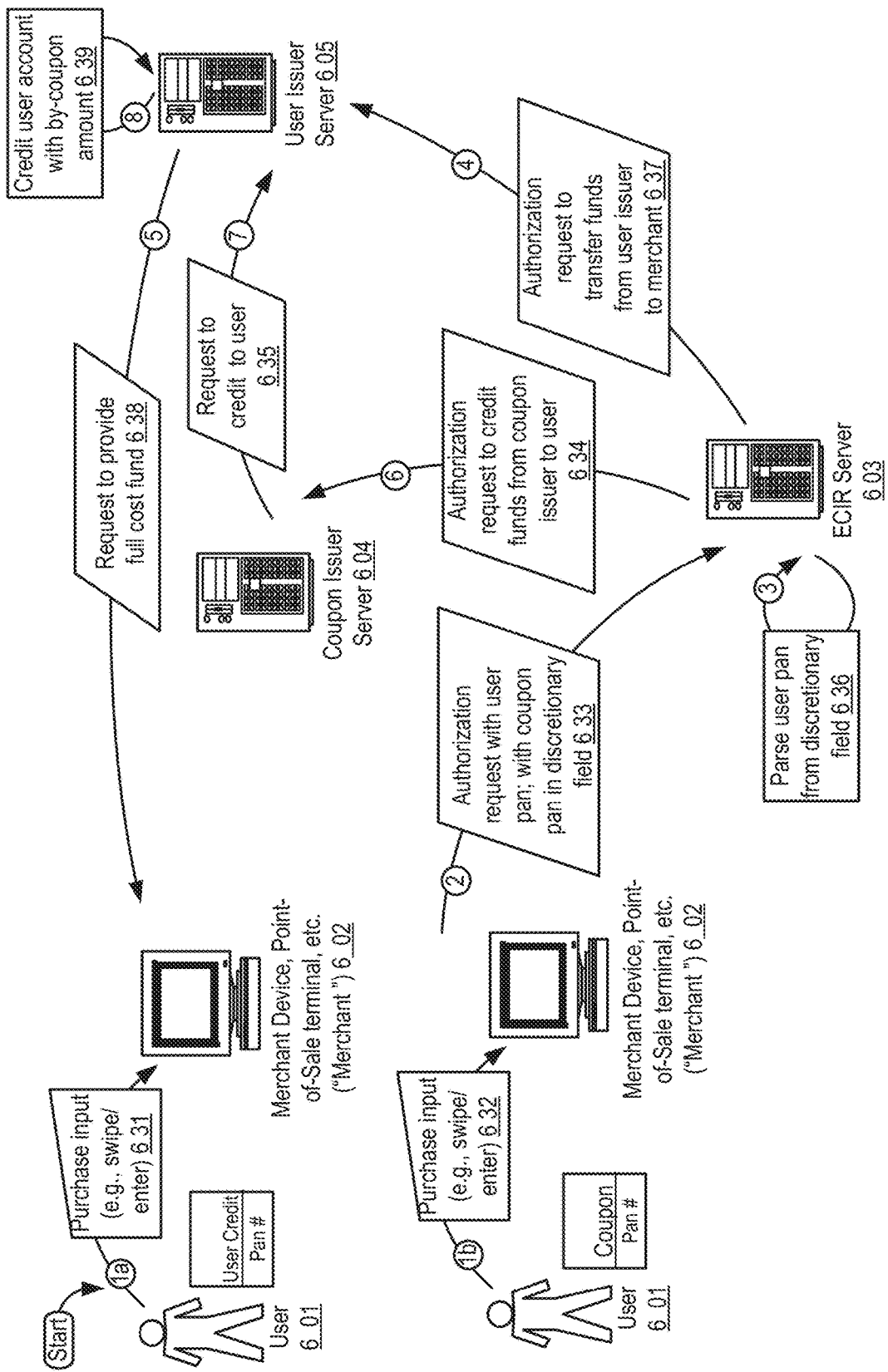

FIGS. 6A-6C show data flow diagrams illustrating example aspects of coupon redemption by two accounts at the same time: the coupon account and the user's personal account (e.g., user's credit card, etc.) in various embodiments of the ECIR. FIG. 6A shows an example of using the coupon account as the main account for transaction payment, the user's personal account as the secondary account. In some embodiments, a user 601 may desire to purchase a product or products ("products") from a merchant, while the coupon value is less than the full cost of the products. For example, the user may desire to purchase a movie ticket (worth of $12) and a bag of popcorn ($5) at a movie theatre. The coupon ($6 for a $12 ticket) may be redeemed only for the movie ticket. Therefore the user may use a personal account, as a secondary account, to purchase the popcorn ($5). The user may provide purchase input at the merchant device 602. The purchase input may include presenting the coupon to the merchant's employee, entering the account number associated with the coupon, scanning the coupon, swiping the coupon card, and/or the like 611. As a secondary card, the user's personal account may be provided to the merchant 612. The merchant's employee may enter the coupon account information as the main account for payment, and enter the user's personal account in a discretionary field as secondary account for payment. The merchant's device may generate and send an authorization request to the ECIR server 603 to authenticate, authorize, and charge the accounts 613. The authorization request may include the coupon account information, with user's account information in the discretionary field. Upon receiving the authorization request, the ECIR server may generate and send an authorization request to a coupon issuer server 604 (i.e., an issuer financial institution which may facilitate with the issuance of the coupon and the management of the coupon account), to provide funds from the coupon issuer to the merchant 614. The coupon issuer server may forward the request to the merchant's device (or merchant's server) to process the payment 615. Upon receiving the authorization request, the ECIR server may parse the request and obtain the user's personal account information from the discretionary field 616. The ECIR may send an authorization request to the user's issuer server to provide funds from the user's issuer to the merchant, in the amount of the difference between the total transaction costs and the coupon provided products value 617. The user issuer server may forward the request to charge the user's personal account to the merchant 618.

FIG. 6B shows an example of using the user's personal account as the main account for transaction payment, the coupon account as the secondary account. In some embodiments, a user 601 may desire to purchase a product or products ("products") from a merchant, while the coupon value is less than the full cost of the products. For example, the user may desire to purchase a movie ticket (worth of $12) and a bag of popcorn ($5) at a movie theatre. The coupon ($6 for a $12 ticket) may be redeemed only for the movie ticket. Therefore the user may use a personal account, as a main account, to purchase the popcorn ($5). The user may provide purchase input at the merchant device 602. The purchase input may include presenting the user's personal account to the merchant's employee, entering the account number associated with the user's account, scanning the user's card, swiping the user's card, and/or the like 621. As a secondary card, the coupon account may be provided to the merchant 622. The merchant's employee may enter the user's personal account information as the main account for payment, and enter the coupon account in a discretionary field as secondary account for payment. The merchant's device may generate and send an authorization request to the ECIR server 603 to authenticate, authorize, and charge the user's personal account 623. The authorization request may include the coupon account information, with user's account information in the discretionary field. Upon receiving the authorization request, the ECIR may send an authorization request to the user's issuer server to provide funds from the user's issuer to the merchant, in the amount of the difference between the total transaction costs and the coupon provided products value 627. The user issuer server may forward the request to charge the user's personal account to the merchant 628. Upon receiving the authorization request, the ECIR server may parse the request and obtain the coupon account information from the discretionary field 616. The ECIR server may generate and send an authorization request to a coupon issuer server 604 (i.e., an issuer financial institution which may facilitate with the issuance of the coupon and the management of the coupon account), to provide funds from the coupon issuer to the merchant 624. The coupon issuer server may forward the request to the merchant's device (or merchant's server) to process the payment 625.

FIG. 6C shows an exemplary embodiment of using the coupon account to credit back the excess payment provided by the user's personal account. For example, if the user pays $12 for a movie ticket using the user's personal account, and the coupon, which is provided to the user free of charge, is redeemable to discount the movie ticket by $6, the excess amount paid by the user's personal account, $6, may be credited back to the personal account. The user may provide purchase input at the merchant device 602. The purchase input may include presenting the user's personal account to the merchant's employee, entering the account number associated with the user's account, scanning the user's card, swiping the user's card, and/or the like 631. As a secondary card, the coupon account may be provided to the merchant 632. The merchant's employee may enter the user's personal account information as the main account for payment, and enter the coupon account in a discretionary field as secondary account for payment. The merchant's device may generate and send an authorization request to the ECIR server 603 to authenticate, authorize, and charge the user's personal account 633. The authorization request may include the coupon account information, with user's account information in the discretionary field. Upon receiving the authorization request, the ECIR may send an authorization request to the user's issuer server to provide funds from the user's issuer to the merchant, in the amount of the full transaction cost 637. The user issuer server may forward the request to charge the user's personal account to the merchant 638. Upon receiving the authorization request, the ECIR server may parse the request and obtain the coupon account information from the discretionary field 636. The ECIR server may generate and send an authorization request to a coupon issuer server 604 (i.e., an issuer financial institution which may facilitate with the issuance of the coupon and the management of the coupon account), to credit funds from coupon issuer to the user 634. The coupon issuer server may forward the request to the user issuer server 635 to process the payment 625. The user issuer server may credit the user's personal account with the by-coupon amount 639. In an alternative embodiment, the user issuer server may credit the amount directly to the user's personal account. In another alternative embodiment, the ECIR may receive the excess credit from the coupon issuer and authorize to credit to the user's personal account.

In an alternative embodiment, upon inputting the user's personal account information into the merchant device, the ECIR server may query the database and determine if there is an active coupon associated with the user, without entering the coupon account information. For example, the user may swipe personal credit card at a merchant POS to purchase a product. The credit card information may be provided to the ECIR server to process the transaction. The ECIR server may parse the credit card account information to retrieve the user name or other account information. The ECIR server may query database for coupon information that user has purchased that relates to the merchant. If a related coupon is identified, the ECIR server may automatically process the coupon account information so that the user may receive the purchased product at a discounted price that the coupon provides.

With reference to FIGS. 6A-6C, a card-based transaction input is required to process the transactions with user's personal card account. The user may communicate with a merchant server, e.g., 203, via a client such as, but not limited to: a personal computer, mobile device, television, point-of-sale terminal, and/or the like. For example, the user may provide user input into the client indicating the user's desire to purchase the product. In various implementations, the user input may include, but not be limited to: keyboard entry, mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the merchant, and may select a product from the website via clicking on a hyperlink presented to the user via the website.

In some implementations, the client may generate a purchase order message, and provide the generated purchase order message to the merchant server. For example, a browser application executing on the client may provide, on behalf of the user, a (Secure) Hypertext Transfer Protocol ("HTTP(S)") GET message including the product order details for the merchant server in the form of data formatted according to the eXtensible Markup Language ("XML"). Below is an example HTTP(S) GET message including an XML-formatted purchase order message for the merchant server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
```

```
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <account_params>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</purchase_order>
```

Figure 7:
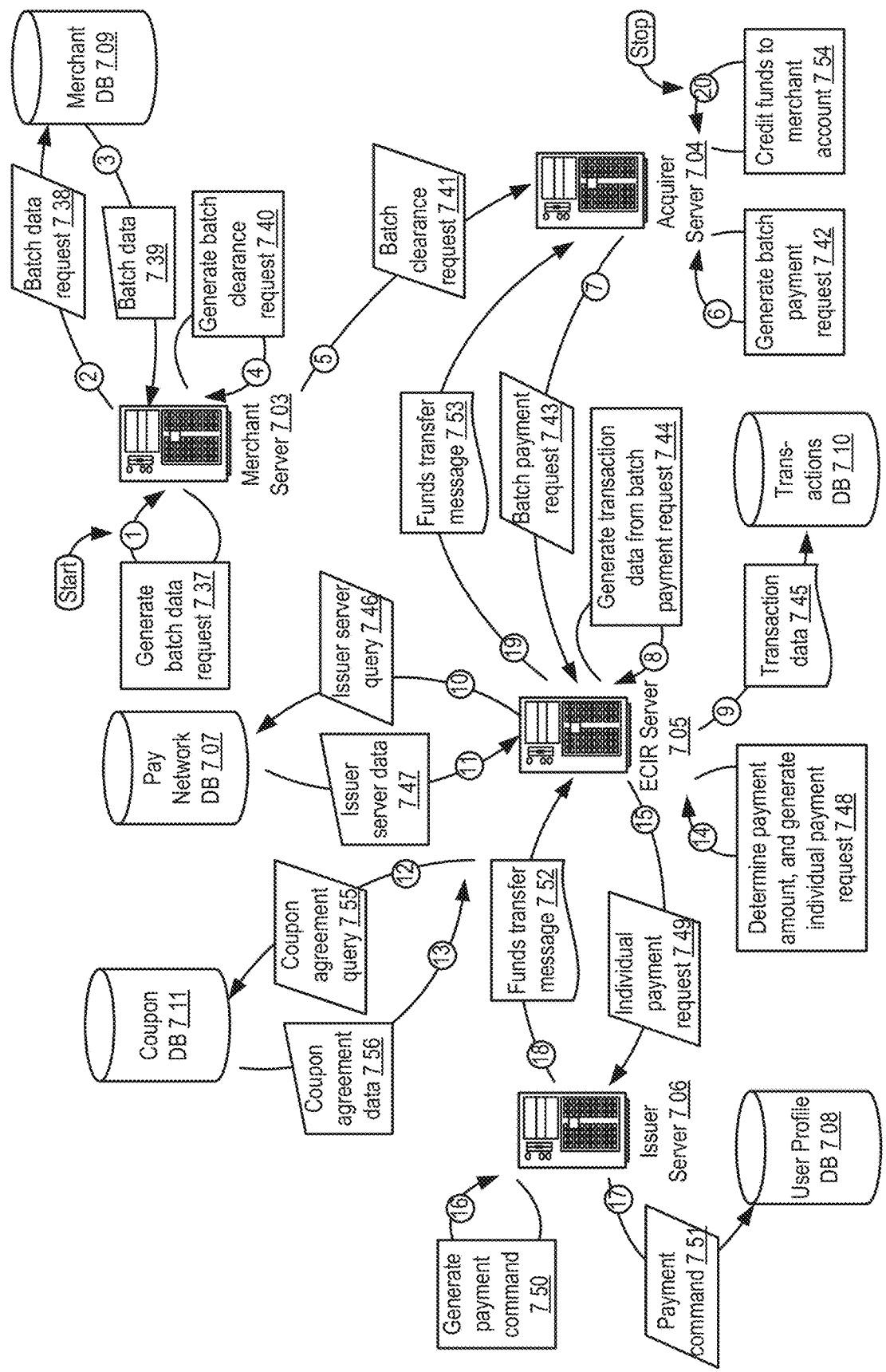
FIG. 7 shows a data flow diagram illustrating example aspects of funds settlement in some embodiments of the ECIR.

FIG. 7 shows a data flow diagram illustrating example aspects of funds settlement in some embodiments of the ECIR, e.g., a Coupon Funds Settlement component as discussed in FIG. 11. For example, payment may be provided by the user to the coupon issuer server when purchasing the coupon. Once coupon is redeemed, a fraction or all of the payment may be provided to the merchant by the coupon issuer server. The ECIR may facilitate such funds settlement. In some embodiments, the merchant server may initiate clearance of a batch of authorized transactions. For example, the merchant server may generate a batch data request, e.g., 737, and provide the request, e.g., 738, to a database, e.g., merchant database 709. For example, the merchant server may utilize PHP/SQL commands similar to the examples provided above to query a relational database. In response to the batch data request, the database may provide the requested batch data, e.g., 739. The server may generate a batch clearance request, e.g., 740, using the batch data obtained from the database, and provide, e.g., 741, the batch clearance request to an acquirer server, e.g., 704. For example, the merchant server may provide a HTTP(S) POST message including XML-formatted batch data in the message body for the acquirer server. The acquirer server may generate, e.g., 742, a batch payment request using the obtained batch clearance request, and provide the batch payment request to the ECIR server, e.g., 743. The ECIR server may parse the batch payment request, and extract the transaction data for each transaction stored in the batch payment request, e.g., 744. The ECIR server may store the transaction data, e.g., 745, for each transaction in a database, e.g., transactions database 710. For each extracted transaction, the ECIR server may query, e.g., 746, a database, e.g., pay network database 707, for an address of an issuer server. For example, the ECIR server may utilize PHP/SQL commands similar to the examples provided above. The ECIR server may also query, e.g., 755, a database, e.g., coupon database 711, for a pre-determined agreement between the GBC and the merchant which may specify the percentage of the funds settlement. The database may provide the agreement data 756 to the ECIR server. For example, the ECIR server may issue PHP/SQL commands similar to the example provided below:

```
<?PHP
header('Content-Type: text/plain');
mysql_connect("254.93.179.112",$DBserver,$password); // access
database server
mysql_select_db("USERS.SQL"); // select database table to search
//create query for user data
$query = "SELECT coupon_ID merchant_ID FROM CouponTable
MerchantsTable WHERE
coupon_ID LIKE '%' $couponID" merchant_ID LIKE '%'
$merchantID;
$result = mysql_query($query); // perform the search query
mysql_close("USERS.SQL"); // close database access
?>
```

The ECIR server may determine a payment amount based on the retrieved agreement data, and generate an individual payment request, e.g., 748, for each transaction for which it has extracted transaction data, and provide the individual payment request, e.g., 749, to the issuer server, e.g., 706. For example, the ECIR server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</
        merchant_auth_key>
    </merchant_params>
    <purchase_summary>
        <num_products>1</num_products>
        <product>
            <product_summary>Book - XML for
dummies</product_summary>
            <product_quantity>1</product_quantity?
        </product>
    </purchase_summary>
</pay_request>
```

In some implementations, the issuer server may generate a payment command, e.g., 750. For example, the issuer server may issue a command to deduct funds from the user's account (or add a charge to the user's credit card account). The issuer server may issue a payment command, e.g., 751, to a database storing the user's account information, e.g., user profile database 708. The issuer server may provide a funds transfer message, e.g., 752, to the ECIR server, which may forward, e.g., 753, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
        <request_ID>CNI4ICNW2</request_ID>
        <clear_flag>true</clear_flag>
        <timestamp>2011-02-22 17:00:02</timestamp>
        <deposit_amount>$34.78</deposit_amount>
</deposit_ack>
```

In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 754.

Figure 8A:
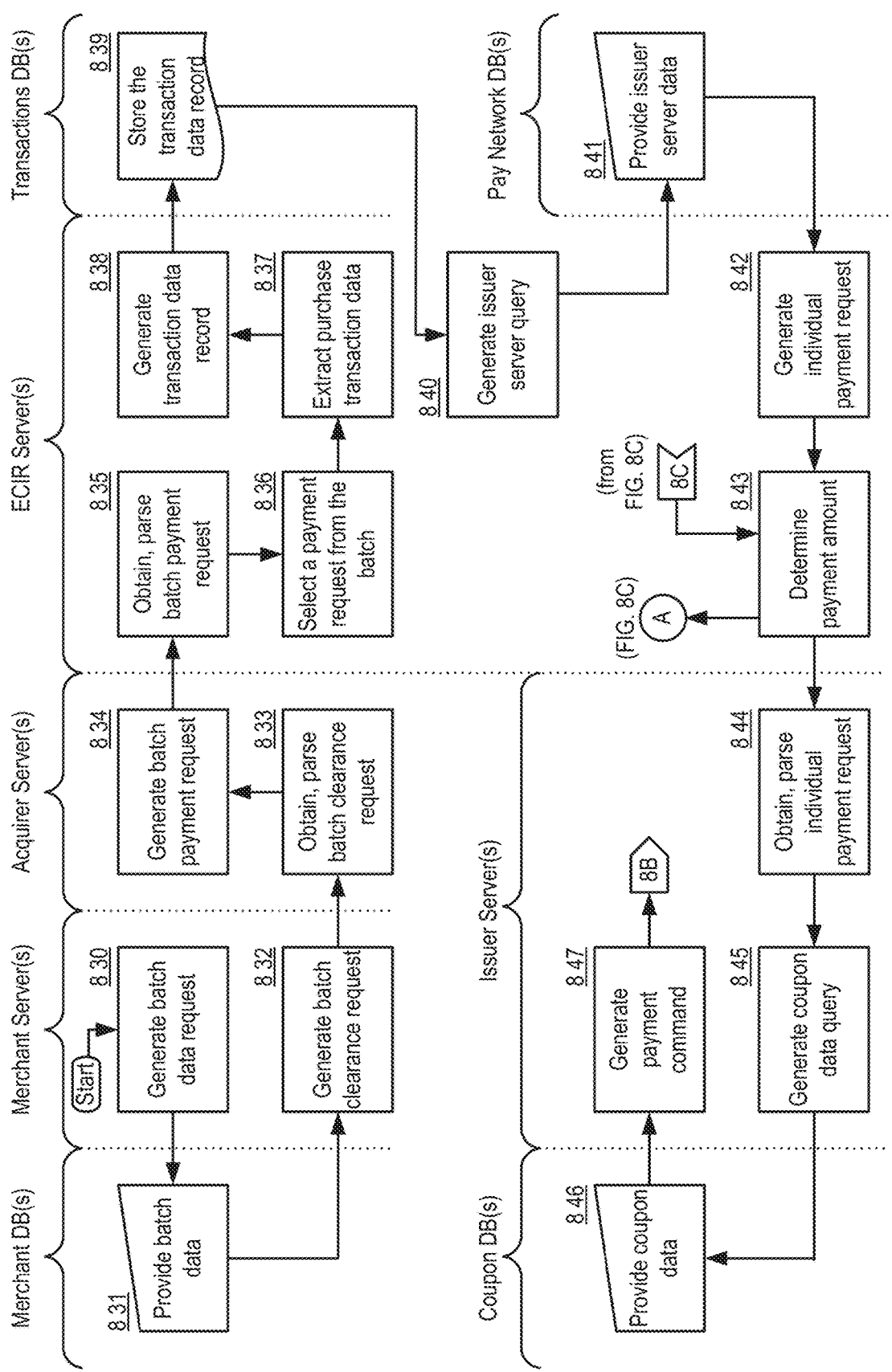
FIG. 8A-C show logic flow diagrams illustrating example aspects of the funds settlement component in various embodiments of the ECIR.
Figure 8B:
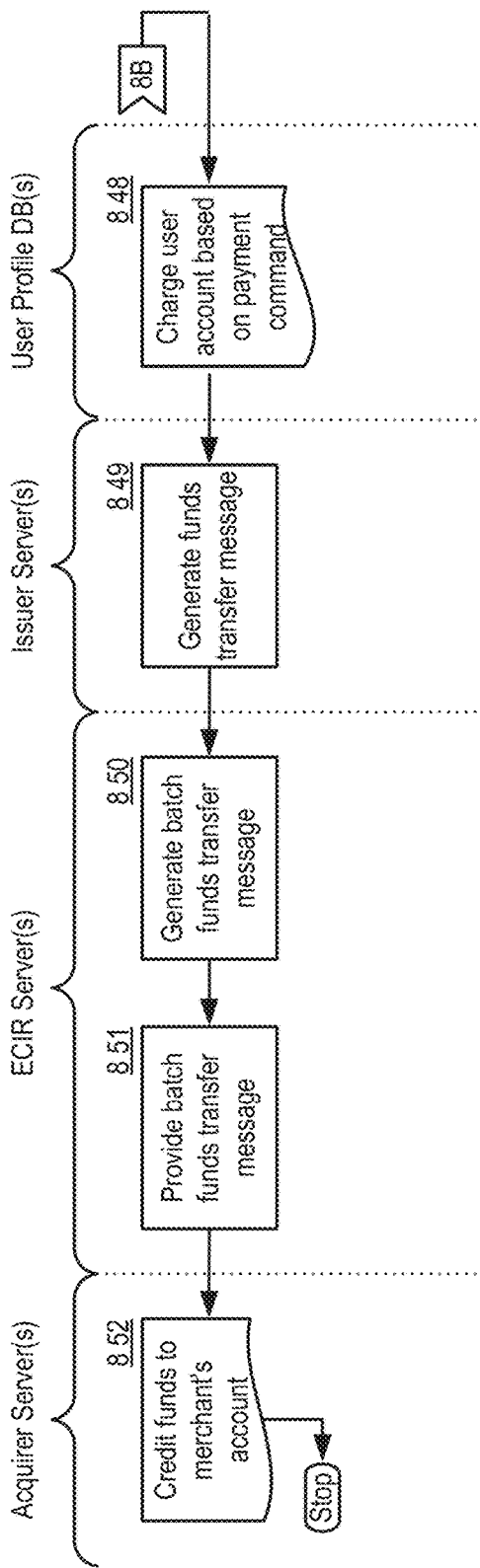
Figure 8C:
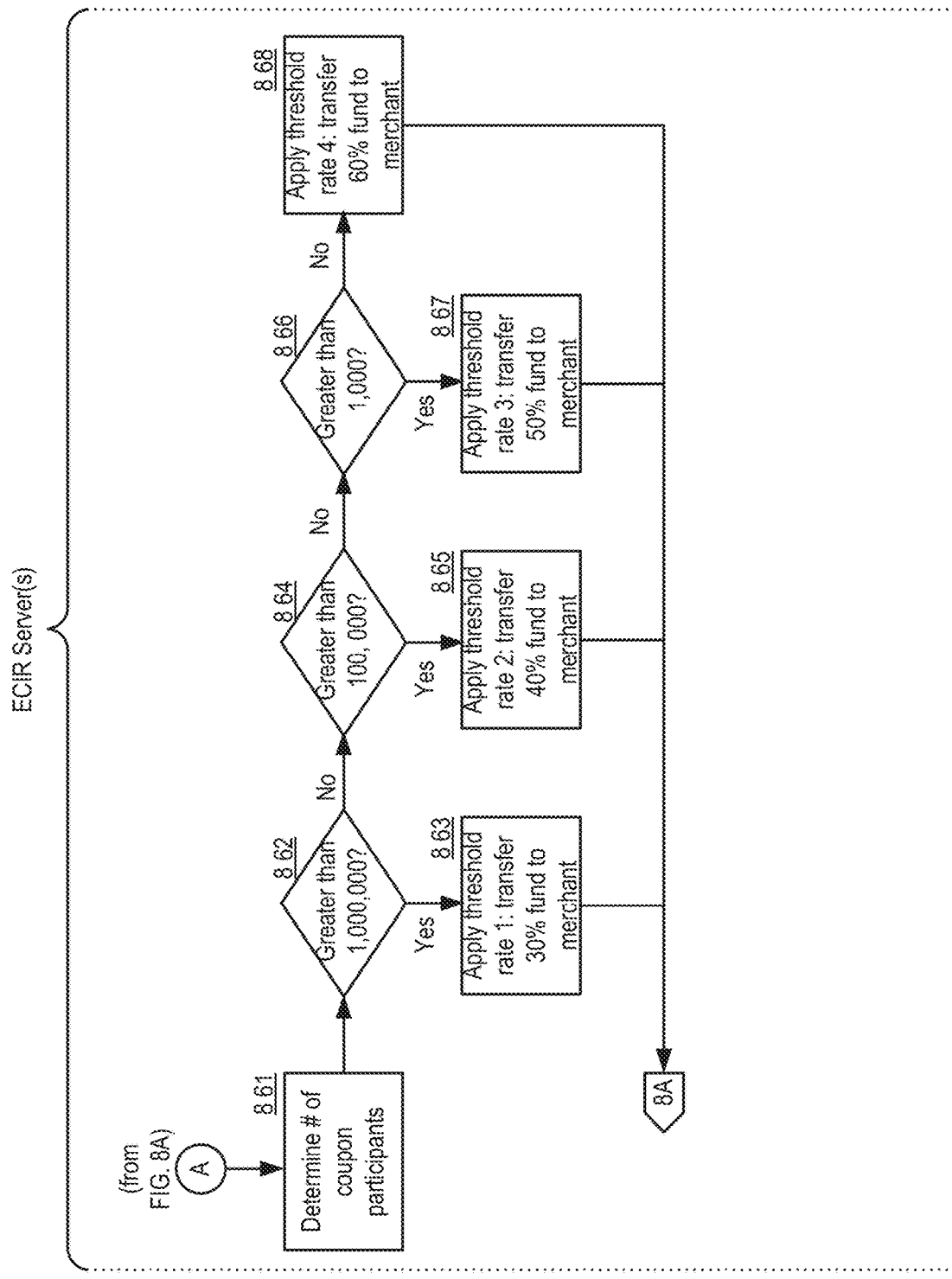
Figure 9A:
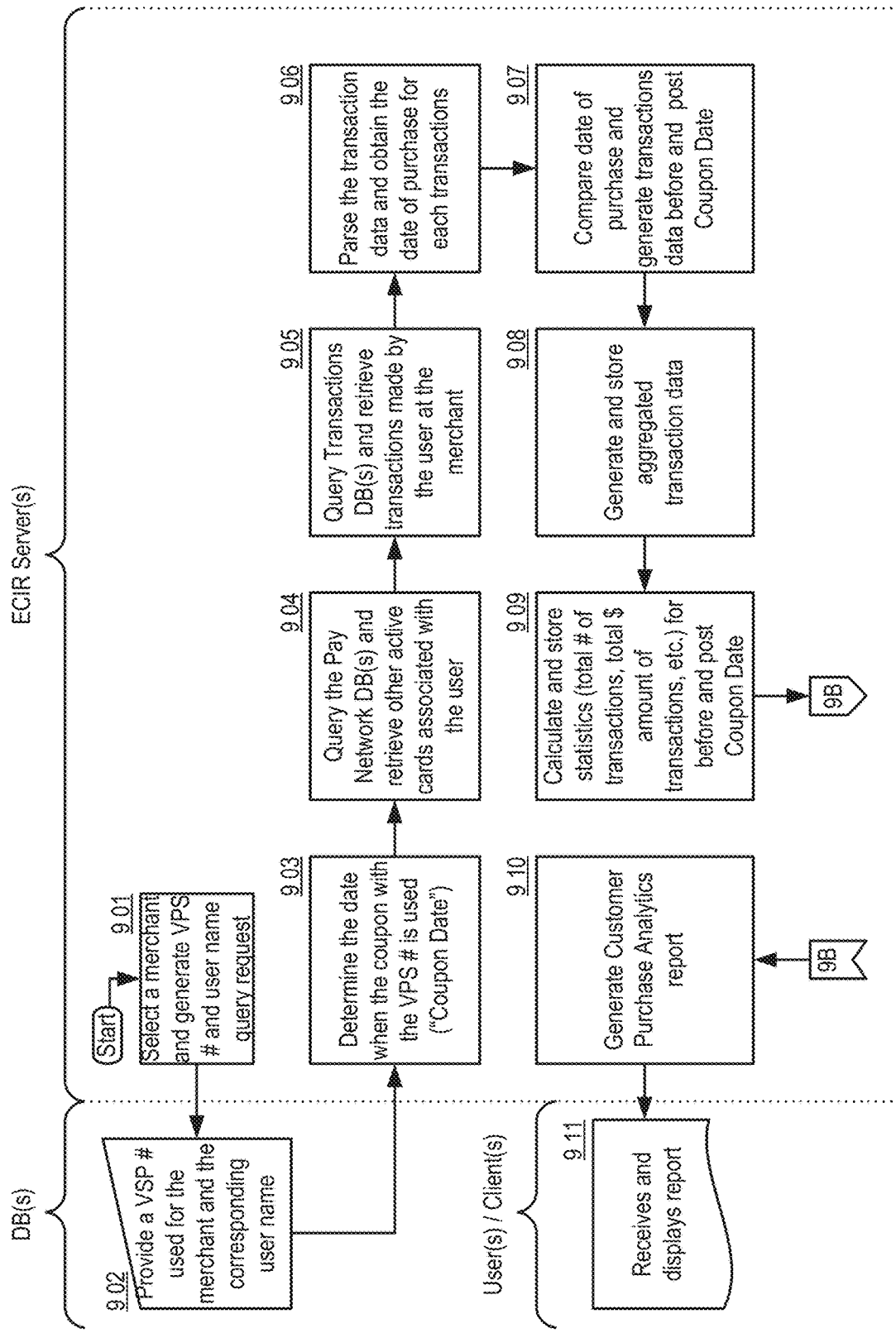
FIGS. 9A-D show flow chart diagrams illustrating example aspects of providing customer purchase analytics in various embodiments of the ECIR.
Figure 9B:
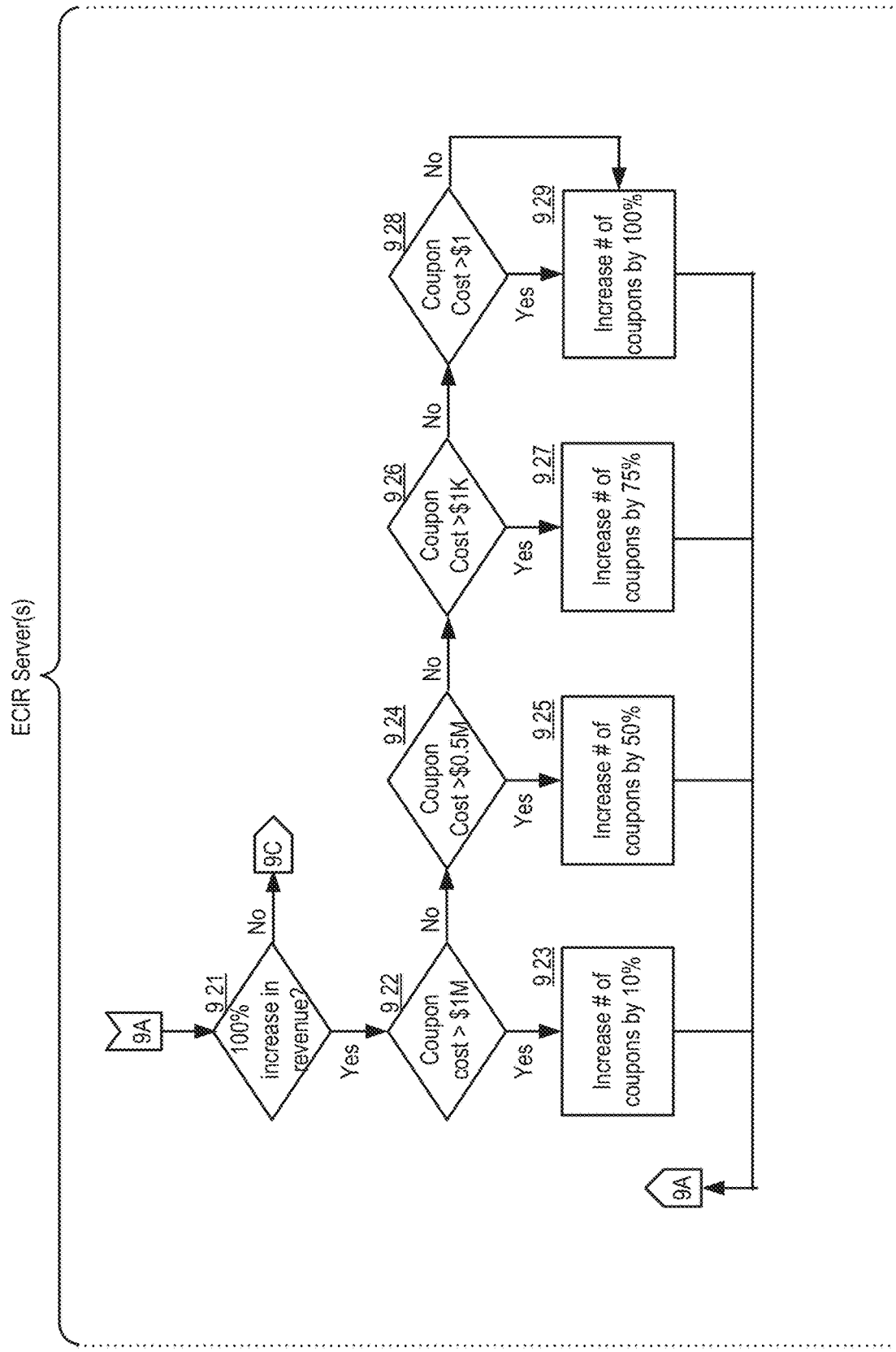
Figure 9C:
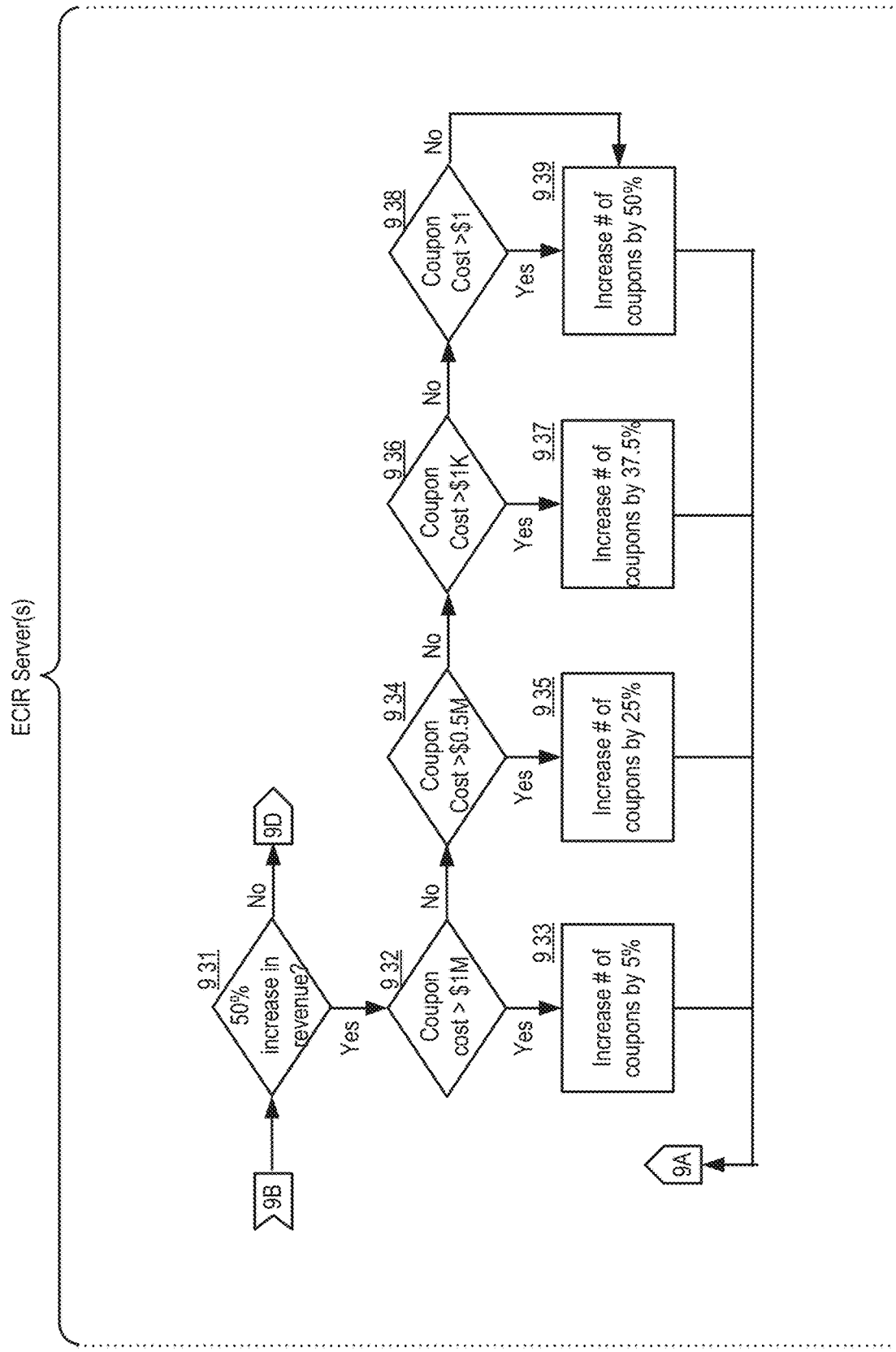
Figure 9D:
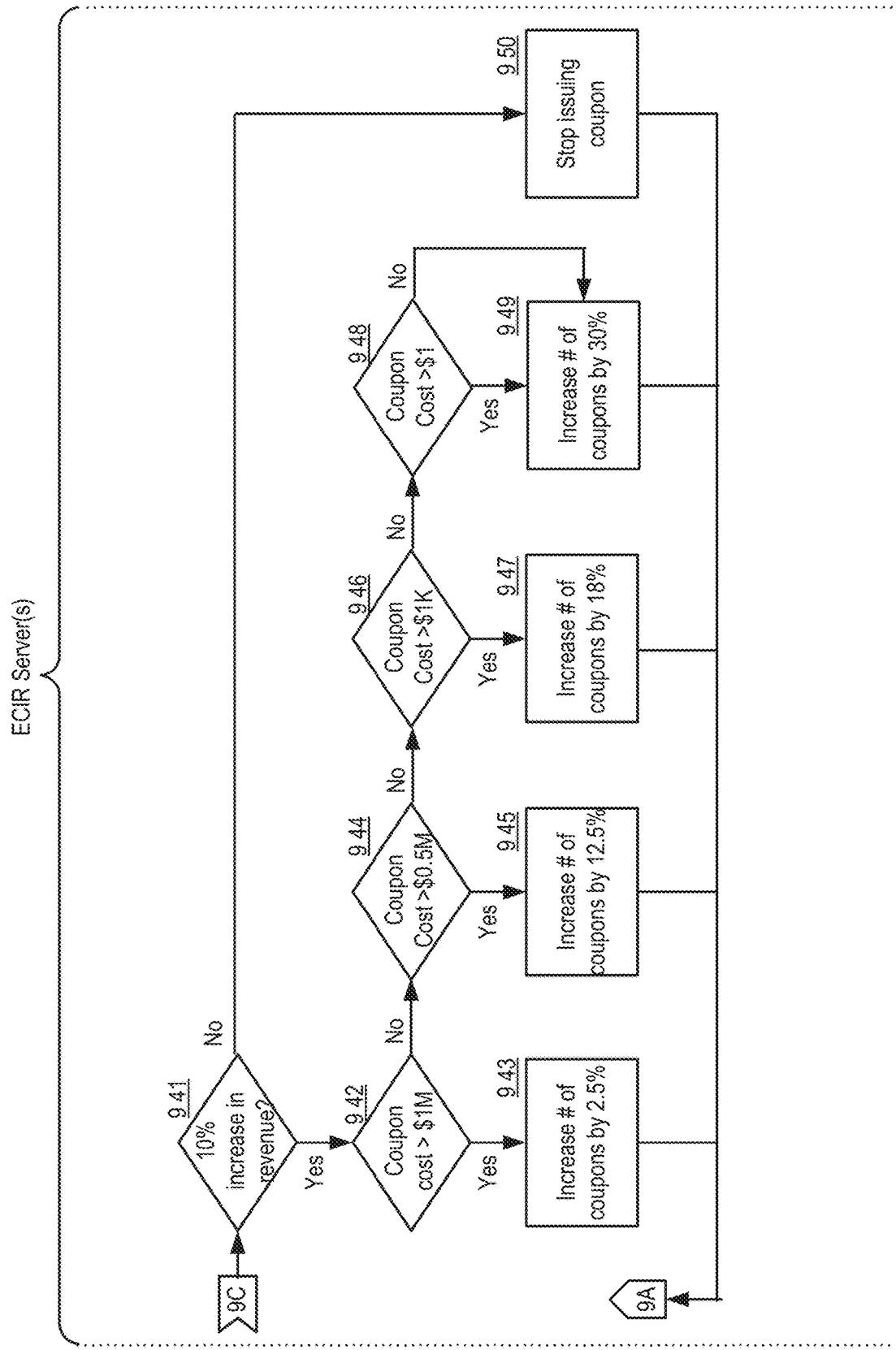

FIG. 8A-8C show logic flow diagrams illustrating example aspects of the funds settlement component in various embodiments of the ECIR. In some implementations, the merchant server may initiate clearance of a batch of authorized transactions by generating a batch data request, e.g., 830, and providing the request to a database. In response to the batch data request, the database may provide the requested batch data, e.g., 831, to the merchant server. The server may generate a batch clearance request, e.g., 832, using the batch data obtained from the database, and provide the batch clearance request to an acquirer server. The acquirer server may generate, e.g., 834, a batch payment request using the obtained batch clearance request, and provide the batch payment request to a ECIR server. The ECIR server may parse, e.g., 835, the batch payment request, select a transaction stored within the batch data, e.g., 836, and extract the transaction data for the transaction stored in the batch payment request, e.g., 837. The ECIR server may generate a transaction data record, e.g., 838, and store the transaction data, e.g., 839, the transaction in a database. For the extracted transaction, the ECIR server may generate an issuer server query, e.g., 840, for an address of an issuer server maintaining the account of the user requesting the transaction. The ECIR server may provide the query to a database. In response, the database may provide the issuer server data requested by the ECIR server, e.g., 841. The ECIR server may generate an individual payment request, e.g., 842, for the transaction for which it has extracted transaction data, and provide the individual payment request to the issuer server using the issuer server data from the database. The ECIR server may determine the payment amount based on the pre-determined agreement between the merchant and the GBC 843. Details are discussed in FIG. 8C.

In some implementations, the issuer server may obtain the individual payment request, and parse, e.g., 844, the individual payment request to extract details of the request. Based on the extracted data, the issuer server may generate a coupon data query 845 to retrieve the coupon issuance agreement between the merchant and the GBC. Upon receiving the coupon data from the coupon database 846, the issuer server may generate a payment command, e.g., 847. For example, the issuer server may issue a command to deduct funds from the user's account (or add a charge to the user's credit card account). The issuer server may issue a payment command, e.g., 848, to a database storing the user's account information. In response, the database may update a data record corresponding to the user's account to reflect the debit/charge made to the user's account. The issuer server may provide a funds transfer message, e.g., 849, to the ECIR server after the payment command has been executed by the database.

In some implementations, the ECIR server may check whether there are additional transactions in the batch that need to be cleared and funded. If there are no additional transactions, the ECIR server may generate, e.g., 850, an aggregated funds transfer message reflecting transfer of all transactions in the batch, and provide, e.g., 851, the funds transfer message to the acquirer server. The acquirer server may, in response, transfer the funds specified in the funds transfer message to an account of the merchant, e.g., 852.

FIG. 8C shows a flow chart diagram illustrating example aspects of determining payment amount distribution between coupon issuer company (e.g., GBC) and merchant participating the coupon program in various embodiments of ECIR. In some embodiments, the ECIR server may determine number of people who purchased the coupon 861. If there are more than 1 million people purchased the coupon 862, a threshold rate 1 may be applied to distribute the coupon revenue. For example, the threshold rate 1 may be that 30% of the coupon revenue may be provided to the merchant 863. If the number of people who purchased the coupon 864 is between 1,000,000 and 100,000, threshold rate 2 may be applied to distribute the coupon revenue. For example, the threshold rate 2 may be that 40% of the coupon revenue may be provided to the merchant 865. If the number of people who purchased the coupon 866 is between 100,000 and 1,000, threshold rate 3 may be applied to distribute the coupon revenue. For example, the threshold rate 3 may be that 50% of the coupon revenue may be provided to the merchant 867. If the number of people who purchased the coupon 866 is less than 1,000, threshold rate 4 may be applied to distribute the coupon revenue. For example, the threshold rate 4 may be that 60% of the coupon revenue may be provided to the merchant 868. Once the distribution amount is determined 843, the ECIR server may continue with the funds settlement process as discussed in FIG. 8A.

In one embodiment, the ECIR server may facilitate a "full dollar" model when issuing the coupon. Under the "full dollar" model, the prepaid coupon account may be funded upon issue with the net amount due to the merchant. When the coupon is redeemed, the merchant may discount the purchase price for the gross coupon amount and key-in the account number, expiration date, and/or any other values through their existing POS application. For example, under a $25 coupon for $50 value model, if the consumer pays $25 for the coupon, the prepaid coupon account may be deposited with $25. The merchant may initiate the transaction for $25. The merchant may receive $25 from the transaction within their daily settlement file. In another example, if the consumer pays $25 for the coupon, the GBC may keep $10 and pays the merchant $15. Thus the prepaid coupon account may be funded with $15 and the merchant may initiate the transaction for $15. The merchant may receive $15 from this transaction within their daily settlement file. This model may eliminates the need for GBC remit separate payments to the merchant.

In an alternative embodiment, the ECIR server may facilitate a "nominal dollar" model. Under this model, the prepaid coupon account may be funded upon issue with a nominal dollar amount due to the merchant. For example, in a $25 coupon for $50 value model, the prepaid coupon account may be funded with $0.10. When the coupon is redeemed, the merchant may discount the purchase price for the gross coupon amount and key-in the agreed nominal amount of $0.10, account number, expiration date, and/or any other values through their existing POS application. The merchant may receive $0.10 from this transaction within their daily settlement file. GBC may settle the rest of the fund with the merchant at a later time.

FIGS. 9A-9D show flow chart diagrams illustrating example aspects of providing customer purchase analytics in various embodiments of the ECIR, e.g., a Customer Purchase Analytics component as discussed in FIG. 11. In some embodiments, the ECIR server may manage a user's personal card account. If the account holder has enrolled in the analytics program, the ECIR server may aggregate the enrolled cardholder's historical and live transactional spend data to tailor coupons, segment populations, and provide analysis. For example, the ECIR server may select a merchant and generate a query request, based on the merchant ID, a VPS number used for the merchant and/or the name of the user who used the VPS number to redeem a coupon at the merchant 901. The query request may be sent to one or more databases, which may provide the requested VPS number and user name to the ECIR server 902. With the retrieved data, the ECIR server may determine a date when the coupon with the VPS number is used ("Coupon Date") 903. The ECIR server may query the pay network databases to retrieve active card accounts associated with the user name 904. With the retrieved card accounts data, the ECIR server may query transactions databases to retrieve historical transactions made by the user at the merchant 905. With the retrieved transaction data, the ECIR server may parse the transaction data and obtain the date of purchase for each transaction 906. The ECIR server may compare the date of purchase for each transaction and generate copies of transactions data before and post the Coupon Date, respectively 907. The ECIR server may generate and store the aggregated transaction data 908. The ECIR server may calculate statistics for time periods before and post the Coupon Date 909. The statistics may include, but not limited to, the total number of transactions, the total dollar amount of transactions, and/or the like.

In some embodiments, with the analytics data, the ECIR server may facilitate the coupon issuer company (e.g., GBC) and/or the merchant to tailor the coupons in the future to help improve sales. The ECIR server may provide analysis may include, but not limited to: how often a consumer comes back to the merchant after a coupon is redeemed at the merchant; how quickly a consumer goes to the merchant to redeem the coupon, and/or the like. The ECIR server may also provide analysis such as tailoring specific offers sent to customers based on the spend history of the enrolled card to help improve sales; utilizing the live card purchase data of enrollees to determine the location (or other triggering factors) of the consumer's purchase and to trigger alerts of coupons through SMS, Email or Mobile Applications; enabling improved participation of merchants by utilizing the transaction data of enrolled consumers to control distribution to control distribution of offers and to create offers tailored to consumers spend with merchant on the enrolled card; providing aggregated post coupon redemption sale data on enrolled cards at merchant to determine customer loyalty (e.g., does the customer transact again?) and to determine up sell beyond the original amount by reviewing average ticket size; and/or the like.

For example, if the merchant has a 100% increase in revenue since last coupon issuance 921, the ECIR server may increase the number of coupons by different amount depending on the cost of the coupon. If the coupon cost 922 is larger than $1,000,000, the ECIR server may increase the number of coupons by 10% 923. If the couple cost 924 is smaller than or equal to $1,000,000 but larger than $500,000, then the ECIR server may increase the number of coupons by 50% 925. If the couple cost 926 is smaller than or equal to $500,000 but larger than $1,000, then the ECIR server may increase the number of coupons by 75% 927. If the couple cost 928 is smaller than or equal to $1,000 but larger than $1, the ECIR server may increase the number of coupons by 100% 929. If the coupon cost is less than $1, the ECIR server may also increase the number of coupons by 100%. If there is not a 100% increase in revenue, the ECIR server may determine whether there is a 50% increase in revenue. If there is a 50% increase in revenue 931, the ECIR server may increase the number of coupons by different amount depending on the cost of the coupon. If the coupon cost 932 is larger than $1,000,000, the ECIR server may increase the number of coupons by 5% 933. If the couple cost 934 is smaller than or equal to $1,000,000 but larger than $500,000, the ECIR server may increase the number of coupons by 25% 935. If the couple cost 936 is smaller than or equal to $500,000 but larger than $1,000, the ECIR server may increase the number of coupons by 37.5% 937. If the couple cost 938 is smaller than or equal to $1,000 but larger than $1, the ECIR server may increase the number of coupons by 50% 939. If there is not a 50% increase in revenue, the ECIR server may determine whether there is a 10% increase in revenue. If there is a 1% increase in revenue 941, the ECIR server may increase the number of coupons by different amount depending on the cost of the coupon. If the coupon cost 942 is larger than $1,000,000, the ECIR server may increase the number of coupons by 2.5% 943. If the couple cost 944 is smaller than or equal to $1,000,000 but larger than $500,000, the ECIR server may increase the number of coupons by 12.5% 945. If the couple cost 946 is smaller than or equal to $500,000 but larger than $1,000, the ECIR server may increase the number of coupons by 18% 947. If the couple cost 948 is smaller than or equal to $1,000 but larger than $1, the ECIR server may increase the number of coupons by 30% 949. If there is not a 10% increase in revenue, the ECIR server may stop issuing coupons 950. When the said information is generated, the ECIR server may generate a report providing the analytics of customer purchase information 910, which may be sent to the user for display 911.

Figure 10:
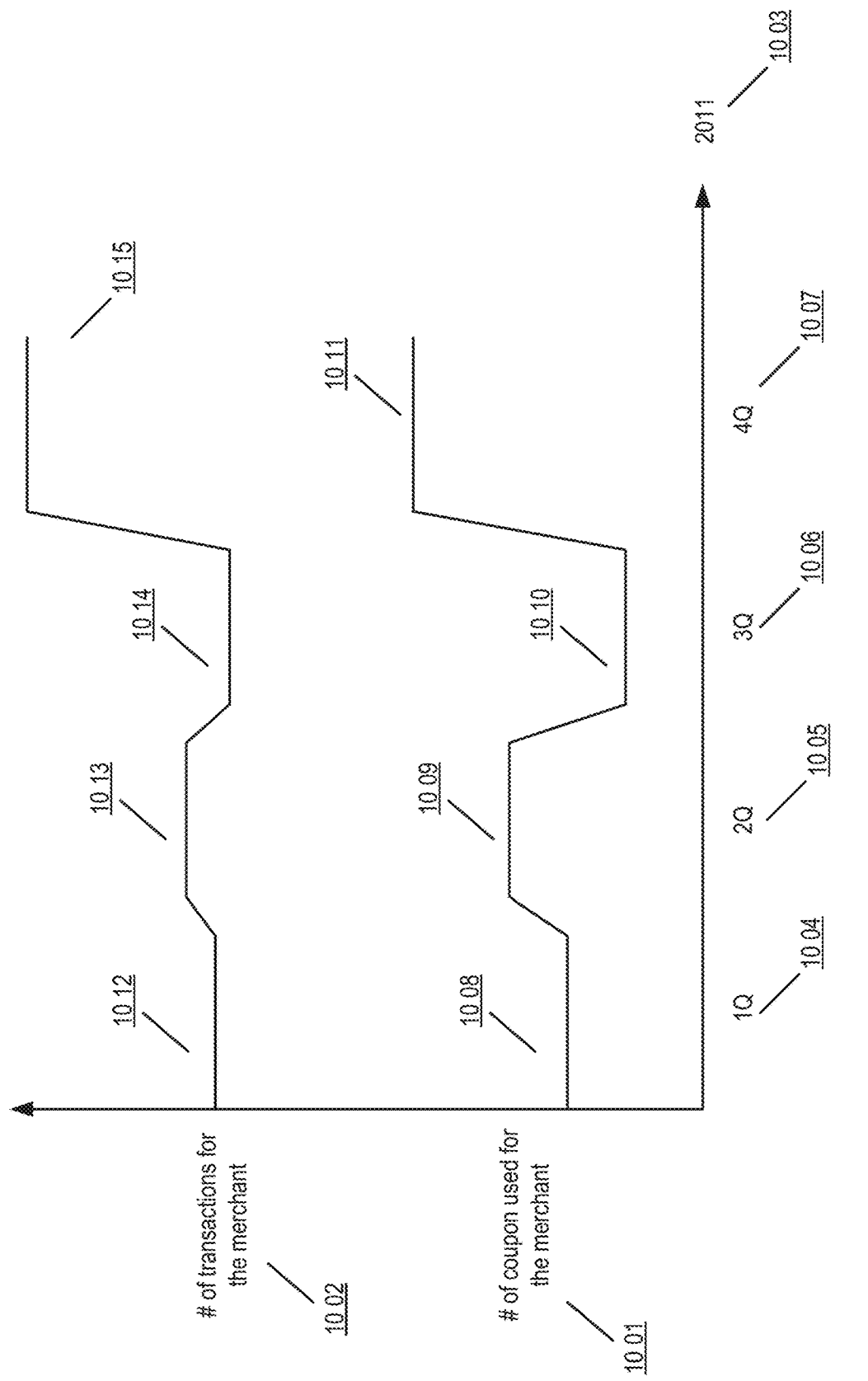
FIG. 10 shows a diagram illustrating example aspects of the correlation between the number of transactions a merchant may have and the number of coupons used by consumers at the merchant, after applying the customer purchase analytics component in various embodiments of ECIR.

FIG. 10 shows a diagram illustrating example aspects of the correlation between the number of transactions a merchant may have and the number of coupons used by consumers at the merchant, after applying the customer purchase analytics component in various embodiments of ECIR. For example, the ECIR generated analytics may provide a timeline of events and demonstrate the impact that the ECIR server may generate on the business of a merchant that uses it. The horizontal axis denotes the 4 quarters of a year (e.g., 2011) 1003, including the first quarter 1004, the second quarter 1005, the third quarter 1006, and the fourth quarter 1007. For each quarter on the horizontal axis, the vertical axis shows the number of coupons used at this merchant after incorporating the ECIR generated analytics report 1001. The vertical axis also shows the number of transactions for the said merchant 1002. In the first quarter, a medium level number of coupons is redeemed at the merchant 1008. The number of transactions is at a medium level 1012. After the first quarter, based on the generated analytics report, the ECIR server may decide to increase the number of coupons 1009. The number of transactions is shown to be increased 1013. In the third quarter, the number of coupons is decreased 1010. The number of transactions is shown to decrease, and is lower than the numbers of transactions in both the first and the second quarters 1014. In the fourth quarter, based on the generated analytics report, the ECIR server may decide to increase the number of coupons to be larger than the numbers of coupons of all preceding quarter 1011. The number of transactions is shown to be higher than the numbers of transactions in all preceding quarters 1015.

Figure 11A:
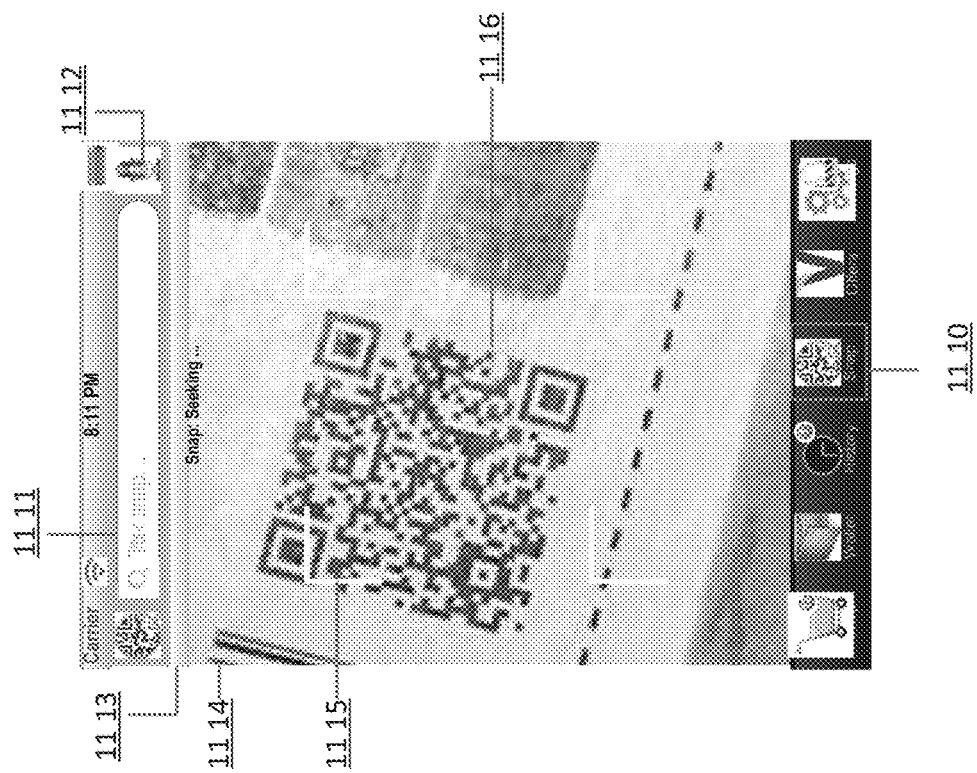
FIGS. 11A-E show user interface diagrams illustrating example features of virtual wallet applications in a snap mode, in some embodiments of the ECIR.

FIGS. 11A-E show user interface diagrams illustrating example features of virtual wallet applications in a snap mode, in some embodiments of the ECIR. With reference to FIG. 11A, in one embodiment, a user may select the snap mode 2110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 11A. A user may use his or her mobile phone to take a picture of a QR code 1115 and/or a barcode 1114. In one implementation, the bar 1113 and snap frame 1115 may assist the user in snapping codes properly. For example, the snap frame 1115, as shown, does not capture the entirety of the code 1116. As such, the code captured in this view may not be resolvable as information in the code may be incomplete. This is indicated by the message on the bar 1113 that indicates that the snap mode is still seeking the code. When the code 1116 is completely framed by the snap frame 1115, the bar message may be updated to, for example, "snap found." Upon finding the code, in one implementation, the user may initiate code capture using the mobile device camera. In another implementation, the snap mode may automatically snap the code using the mobile device camera.

Figure 11B:
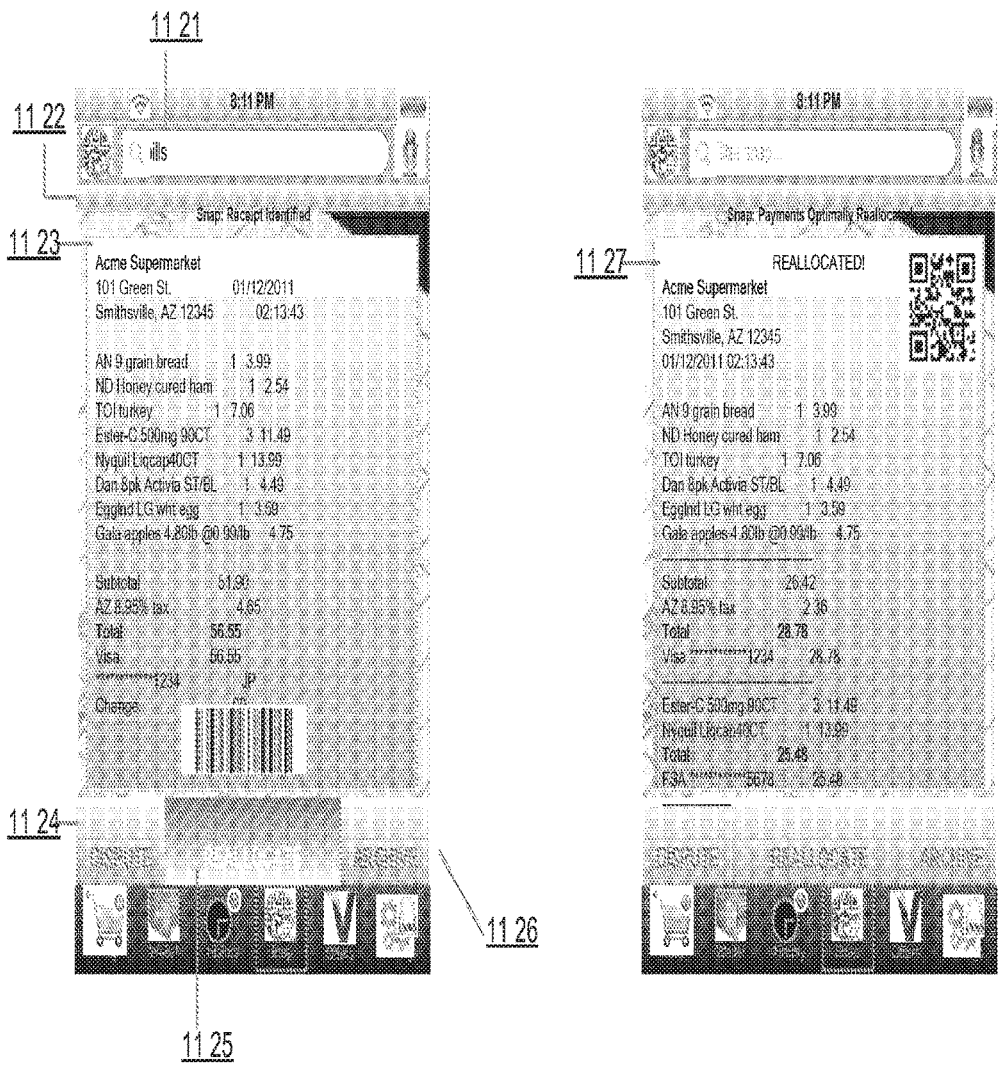

With reference to FIG. 11B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 1122 the receipt 1123 the user wants to reallocate. Alternatively, the user may directly snap a picture of a barcode on a receipt, and the snap mode may generate and display a receipt 1123 using information from the barcode. The user may now reallocate 1125. In some implementations, the user may also dispute the transaction 1124 or archive the receipt 1126.

In one implementation, when the reallocate button 1125 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 1127 may be generated after the completion of the reallocation process. As discussed, the receipt shows that some charges have been moved from the Visa account to the FSA.

Figure 11C:
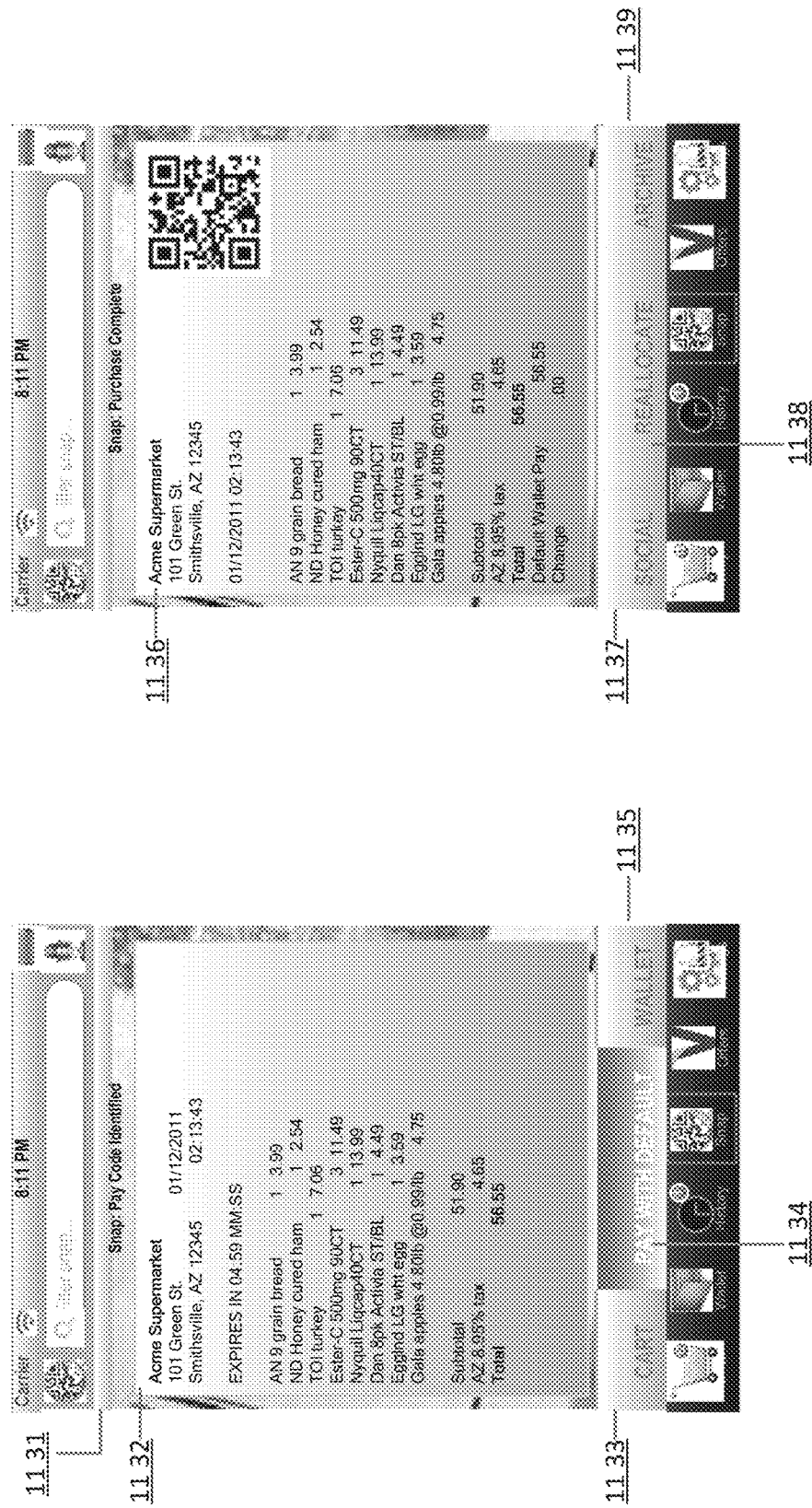

With reference to FIG. 11C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 1132. Once the QR code is identified, the navigation bar 1131 may indicate that the pay code is identified. The user may now have an option to add to cart 1133, pay with a default payment account 1134 or pay with wallet 1135.

In one implementation, the user may decide to pay with default 1134. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 1137 to share purchase information with others, reallocate 1138 as discussed with regard to FIG. 11B, and archive 1139 to store the receipt.

Figure 11D:
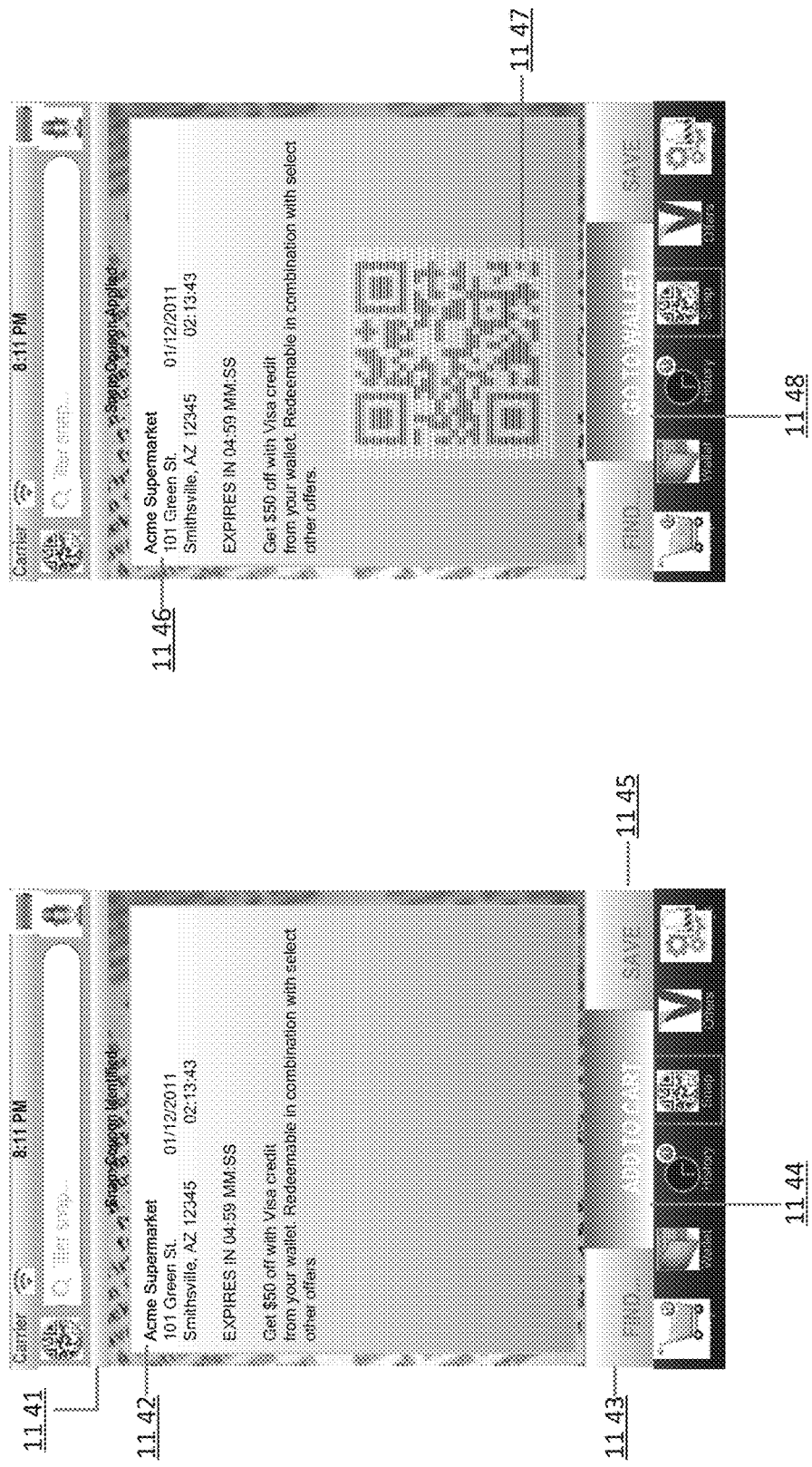

With reference to FIG. 11D, in one embodiment, the snap mode may also facilitate offer identification, application and storage for future use. For example, in one implementation, a user may snap an offer code 1141 (e.g., a bar code, a QR code, and/or the like). The wallet application may then generate an offer text 1142 from the information encoded in the offer code. The user may perform a number of actions on the offer code. For example, the user use the find button 1143 to find all merchants who accept the offer code, merchants in the proximity who accept the offer code, products from merchants that qualify for the offer code, and/or the like. The user may also apply the offer code to items that are currently in the cart using the add to cart button 1144. Furthermore, the user may also save the offer for future use by selecting the save button 1145.

In one implementation, after the offer or coupon 1146 is applied, the user may have the option to find qualifying merchants and/or products using find, the user may go to the wallet using 1148, and the user may also save the offer or coupon 1146 for later use.

Figure 11E:
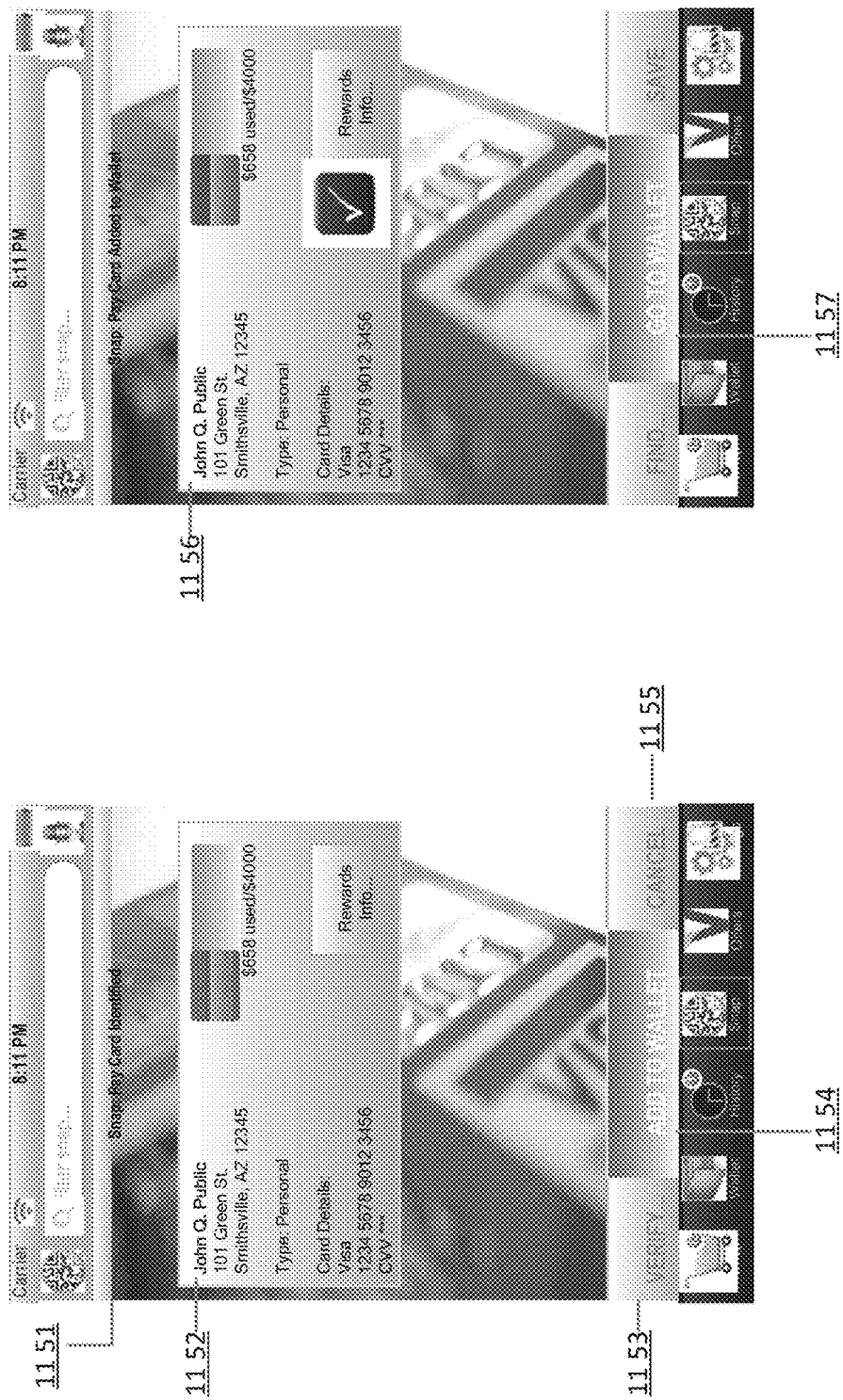

With reference to FIG. 11E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 1151 and may display the textual information 1152 encoded in the pay card. The user may then perform verification of the information 1152 by selecting the verify button 1153. In one implementation, the verification may include contacting the issuer of the pay card for confirmation of the decoded information 1152 and any other relevant information. In one implementation, the user may add the pay card to the wallet by selecting the 'add to wallet' button 1154. The instruction to add the pay card to the wallet may cause the pay card to appear as one of the forms of payment. The user may also cancel importing of the pay card as a funding source by selecting the cancel button 1155. When the pay card has been added to the wallet, the user interface may be updated to indicate that the importing is complete via the notification display 1156. The user may then access the wallet 1157 to begin using the added pay card as a funding source.

ECIR Controller

Figure 12:
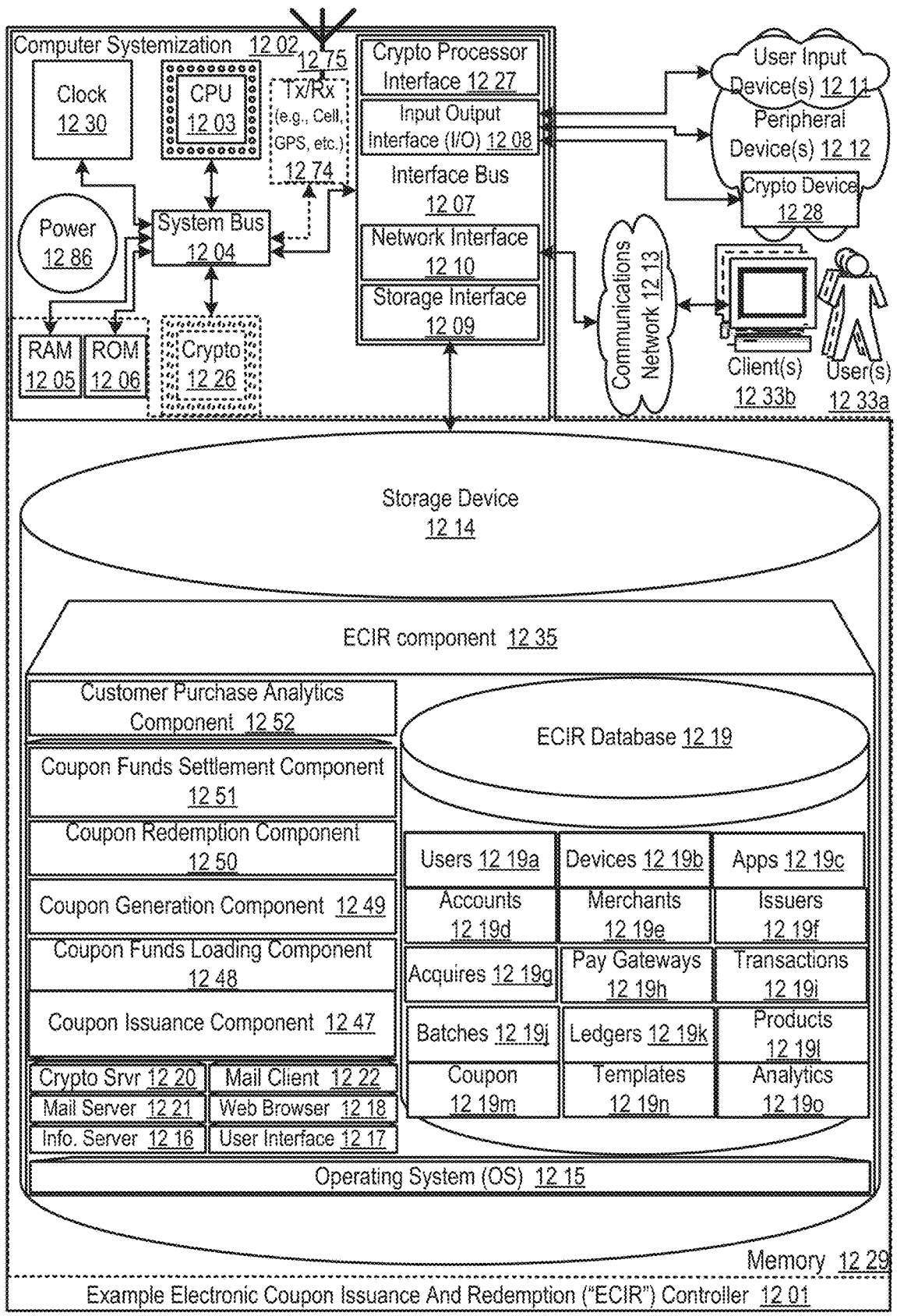
FIG. 12 shows a block diagram illustrating embodiments of a ECIR controller.

FIG. 12 shows a block diagram illustrating embodiments of a ECIR controller. In this embodiment, the ECIR controller 1201 may serve to aggregate, process, store, search, serve, identify, instruct, generate, match, and/or facilitate interactions with a computer through electronic payment technologies, and/or other related data.

Typically, users, which may be people and/or other systems, may engage information technology systems (e.g., computers) to facilitate information processing. In turn, computers employ processors to process information; such processors 1203 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ECIR controller 1201 may be connected to and/or communicate with entities such as, but not limited to: one or more users from user input devices 1211; peripheral devices 1212; an optional cryptographic processor device 1228; and/or a communications network 1213.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ECIR controller 1201 may be based on computer systems that may comprise, but are not limited to, components such as: a computer systemization 1202 connected to memory 1229.

Computer Systemization

A computer systemization 1202 may comprise a clock 1230, central processing unit ("CPU(s)" and/or "processor(s)" (these terms are used interchangeable throughout the disclosure unless noted to the contrary)) 1203, a memory 1229 (e.g., a read only memory (ROM) 1206, a random access memory (RAM) 1205, etc.), and/or an interface bus 1207, and most frequently, although not necessarily, are all interconnected and/or communicating through a system bus 1204 on one or more (mother)board(s) 1202 having conductive and/or otherwise transportive circuit pathways through which instructions (e.g., binary encoded signals) may travel to effectuate communications, operations, storage, etc. The computer systemization may be connected to a power source 1286; e.g., optionally the power source may be internal. Optionally, a cryptographic processor 1226 and/or transceivers (e.g., ICs) 1274 may be connected to the system bus. In another embodiment, the cryptographic processor and/or transceivers may be connected as either internal and/or external peripheral devices 1212 via the interface bus I/O. In turn, the transceivers may be connected to antenna(s) 1275, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing ECIR controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the ECIR controller and beyond through various interfaces. Should processing requirements dictate a greater amount speed and/or capacity, distributed processors (e.g., Distributed ECIR), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the ECIR may be achieved by implementing a microcontroller such as CAST's R8051XC2 microcontroller; Intel's MCS 51 (i.e., 8051 microcontroller); and/or the like. Also, to implement certain features of the ECIR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ECIR component collection (distributed or otherwise) and/or features may be implemented via the microprocessor and/or via embedded components; e.g., via ASIC, coprocessor, DSP, FPGA, and/or the like. Alternately, some implementations of the ECIR may be implemented with embedded components that are configured and used to achieve a variety of features or signal processing.

Depending on the particular implementation, the embedded components may include software solutions, hardware solutions, and/or some combination of both hardware/software solutions. For example, ECIR features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ECIR features. A hierarchy of programmable interconnects allow logic blocks to be interconnected as needed by the ECIR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ECIR may be developed on regular FPGAs and then migrated into a fixed version that more resembles ASIC implementations. Alternate or coordinating implementations may migrate ECIR controller features to a final ASIC instead of or in addition to FPGAs. Depending on the implementation all of the aforementioned embedded components and microprocessors may be considered the "CPU" and/or "processor" for the ECIR.

Power Source

The power source 1286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1286 is connected to at least one of the interconnected subsequent components of the ECIR thereby providing an electric current to all subsequent components. In one example, the power source 1286 is connected to the system bus component 1204. In an alternative embodiment, an outside power source 1286 is provided through a connection across the I/O 1208 interface. For example, a USB and/or IEEE 1394 connection carries both data and power across the connection and is therefore a suitable source of power.

Interface Adapters

Interface bus(ses) 1207 may accept, connect, and/or communicate to a number of interface adapters, conventionally although not necessarily in the form of adapter cards, such as but not limited to: input output interfaces (I/O) 1208, storage interfaces 1209, network interfaces 1210, and/or the like. Optionally, cryptographic processor interfaces 1227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1209 may accept, communicate, and/or connect to a number of storage devices such as, but not limited to: storage devices 1214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1210 may accept, communicate, and/or connect to a communications network 1213. Through a communications network 1213, the ECIR controller is accessible through remote clients 1233b (e.g., computers with web browsers) by users 1233a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed ECIR), architectures may similarly be employed to pool, load balance, and/or otherwise increase the communicative bandwidth required by the ECIR controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1210 may be used to engage with various communications network types 1213. For example, multiple network interfaces may be employed to allow for the communication over broadcast, multicast, and/or unicast networks.

Input Output interfaces (I/O) 1208 may accept, communicate, and/or connect to user input devices 1211, peripheral devices 1212, cryptographic processor devices 1228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1211 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1212 may be connected and/or communicate to I/O and/or other facilities of the like such as network interfaces, storage interfaces, directly to the interface bus, system bus, the CPU, and/or the like. Peripheral devices may be external, internal and/or part of the ECIR controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the ECIR controller may be embodied as an embedded, dedicated, and/or monitor-less (i.e., headless) device, wherein access would be provided over a network interface connection.

Cryptographic units such as, but not limited to, microcontrollers, processors 1226, interfaces 1227, and/or devices 1228 may be attached, and/or communicate with the ECIR controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1229. However, memory is a fungible technology and resource, thus, any number of memory embodiments may be employed in lieu of or in concert with one another. It is to be understood that the ECIR controller and/or a computer systemization may employ various forms of memory 1229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1229 will include ROM 1206, RAM 1205, and a storage device 1214. A storage device 1214 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1229 may contain a collection of program and/or database components and/or data such as, but not limited to: operating system component(s) 1215 (operating system); information server component(s) 1216 (information server); user interface component(s) 1217 (user interface); Web browser component(s) 1218 (Web browser); database(s) 1219; mail server component(s) 1221; mail client component(s) 1222; cryptographic server component(s) 1220 (cryptographic server); the ECIR component(s) 1235; and/or the like (i.e., collectively a component collection). These components may be stored and accessed from the storage devices and/or from storage devices accessible through an interface bus. Although non-conventional program components such as those in the component collection, typically, are stored in a local storage device 1214, they may also be loaded and/or stored in memory such as: peripheral devices, RAM, remote storage facilities through a communications network, ROM, various forms of memory, and/or the like.

Operating System

The operating system component 1215 is an executable program component facilitating the operation of the ECIR controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ECIR controller to communicate with other entities through a communications network 1213. Various communication protocols may be used by the ECIR controller as a subcarrier transport mechanism for interaction, such as, but not limited to: multicast, TCP/IP, UDP, unicast, and/or the like.

Information Server

An information server component 1216 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ECIR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ECIR database 1219, operating systems, other program components, user interfaces, Web browsers, and/or the like.

Access to the ECIR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ECIR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ECIR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1217 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1218 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the ECIR enabled nodes. The combined application may be nugatory on systems employing standard Web browsers.

Mail Server

A mail server component 1221 is a stored program component that is executed by a CPU 1203. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ECIR.

Access to the ECIR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1222 is a stored program component that is executed by a CPU 1203. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1220 is a stored program component that is executed by a CPU 1203, cryptographic processor 1226, cryptographic processor interface 1227, cryptographic processor device 1228, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ECIR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ECIR component to engage in secure transactions if so desired. The cryptographic component facilitates the secure accessing of resources on the ECIR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ECIR Database

The ECIR database component 1219 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ECIR database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ECIR database is implemented as a data-structure, the use of the ECIR database 1219 may be integrated into another component such as the ECIR component 1235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1219 includes several tables 1219*a-o*. A Users table 1219*a* may include fields such as, but not limited to: user_id, ssn, dob, first_name, last_name, age, state, address_firstline, address_secondline, zipcode, devices_list, contact_info, contact_type, alt_contact_info, alt_contact_type, coupon_id, and/or the like. The Users table may support and/or track multiple entity accounts on a ECIR. A Devices table 1219*b* may include fields such as, but not limited to: device_ID, device_name, device_IP, device_MAC, device_type, device_model, device_version, device_OS, device_apps_list, device_securekey, wallet_app_installed_flag, and/or the like. An Apps table 1219*c* may include fields such as, but not limited to: app_ID, app_name, app_type, app_dependencies, and/or the like. An Accounts table 1219*d* may include fields such as, but not limited to: account_number, account_security_code, account_name, issuer_acquirer_flag, issuer_name, acquirer_name, account_address, routing_number, access_API_call, linked_wallets_list, coupon_id, and/or the like. A Merchants table 1219e may include fields such as, but not limited to: merchant_id, merchant_name, merchant_address, ip_address, mac_address, auth_key, port_num, security_settings_list, coupon_id, and/or the like. An Issuers table 1219f may include fields such as, but not limited to: issuer_id, issuer_name, issuer_address, ip_address, mac_address, auth_key, port_num, security_settings_list, coupon_id, and/or the like. An Acquirers table 1219g may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 1219h may include fields such as, but not limited to: gateway_id, gateway_ip, gateway_secure_key, gateway API_list, gateway_services_list, and/or the like. A Transactions table 1219i may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, coupon_id, and/or the like. A Batches table 1219j may include fields such as, but not limited to: batch_id, transaction_id_list, timestamp_list, cleared_flag_list, clearance_trigger_settings, and/or the like. A Ledgers table 1219k may include fields such as, but not limited to: request_id, timestamp, deposit_amount, batch_id, transaction_id, clear_flag, deposit_account, transaction_summary, payor_name, payor_account, and/or the like. A Products table 1219l may include fields such as, but not limited to: product_ID, product_title, product_attributes_list, product_price, tax_info_list, related_products_list, offers_list, discounts_list, rewards_list, merchants_list, merchant_availability_list, coupon_id, and/or the like. A Coupon table 1219m may include fields such as, but not limited to: coupon_id, merchant_id, issuer_id, user_id, coupon_title, coupon_attributes_list, coupon_price, coupon_expiry, related_products_list, discounts_list, rewards_list, merchants_list, merchant_availability_list, coupon_barcode, coupon_magnetic_stripe, coupon_RFID, coupon_delivery_method, coupon_templates, and/or the like. A Templates table 1219n may include fields such as, but not limited to: coupon_id, timestamp, transaction_cost, merchant_params_list, merchant_id, merchant_name, merchant_auth_key, merchant_products_list, num_products, product_list, product_type, product_name, class_labels_list, product_quantity, unit_value, sub_total, comment, user_account_params, account_name, account_type, account_num, billing_line1, billing_line2, zipcode, state, country, phone, sign, and/or the like. An Analytics table 1219o may include fields such as, but not limited to: analytics_report_id, merchant_id, timestamp, analytics_params_list, analytics_regression_models_list, analytics_regression_equations_list, analytics_regression_coefficients_list, analytics_fit_goodness_list, lsm_values_list, and/or the like.

In one embodiment, the ECIR database may interact with other database systems. For example, employing a distributed database system, queries and data access by search ECIR component may treat the combination of the ECIR database, an integrated data security layer database as a single database entity.

In one embodiment, user programs may contain various user interface primitives, which may serve to update the ECIR. Also, various accounts may require custom database tables depending upon the environments and the types of clients the ECIR may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1219a-o. The ECIR may be configured to keep track of various settings, inputs, and parameters via database controllers.

The ECIR database may communicate to and/or with other components in a component collection, including itself, and/or facilities of the like. Most frequently, the ECIR database communicates with the ECIR component, other program components, and/or the like. The database may contain, retain, and provide information regarding other nodes and data.

The ECIRs

The ECIR component 1235 is a stored program component that is executed by a CPU. In one embodiment, the ECIR component incorporates any and/or all combinations of the aspects of the ECIR that was discussed in the previous figures. As such, the ECIR affects accessing, obtaining and the provision of information, services, transactions, and/or the like across various communications networks.

In some embodiments, the ECIR transforms user coupon purchase and redemption request inputs, via ECIR components (e.g., coupon issuance 1247, coupon funds loading 1248, coupon generation 1249, coupon redemption 1250, coupon funds settlement 1251, and, customer purchase analytics 1252), into coupon issuance, transaction, and analytics outputs.

The ECIR component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the ECIR server employs a cryptographic server to encrypt and decrypt communications. The ECIR component may communicate to and/or with other components in a component collection, including itself, and/or facilities of the like. Most frequently, the ECIR component communicates with the ECIR database, operating systems, other program components, and/or the like. The ECIR may contain, communicate, generate, obtain, and/or provide program component, system, user, and/or data communications, requests, and/or responses.

Distributed ECIRs

The structure and/or operation of any of the ECIR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ECIR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ECIR controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for ELECTRONIC COUPON ISSUANCE AND REDEMPTION APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ECIR individual and/or enterprise user, database configuration and/or relational model, data type, data transmission and/or network framework, syntax structure, and/or the like, various embodiments of the ECIR, may be implemented that enable a great deal of flexibility and customization. For example, aspects of the ECIR may be adapted for electronic payment, e-commerce payment, promotion offerings, mobile payment, revenue forecasting, and/or the like. While various embodiments and discussions of the ECIR have been directed to coupon issuance and redemption, however, it is to be understood that the embodiments described herein may be readily configured and/or customized for a wide variety of other applications and/or implementations.

What is claimed is:

1. An account issuance processor-implemented method, comprising:

receiving, via a pay network, an executable hyperlink GET message including an inventory request from a program manager, the inventory request including at least one issue criterion;

activating, by one or more data processors, the executable hyperlink GET message;

upon activating the executable hyperlink GET message, generating, by the one or more data processors, one or more account numbers in response to the inventory request, the one or more account numbers being associated with one or more accounts;

transmitting, via the pay network, the generated one or more account numbers to the program manager;

receiving, via the pay network, an issue request from the program manager, wherein the issue request includes purchase information corresponding to one or more buyers and the one or more account numbers associated with the one or more accounts;

in response to the issue request, determining, by the one or more data processors, that the received purchase information satisfies the at least one issue criterion;

based on the determination that the received purchase information satisfies the at least one issue criterion, generating an executable hyperlink POST message including an account issuance message; and transmitting, via the pay network, the executable hyperlink POST message including the account issuance message to the program manager;

wherein, upon activating the hyperlink POST message including the account issuance message, the program manager generates one or more activation messages and transmits the one or more activation messages to one or more devices of the one or more buyers.

2. The method of claim 1, further comprising:

receiving a purchase request from the one or more buyers; and retrieving the purchase information from the purchase request.

3. The method of claim 1, wherein the one or more activation messages include permanent account numbers associated with a virtual payment system.

4. The method of claim 1, wherein upon activating the hyperlink POST message including the account issuance message, the program manager generates one or more virtual cards for single use for the one or more buyers, the virtual cards including the one or more purchase identifiers.

5. An account issuance system, comprising:
one or more processors; and
a memory disposed in communication with the one or more processors and storing processor issuable instructions to:
receive, via a pay network, an executable hyperlink GET message including an inventory request from a program manager, the inventory request including at least one issue criterion;
activate the executable hyperlink GET message;
upon activating the executable hyperlink GET message, generate one or more account numbers in response to the inventory request, the one or more account numbers being associated with one or more accounts;
transmit, via the pay network, the generated account numbers to the program manager;
receive, via the pay network, an issue request from the program manager, wherein the issue request includes purchase information corresponding to one or more buyers and the one or more account numbers associated with the one or more accounts;
determine, in response to the issue request, that the received purchase information satisfies the at least one issue criterion;
based on the determination that the received purchase information satisfies the at least one issue criterion, generate an executable hyperlink POST message including an account issuance message; and
transmit, via the pay network, the executable hyperlink POST message including the account issuance message to the program manager;
wherein, upon activating the hyperlink POST message including the account issuance message, the program manager generates one or more activation messages and transmits the one or more activation messages to one or more devices of the one or more buyers.

6. The system of claim 5, the memory further storing instructions to:
receive a purchase request from the one or more buyers; and
retrieve the purchase information from the purchase request.

7. The system of claim 5, wherein the one or more activation messages include permanent account numbers associated with a virtual payment system.

8. The system of claim 5, wherein upon activating the hyperlink POST message including the account issuance message, the program manager generates one or more virtual cards for single use for the one or more buyers, the virtual cards including the one or more purchase identifiers.

9. A processor-readable non-transitory tangible medium storing processor-issuable account issuance instructions to:
receive, via a pay network, an executable hyperlink GET message including an inventory request from a program manager, the inventory request including at least one issue criterion;
activate, by one or more processors, the executable hyperlink GET message;
upon activating the executable hyperlink GET message, generate one or more account numbers in response to the inventory request, the one or more account numbers being associated with one or more accounts;
transmit, via the pay network, the generated account numbers to the program manager;
receive, via the pay network, an issue request from the program manager, wherein the issue request includes purchase information corresponding to one or more buyers and the one or more account numbers associated with the one or more accounts;
determine, in response to the issue request, that the received purchase information satisfies the at least one issue criterion;
based on the determination that the received purchase information satisfies the at least issue criterion, generate an executable hyperlink POST message including an account issuance message; and
transmit, via the pay network, the executable hyperlink POST message including the account issuance message to the program manager;
wherein, upon activating the hyperlink POST message including the account issuance message, the program manager generates one or more activation messages and transmits the one or more activation messages to one or more devices of the one or more buyers.

10. The medium of claim 9, further storing instructions to:
receive a purchase request from the one or more buyers; and
retrieve the purchase information from purchase request.

11. The medium of claim 9, wherein the one or more activation messages include permanent account numbers associated with a virtual payment system.

12. The medium of claim 9, wherein upon activating the hyperlink POST message including the account issuance message, the program manager generates one or more virtual cards for single use for the one or more buyers, the virtual cards including the one or more purchase identifiers.

* * * * *